US 12,458,657 B2

(12) United States Patent
Fallon et al.

(10) Patent No.: US 12,458,657 B2
(45) Date of Patent: Nov. 4, 2025

(54) NEUROGENESIS

(71) Applicant: Brown University, Providence, RI (US)

(72) Inventors: Justin R. Fallon, Providence, RI (US); Ashley E. Webb, Providence, RI (US); Beth McKechnie, Attleboro, MA (US); Tali Sorets, Newton, MA (US); Lauren Fish, East Greenwich, RI (US); Diego Jaime, Providence, RI (US); John Page, Storrs, CT (US); Laura A. Madigan, Pawtucket, RI (US)

(73) Assignee: BROWN UNIVERSITY, Providence, RI (US)

( * ) Notice: Subject to any disclaimer, the term of this patent is extended or adjusted under 35 U.S.C. 154(b) by 0 days.

(21) Appl. No.: 17/604,279

(22) PCT Filed: Apr. 17, 2020

(86) PCT No.: PCT/US2020/028816
§ 371 (c)(1),
(2) Date: Oct. 15, 2021

(87) PCT Pub. No.: WO2020/214987
PCT Pub. Date: Oct. 22, 2020

(65) Prior Publication Data
US 2022/0193114 A1    Jun. 23, 2022

Related U.S. Application Data

(60) Provisional application No. 62/835,945, filed on Apr. 18, 2019.

(51) Int. Cl.
*A61K 48/00* (2006.01)
*A01K 67/0276* (2024.01)
(Continued)

(52) U.S. Cl.
CPC ...... *A61K 31/7105* (2013.01); *A01K 67/0276* (2013.01); *C07K 16/18* (2013.01);
(Continued)

(58) Field of Classification Search
None
See application file for complete search history.

(56) References Cited

U.S. PATENT DOCUMENTS 6,852,838 B2   2/2005  Valenzuela et al.
7,759,314 B2   7/2010  Fallon et al.
(Continued)

FOREIGN PATENT DOCUMENTS

WO    99/10494 A2    3/1999
WO    2005040391 A1   5/2005
(Continued)

OTHER PUBLICATIONS

NCBI Reference Sequence: NC_005104.4 (R. norvegicus chr. 5, 2016, pp. 1-4) (Year: 2016).*
(Continued)

*Primary Examiner* — Arthur S Leonard
(74) *Attorney, Agent, or Firm* — Tarolli, Sundheim, Covell & Tummino LLP

(57) ABSTRACT

Methods and compositions for increasing neurogenesis and for preventing or treating diseases, disorders or conditions associated with neurodegeneration, are provided herein.

10 Claims, 7 Drawing Sheets

Specification includes a Sequence Listing.

(51) Int. Cl.
| | |
|---|---|
| A61K 31/7105 | (2006.01) |
| C07K 16/18 | (2006.01) |
| C12N 15/11 | (2006.01) |
| C12N 15/113 | (2010.01) |

(52) U.S. Cl.
CPC ...... *C12N 15/111* (2013.01); *A01K 2217/075* (2013.01); *A01K 2227/105* (2013.01)

(56) References Cited

U.S. PATENT DOCUMENTS

| | | | |
|---|---|---|---|
| 7,816,322 | B2 | 10/2010 | Fallon et al. |
| 9,329,182 | B2 | 5/2016 | Burden |
| 9,574,015 | B2 | 2/2017 | Burden et al. |
| 9,717,750 | B2 | 8/2017 | Bennett et al. |
| 9,969,785 | B2 | 5/2018 | Fallon et al. |
| 2006/0024312 | A1* | 2/2006 | Alberini ............... C12Q 1/6883 435/6.12 |
| 2014/0249210 | A1* | 9/2014 | Lutz ..................... A61K 48/005 514/44 R |

FOREIGN PATENT DOCUMENTS

| | | |
|---|---|---|
| WO | 2012109075 A1 | 8/2012 |
| WO | 2013074636 A1 | 5/2013 |
| WO | 2017096123 A1 | 6/2017 |
| WO | 2021076883 A2 | 4/2021 |

OTHER PUBLICATIONS

Meyers et al., Increased bone morphogenetic protein signaling contributes to age-related declines in neurogenesis and cognition (Neurobio Aging, 2016:38:164-175) (Year: 2016).*
Brain storm, Nature, vol. 567, 433 Page, Mar. 28, 2019.
Aberle et al., "Wishful thinking Encodes a BMP Type II Receptor that Regulates Synaptic Growth in *Drosophila*", Neuron, vol. 33, pp. 545-558, Feb. 14, 2002.
Akins et al., "Axonal Ribosomes and mRNAs Associate With Fragile X Granules in Adult Rodent and Human Brains", Human Molecular Genetics, vol. 26, No. 1, pp. 192-209, Jan. 2017.
Akins et al., "Systematic Mapping of Fragile X Granules in the Developing Mouse Brain Reveals a Potential Role for Presynaptic FMRP in Sensorimotor Functions", The Journal of Comparative Neurology, vol. 520, Issue 16, pp. 3687-3706, Nov. 1, 2012.
Allen et al., "Cell Proliferation Is Reduced in the Hippocampus in Schizophrenia", Australian & New Zealand Journal of Psychiatry, vol. 50, Issue 5, pp. 473-480, May 2016.
Arvidsson et al., "Neuronal Replacement From Endogenous Precursors in the Adult Brain After Stroke", Nature medicine, vol. 8, No. 9, pp. 963-970, Sep. 2002.
Barrós-Loscertales et al., "Reduced Striatal vol. in Cocaine-dependent Patients", NeuroImage, vol. 56, Issue 3, pp. 1-30, Feb. 11, 2011.
Bondolfi et al., "Impact of Age and Caloric Restriction on Neurogenesis in the Dentate Gyrus of C57BL/6 Mice", Neurobiology of Aging, vol. 25, Issue 3, pp. 333-340, Mar. 2004. (English Abstract Submitted).
Brandhorst et al., "A Periodic Diet that Mimics Fasting Promotes Multi-System Regeneration, Enhanced Cognitive Performance, and Healthspan", Cell Metabolism, vol. 22, Issue 1, pp. 1-14, Jul. 7, 2015.
Burden et al., "The Role of MuSK in Synapse Formation and Neuromuscular Disease", Cold Spring Harbor perspectives in biology, vol. 5, pp. 1-11, May 1, 2013.
Camicioli et al., "Parkinson's Disease is Associated With Hippocampal", Movement Disorders, vol. 18, Issue 7, pp. 784-790, Jun. 12, 2003. (English Abstract Submitted).
Chan et al., "Hippocampal vol. in Vulnerability and Resilience to Depression", Journal of Affective Disorders, vol. 189, pp. 199-202, Jan. 1, 2016. (English Abstract Submitted).

Charville et al., "Ex Vivo Expansion and In Vivo Self-Renewal of Human Muscle Stem Cells", Stem Cell Report, vol. 5, pp. 621-632, Oct. 13, 2015.
Chen et al., "Enhancement of Hippocampal Neurogenesis by Lithium", Journal of Neurochemistry, vol. 75, Issue 4, pp. 1729-1734, Nov. 2000.
Cheusova et al., "Identification of Developmentally Regulated Expression of MuSK Inastrocytes of the Rodent Retina", Journal of Neurochemistry, vol. 99, pp. 450-457, Oct. 2006.
Choi et al., "Effect of Exercise-induced Neurogenesis on Cognitive Function Deficit in a Rat Model of Vascular Dementia", Molecular medicine reports, vol. 13, Issue 4, pp. 2981-2990, Jan. 14, 2016.
Christie et al., "The FXG: A Presynaptic Fragile X Granule Expressed in a Subset of Developing Brain Circuits", The Journal of Neuroscience, vol. 29, No. 5, pp. 1514-1524, Feb. 4, 2009.
Chyung et al., "Fragile X Granules Are a Family of Axonal Ribonucleoprotein Particles With Circuit-dependent Protein Composition and Mrna Cargos", J Comp Neurol., vol. 526, No. 1, pp. 96-108, Jan. 1, 2018.
Cook et al., "Hippocampal Volumetric and Morphometric Studies in Frontal and Temporal Lobe Epilepsy", Brain, vol. 115, Issue 4, pp. 1001-1015, Aug. 1, 1992. (English Abstract Submitted).
Das et al., "Lifetime cigarette smoking is associated with striatal vol. measures", Addiction Biology, vol. 17, Issue 4, pp. 817-825, Mar. 2011. (English Abstract Submitted).
Ekonomou et al., "Increased Neural Progenitors in Vascular Dementia", Neurobiology of Aging, vol. 32, Issue 12, pp. 2152-2161, Dec. 2011. (English Abstract Submitted).
Enwere et al., "Aging Results in Reduced Epidermal Growth Factor Receptor Signaling, Diminished Olfactory Neurogenesis, and Deficits in Fine Olfactory Discrimination", The Journal of Neuroscience, vol. 24, Issue 38, pp. 8354-8365, Sep. 22, 2004.
Ernst et al., "Neurogenesis in the Striatum of the Adult Human Brain", Cell, vol. 156, pp. 1072-1083, Feb. 27, 2014.
Erp et al., "Subcortical Brain vol. Abnormalities in 2028 Individuals With Schizophrenia and 2540 Healthy Controls via the ENIGMA Consortium", Molecular Psychiatry, vol. 21, pp. 547-553, Jun. 2, 2015.
Ersche et al., "Meta-analysis of Structural Brain Abnormalities Associated With Stimulant Drug Dependence and Neuroimaging of Addiction Vulnerability and Resilience", Current Opinion in Neurobiology, vol. 23, Issue 4, pp. 615-624, Aug. 2013.
Falkner et al., "Transplanted Embryonic Neurons Integrate Into Adult Neocortical Circuits", Nature, vol. 539, pp. 248-253, Nov. 10, 2016.
Fallon et al., "Preferential Outgrowth of Central Nervous System Neurites on Astrocytes and Schwann Cells as Compared with Nonglial Cells In Vitro", The Journal of Cell Biology, vol. 100, pp. 198-207, Jan. 1985.
Foland et al., "Increased Volume of the Amygdala and Hippocampus in Bipolar Patients Treated With Lithium", Neuroreport, vol. 19, Issue 2, pp. 221-224, Jan. 22, 2008.
Gold et al., "Hippocampal Damage and Memory Impairments as Possible Early Brain Complications of Type 2 Diabetes", Diabetologia, vol. 50, pp. 711-719, Feb. 14, 2007.
Gopinath et al., "FOXO3 Promotes Quiescence in Adult Muscle Stem Cells during the Process of Self-Renewa", Stem Cell Reports, vol. 2, pp. 414-426, Apr. 8, 2014.
Hesser et al., "Identification and Characterization of a Novel Splice Variant of Musk", FEBS Letters, vol. 442, Issues 2-3, pp. 133-137, Jan. 15, 1999.
Ho et al., "Effects of Diabetes on Hippocampal Neurogenesis: Links to Cognition and Depression", Neuroscience & Biobehavioral Reviews, vol. 37, Issue 8, pp. 1346-1362, Sep. 2013.
Hong et al., "CCL2 Induces Neural Stem Cell Proliferation and Neuronal Differentiation in Niemann-Pick type C Mice", Journal of Veterinary Medical Science, vol. 77, Issue 6, pp. 693-699, Feb. 19, 2015.
Imayoshi et al., "Roles of Continuous Neurogenesis in the Structural and Functional Integrity of the Adult Forebrain", Nature Neuroscience, vol. 11, No. 10, pp. 1153-1161, Oct. 2008.

(56) References Cited

OTHER PUBLICATIONS

Kantarci et al., "Hippocampal Volumes Predict Risk of Dementia With Lewy Bodies in Mild Cognitive Impairment", Neurology, vol. 87, pp. 2317-2323, Nov. 29, 2016.
Li et al., "Hippocampal Subfield Volumetry in Patients With Subcortical Vascular Mild Cognitive Impairment", Scientific reports, vol. 6, Issue 20873, pp. 1-8, Feb. 15, 2016.
Mak et al., "Multi-modal MRI Investigation of Volumetric and Microstructural Changes in the Hippocampus and Its Subfields in Mild Cognitive Impairment, Alzheimer's Disease, and Dementia With Lewy Bodies", International Psychogeriatrics, vol. 29, Issue 4, pp. 545-555, Jan. 16, 2017.
Martynoga et al., "Epigenomic Enhancer Annotation Reveals a Key Role for NFIX in Neural Stem Cell Quiescence", Genes & development, vol. 27, pp. 1769-1786, Aug. 15, 2013. (English Abstract submitted).
Mira et al., "Signaling through BMPR-IA Regulates Quiescence and Long-Term Activity of Neural Stem Cells in the Adult Hippocampus", Cell Stem Cell, pp. 78-89, Jul. 2, 2010.
Nathan et al., "Association Between CSF Biomarkers, Hippocampal vol. and Cognitive Function in Patients With Amnestic Mild Cognitive Impairment (MCI)", Neurobiology of Aging, vol. 53, pp. 1-10, May 2017. (English Abstract Submitted).
Ono et al., "BMP Signalling Permits Population Expansion by Preventing Premature Myogenic Differentiation in Muscle Satellite Cells", Cell Death and Differentiation, vol. 18, pp. 222-234, Feb. 2011.
Parent et al., "Rat Forebrain Neurogenesis and StriatalNeuron Replacement after Focal Stroke", Ann Neurol, vol. 52, pp. 802-813, Dec. 2002.
Pitcher et al., "Reduced Striatal vols. in Parkinson's Disease: A Magnetic Resonance Imaging Study", Translational neurodegeneration, vol. 1, Issue 17, pp. 1-8, Aug. 21, 2012.
Powers et al., "Exercise Augmentation of Exposure Therapy for PTSD: Rationale and Pilot Efficacy Data", Cognitive behaviour therapy, vol. 44, Issue 4, pp. 1-20, Feb. 23, 2015.
Praag et al., "Exercise Enhances Learning and Hippocampal Neurogenesis in Aged Mice", The Journal of Neuroscience, vol. 25, No. 38, pp. 8680-8685, Sep. 21, 2005.
Praag et al., "Running Enhances Neurogenesis, Learning, and Long-term Potentiation in Mice", Proceedings of the National Academy of Sciences of the United States of America, vol. 96, No. 3, pp. 13427-13431, Nov. 9, 1999.
Rubin et al., "Greater Hippocampal vol. is Associated with PTSD Treatment Response", Psychiatry Research: Neuroimaging, vol. 252, pp. 36-39, Jun. 30, 2016.
Spalding et al., "Dynamics of Hippocampal Neurogenesis in Adult Humans", Cell, vol. 153, No. 6, pp. 1219-1227, Jun. 6, 2013.
Sterling et al., "Striatal Shape in Parkinson's Disease", Neurobiology of aging, vol. 34, Issue 11, pp. 2510-2516, Nov. 2013.
Tai et al., "Neurodegenerative Processes in Temporal Lobe Epilepsy With Hippocampal Sclerosis: Clinical, Pathological and Neuroimaging Evidence", Neuropathology and Applied Neurobiology, vol. 44, Issue 1, 9 Pages, Dec. 2017. (English Abstract Submitted).
Thored et al., "Persistent Production of Neurons from Adult Brain Stem Cells During Recovery after Stroke", Stem Cells, vol. 24, No. 3, pp. 739-747, Apr. 2006.
Tropepe et al., "Transforming Growth Factor-a Null and Senescent Mice Show Decreased Neural Progenitor Cell Proliferation in the Forebrain Subependyma", The Journal of Neuroscience, vol. 17, No. 20, pp. 7850-7859, Oct. 15, 1997.
Van Rooij et al., "Smaller Hippocampal vol. as a Vulnerability Factor for the Persistence of Post-traumatic Stress Disorder", Psychological medicine, vol. 45, Issue 13, pp. 2737-2746, May 4, 2015. (English Abstract Submitted).
Villeda et al., "Young Blood Reverses Age-related Impairments in Cognitive Function and Synaptic Plasticity in Mice", Nature Medicine, vol. 20, No. 6, pp. 659-663, Jun. 2014.
Whitworth et al., "Direct and Indirect Effects of Exercise on Posttraumatic Stress Disorder Symptoms: a Longitudinal Study", General Hospital Psychiatry, vol. 49, pp. 56-62, Nov. 2017. (English Abstract Submitted).
Winner et al., "Adult Neurogenesis in Neurodegenerative Diseases", Cold Spring Harbor perspectives in biology, vol. 7, Issue 4, pp. 1-14, Apr. 2015.
Withers et al., "Bone Morphogenetic Protein-7 Enhances Dendritic Growth and Receptivity to Innervation in Cultured Hippocampal Neurons", European Journal of Neuroscience, vol. 12, No. 1, pp. 106-116, Feb. 2000. (English Abstract Submitted).
Yilmaz et al., "Musk is a Bmp Co-receptor That Shapes Bmp Responses and Calcium Signaling in Muscle Cells", vol. 9, Issue 444, pp. ra87, Sep. 6, 2016.
International Search Report and Written Opinion received in International Application No. PCT/US2020/028816, mailed on Aug. 28, 2020, 11 pages.
Extended European Search Report received for European Application No. EP20792018.2, mailed on Apr. 26, 2023, 6 pages.
Cantor, et al., "Preserving Neuromuscular Synapses in ALS by Stimulating Musk with a Therapeutic Agonist Antibody", eLIFE, vol. 7, Feb. 20, 2018, pp. 1-19.

* cited by examiner

Fig. 2. MuSK RNA and protein in NSCs. *Left.* MuSK RNA detected by RNA-seq in quiescent and activated NSCs freshly isolated from the adult mouse SVZ. *Right.* MuSK visualized in freshly isolated adult NSCs by anti-MuSK antibodies

SEQUENCE LISTING

```
<160> NUMBER OF SEQ ID NOS: 6

<210> SEQ ID NO 1
<211> LENGTH: 91
<212> TYPE: PRT
<213> ORGANISM: Homo sapiens

<400> SEQUENCE: 1

Ala Arg Ile Leu Arg Ala Pro Glu Ser His Asn Val Thr Phe Gly Ser
1               5                   10                  15

Phe Val Thr Leu His Cys Thr Ala Thr Gly Ile Pro Val Pro Thr Ile
                20                  25                  30

Thr Trp Ile Glu Asn Gly Asn Ala Val Ser Ser Gly Ser Ile Gln Glu
            35                  40                  45

Ser Val Lys Asp Arg Val Ile Asp Ser Arg Leu Gln Leu Phe Ile Thr
        50                  55                  60

Lys Pro Gly Leu Tyr Thr Cys Ile Ala Thr Asn Lys His Gly Glu Lys
65                  70                  75                  80

Phe Ser Thr Ala Lys Ala Ala Thr Ile Ser
                85                  90

<210> SEQ ID NO 2
<211> LENGTH: 91
<212> TYPE: PRT
<213> ORGANISM: Mus sp.

<400> SEQUENCE: 2

Ala Arg Ile Leu Arg Ala Pro Glu Ser His Asn Val Thr Phe Gly Ser
1               5                   10                  15

Phe Val Thr Leu Arg Cys Thr Ala Ile Gly Ile Pro Val Pro Thr Ile
                20                  25                  30

Ser Trp Ile Glu Asn Gly Asn Ala Val Ser Ser Gly Ser Ile Gln Glu
            35                  40                  45

Ser Val Lys Asp Arg Val Ile Asp Ser Arg Leu Gln Leu Phe Ile Thr
        50                  55                  60

Lys Pro Gly Leu Tyr Thr Cys Ile Ala Thr Asn Lys His Gly Glu Lys
65                  70                  75                  80

Phe Ser Thr Ala Lys Ala Ala Ala Thr Val Ser
                85                  90

<210> SEQ ID NO 3
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 3
tgctcatatc taaatgcgat                                              20
```

<210> SEQ ID NO 4
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 4
gcactccatg gcatctggaa                                                  20

<210> SEQ ID NO 5
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 5
gagcataaat gttctagact                                                  20

<210> SEQ ID NO 6
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 6
ctccatggca tctggaaggg                                                  20

NEUROGENESIS

STATEMENT REGARDING FEDERALLY SPONSORED RESEARCH OR DEVELOPMENT

This invention was developed with the following funding: NIH Grant: T32 award 5T32AG041688-07 and U01 grant: NIH 1U01NS064295-04. The government has certain rights in the invention.

CROSS REFERENCE TO RELATED APPLICATIONS

This application is a national phase filing under 35 U.S.C. § 371 of International Application No. PCT/US2020/028816 filed Apr. 17, 2020, which claims priority from U.S. Provisional Patent Application No. 62/835,945 filed Apr. 18, 2019, the entire contents of which are incorporated herein by reference.

FIELD OF THE INVENTION

The embodiments of the present invention relate to compositions and methods for enhancing neurogenesis.

SEQUENCE LISTING

The instant application contains a Sequence Listing which has been submitted electronically in ASCII format and is hereby incorporated by reference in its entirety. Said ASCII copy, created on May 15, 2020, is named 405505-593001WO SL.txt and is 2,855 bytes in size.

BACKGROUND OF THE INVENTION

Neurodegenerative diseases represent a major public health challenge, expected to impact one in five people in their lifetimes. Alzheimer's disease (AD) is the most common cause of age-related dementia. There is a critical and urgent need for therapeutics to prevent and treat AD and other neurodegenerative conditions.

BRIEF SUMMARY OF THE INVENTION

The present disclosure provides certain technologies for enhancing neurogenesis, including in particular in adult humans. In some embodiments, technologies provided herein may be useful in medicine, including specifically treatment of diseases, disorders or conditions associated with neurodegeneration, or otherwise with low or reduced neuronal activity (e.g., neuronal activity in an adult hippocampus and/or in subventricular zone(s)). For example, in some embodiments, technologies provided herein may be useful in the treatment of one or more of Alzheimer's Disease (AD), Parkinson's' disease, dementia (e.g., Fronto-temporal dementia), stroke, Major Depressive Disorder (MDD), bipolar disorder, Schizophrenia, Post-Traumatic Stress Disorder (PTSD), substance-related and addictive disorders (e.g., chronic cocaine use and lifelong cigarette smoking), Temporal-Lobe Epilepsy, Hippocampal Sclerosis, Niemann Pick Type C, Diabetes-mediated hippocampal neuronal loss, and Huntington's disease.

Among other things, the present disclosure provides an insight that presence and/or activity of a particular form(s) of the muscle-specific tyrosine kinase (MuSK) protein, specifically lacking a functional Ig3 domain, may achieve or contribute to neurogenesis in adult humans, or otherwise provide neurological benefit(s). The MuSK transcript can be alternatively spliced, including to generate at least one form (i.e., $\Delta$Ig3-MuSK) that lacks the Ig3 domain. The present disclosure appreciates that increasing presence and/or level of $\Delta$Ig3-MuSK, and/or of other functional form(s) in which its Ig3 domain is altered (e.g., mutated, blocked, etc.) or removed, may provide benefits as described herein.

The present disclosure provides technologies for increasing level and/or activity of MuSK form(s) that functionally participate in neurogenesis, including, in some embodiments, by reducing alternative splicing that would otherwise generate MuSK form(s) that do not so participate.

In some embodiments, the present disclosure provides technologies for agonizing Ig3-MuSK, for example by increasing level and/or activity of one or more forms of MuSK whose Ig3 domain is altered (e.g., mutated, blocked, removed, etc.) for example so that it fails to effectively participate in interaction(s) with BMP. In some embodiments, the present disclosure provides technologies for reducing Ig3$^+$ MuSK, for example by reducing level and/or activity of one or more forms of MuSK whose Ig3 domain effectively participates in interaction(s) with BMP. Alternatively or additionally, in some embodiments, the present disclosure provides technologies that reduce level and/or activity of a MuSK Ig3/BMP complex (e.g., that inhibit formation of, disrupt, and/or otherwise antagonize such complex).

Some embodiments of the technology described herein can be defined according to any of the following numbered paragraphs:

1. A method of treating a subject suffering from one or more features of neurodegeneration or impaired cognition, the method comprising a step of:
   increasing level or activity of a MuSK polypeptide lacking a functional Ig3 domain; and/or
   reducing level or activity of a BMP-MuSK polypeptide complex, wherein the MuSK comprises a functional Ig3 domain.
2. A method of increasing neurogenesis, the method comprising a step of:
   increasing level or activity of a MuSK polypeptide lacking a functional Ig3 domain; and/or
   reducing level or activity of a BMP-MuSK polypeptide complex, wherein the MuSK comprises a functional Ig3 domain.
3. The method of paragraph 1 or 2, wherein the method further comprises the step of administering a pharmaceutical composition that comprises or delivers a MuSK NG agonizing agent.
4. The method of paragraph 3, wherein the MuSK NG agonizing agent is or comprises a small molecule.
5. The method of paragraph 3, wherein the MuSK NG agonizing agent is or comprises an antibody agent.
6. The method of paragraph 3, wherein the MuSK NG agonizing agent is or comprises an oligonucleotide.
7. The method of paragraph 5, wherein the antibody agent specifically binds to a MuSK polypeptide.
8. The method of paragraph 5, wherein the antibody agent targets MuSK and specifically binds to the Ig3 domain of a MuSK polypeptide.
9. The method of paragraph 8, wherein the antibody targeting the Ig3 domain of MuSK protein may bind specifically to the Ig3 domain relative to the Ig1 or Ig2 domains of MuSK.

10. The method of paragraph 5, wherein the antibody agent is an immunoglobulin molecule comprising four polypeptide chains, e.g., two heavy (H) chains and two light (L) chains.
11. The method of paragraph 5, wherein the antibody agent is or comprises a monoclonal antibody.
12. The method of paragraph 5, wherein the antibody agent may be or comprise a polyclonal antibody.
13. The method of paragraph 6, wherein the MuSK NG agonizing agent is an oligonucleotide.
14. The method of paragraph 13, wherein the step further comprises increasing the altered splicing of transcripts.
15. The method of paragraph 14, wherein the altered splicing of transcripts is or comprises altering MuSK splicing.
16. The method of paragraph 15, wherein the altered MuSK splicing includes production of products having desired and/or improved biological functions, and/or knockdown of undesired product by, modifying splicing products so that undesired biological functions can be suppressed.
17. The method of paragraph 16, wherein the altered MuSK splicing includes products of transcripts which lack sequence that encodes MuSK Ig3 domain.
18. The method of paragraph 17, wherein the splicing product is mRNA.
19. The method of paragraph 15, wherein the alteration comprises skipping one or more exons.
20. The method of paragraph 19, wherein the splicing of a transcript is increased in that exon skipping increases levels of mRNA and proteins that have improved beneficial activities compared with absence of exon skipping.
21. The method of paragraph 19, wherein the splicing of a transcript is increased in that exon skipping lowers levels of mRNA and proteins that have undesired activities compared with absence of exon skipping.
22. The method of paragraph 21, wherein the splicing of a transcript is increased in that exon skipping lowers levels of mRNA and proteins of MuSK Ig3 domain.
23. The method of paragraph 19, wherein the skipped one or more exons are in the MuSK Ig3 domain.
24. The method of paragraph 23, wherein the skipped exon is exon 6 of MuSK Ig3 domain
25. The method of paragraph 23, wherein the skipped exon is exon 7 of MuSK Ig3 domain
26. The method of paragraph 23, wherein the skipped exons are exons 6 and 7 of MuSK Ig3 domain.
27. The method of paragraph 23, wherein the composition comprises oligonucleotide comprising controlled structural elements, e.g., controlled chemical modification, provide unexpected properties.
28. The method of paragraph 27, wherein the oligonucleotide comprises chemical modifications.
29. The method of paragraph 28, wherein the chemical modifications comprise one or more types of base modifications, sugar modification, and internucleotidic linkage modifications.
30. The method of paragraph 29, wherein the chemical modifications comprise sugar modification.
31. The method of paragraph 30, wherein the sugar modification is 2-MOE modification.
32. A method of inducing MuSK exon skipping by:
    contacting a system comprising a population of MuSK primary transcripts with an oligonucleotide that binds to such primary transcripts so that skipping of one or both of exons 6 and 7 is increased.
33. The method of paragraph 32, wherein the oligonucleotide comprises controlled structural elements, e.g., controlled chemical modification, provide unexpected properties.
34. The method of paragraph 33, wherein the oligonucleotide comprises chemical modifications.
35. The method of paragraph 34, wherein the chemical modifications comprise one or more types of base modifications, sugar modification, and internucleotidic linkage modifications.
36. The method of paragraph 35, wherein the chemical modifications comprise sugar modification.
37. The method of paragraph 36, wherein the sugar modification is 2-MOE modification.
38. The method of paragraph 32, further comprising the step of administering to a subject a pharmaceutically-effective amount of a composition that comprises and/or delivers the oligonucleotide to the subject.
39. The method of paragraph 38, wherein the composition is delivered to the CNS.
40. The method of paragraph 38, wherein the composition is delivered to the cerebrospinal fluid.
41. The method of paragraph 38, wherein the compositions is administered to the brain parenchyma.
42. The method of paragraph 38, wherein the composition can be formulated for systemic and topical or localized administration.
43. The method of paragraph 38, wherein the composition is formulated for delivery by a route selected from intravenous injection, intrathecal administration, oral administration, buccal administration, inhalation, nasal administration, topical administration, ophthalmic administration or otic administration.
44. The method of paragraph 43, wherein the composition is formulated for delivery by intrathecal administration.
45. The method of paragraph 43, wherein the composition is formulated for delivery by intravenous administration.
46. The method of paragraph 43, wherein the composition is formulated for delivery by oral administration.
47. A population of cells that has been exposed to a MuSK NG agonizing agent, such that, level or percentage of cells characterized by neural marker(s) has been increased within the population relative to that observed absent the exposure.
48. The population of paragraph 47, wherein the neural marker(s) is or are selected from the group consisting of Dex, Map2, GFAP, CNPase, S100b, O4, Sox2, Nestin, and combinations thereof.
49. The population of paragraph 47, wherein the increase in level or percentage is an increase of at least 10%, 20%, 30%, 40%, 50%, 60%, 70%, 80%, 90%, 95%, or 95% greater relative to that observed absent the exposure.
50. The population of paragraph 47, wherein the neural marker(s) are indicative of an activated neuron.
51. A method comprising a step of:
    contacting an original population of cells that is or comprises neural progenitor cells with a MuSK NG agonizing agent to generate a resulting population, the contacting being performed under conditions and for a time sufficient that level or percentage of cells characterized by neural marker(s) is significantly higher in the resulting population than in the original population.
52. The method of paragraph 51, wherein the step of contacting occurs in vivo.

53. The method of paragraph 52, wherein the step of contacting occurs in an adult human.
54. The method of paragraph 52 or 53, wherein the step of contacting occurs at a site selected from the group consisting of: a hippocampus, a subventricular zone, and combinations thereof.
55. The method of paragraph 52 or 53, wherein the step of contacting occurs ex vivo.
56. The method of paragraph 55, wherein the population of cells was obtained from a subject suffering from or susceptible to a neurodegenerative disease, disorder or condition.
57. The method of paragraph 55, further comprising administering the resulting population to the subject.
58. The method of paragraph 51, wherein the neural marker(s) is or are selected from the group consisting of Dex, Map2, GFAP, CNPase, S100b, O4, Sox2, Nestin, and combinations thereof.
59. The method of paragraph 51, wherein the neural marker(s) are indicative of an activated neuron.
60. A method of characterizing a MuSK NG agonizing agent, the method comprising one or more of:
assessing ability to reduce MuSK-Ig3-BMP complex formation (dependencies re prevent formation, disrupt formed, assess direct binding to Ig3 and/or BMP, concentration dependence etc.);
assessing ability to alter splicing pattern of primary MuSK transcripts;
assessing ability to inhibit expression (dependent includes induce degradation, inhibit translation, etc.) of transcript (e.g., including Ig3);
assessing the ability to increase expression of MuSK transcripts lacking a sequence encoding the Ig3 domain;
assessing the ability to increase level of MuSK polypeptide lacking functional Ig3; and
assessing the ability to impact characteristics of cells in a population.
61. The method of paragraph 60, wherein the MuSK NG agonizing agent is an oligonucleotide.
62. The method of paragraph 61, wherein the oligonucleotide comprising at least one modification.
60. The method of paragraph 58 or paragraph 59, wherein the oligonucleotide, when administered to a subject, alters splicing activity of primary MuSK transcripts so that skipping of one or both of exons 6 and 7 is increased.
64. A genetically modified mouse that comprises in its genome:
a sequence encoding the MuSK, wherein the sequence encoding MuSK does not include the span of nucleotides from (in 5' to 3' order) exon 6 to exon 7;
wherein the genetically modified mouse is not capable of expressing the full length MuSK transcript or producing full length MuSK protein.
65. The genetically modified mouse of paragraph 64, wherein the mouse is not capable of expressing MuSK protein that includes the amino acid sequence in SEQ ID NO: 2.
66. The genetically modified mouse of paragraph 64, wherein the mouse is capable of expressing MuSK transcript encoding a MuSK protein lacking an Ig3 domain.
67. The genetically modified mouse of paragraph 64, wherein the mouse exhibits increased neurogenesis, compared to a mouse that is able to express the full length MuSK transcript or produce full length MuSK protein.
68. The genetically modified mouse of paragraph 67, wherein the increased neurogenesis comprises increased adult hippocampal neurogenesis.
69. The genetically modified mouse of paragraph 64, wherein the mouse exhibits enhanced performance in hippocampal-dependent memory tasks, compared to a mouse that is able to express the full length MuSK transcript or produce full length MuSK protein.
70. The genetically modified mouse of paragraph 69, wherein the enhanced performance in hippocampal-dependent memory tasks comprises increased preference for novel object location.
71. The genetically modified mouse of paragraph 64, wherein the mouse is genetically modified by removing a span of nucleotides from (in 5' to 3' order) exon 6 to exon 7 in the sequence encoding MuSK using a CRISPR/Cas9 system.
72. The genetically modified mouse of paragraph 71, wherein the CRISPR/Cas9 system includes gDNA that targets regions within exon6 and/or exon7 of the MuSK gene sequence.

Other implementations are also described and recited herein.

BRIEF DESCRIPTION OF THE DRAWINGS

For the purpose of illustration, certain embodiments of the present invention are shown in the drawings described below. Like numerals in the drawings indicate like elements throughout. It should be understood, however, that the invention is not limited to the precise arrangements, dimensions, and instruments shown. In the drawings.

DETAILED DESCRIPTION OF THE INVENTION

Figure 1:
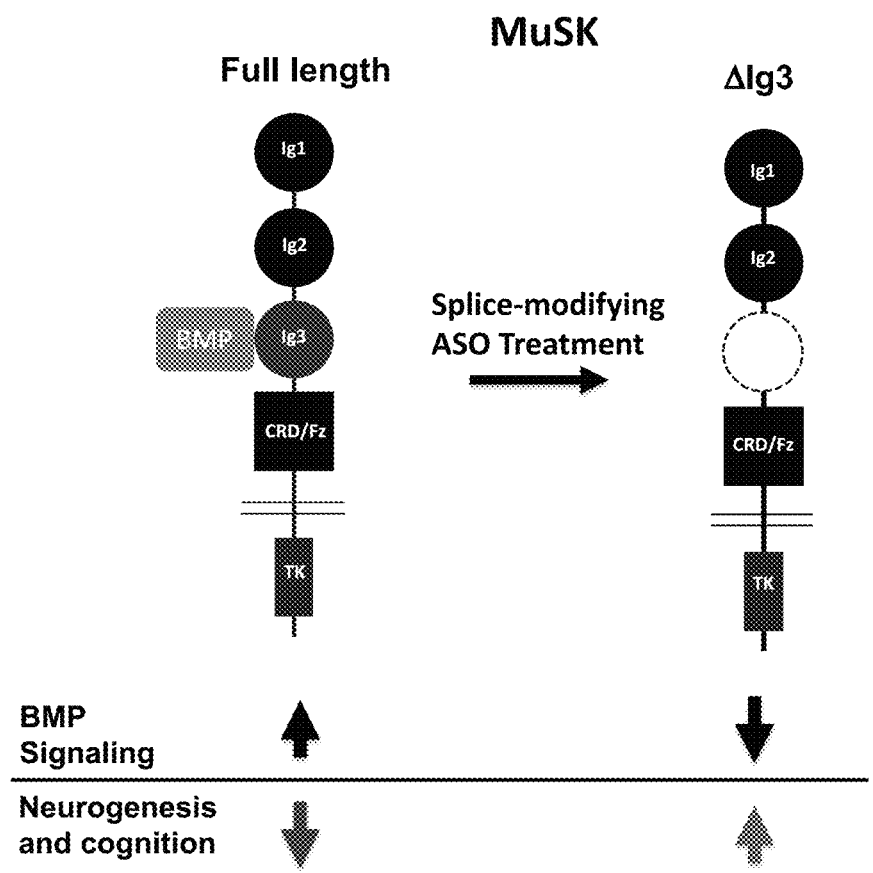
FIG. 1 depicts the how MuSK alternative splicing regulates BMP signaling, adult hippocampal neurogenesis and cognition. The Ig3 domain (blue) binds BMP. The Ig1 domain is necessary for agrin-LRP4 binding and NMJ formation. MuSK also binds BMP receptors, which is not shown (as described in the present disclosure and Yilmaz et al., 2016 for details).

It is to be appreciated that certain aspects, modes, embodiments, variations and features of the invention are described below in various levels of detail in order to provide a substantial understanding of the present invention.

Definitions

For convenience, the meaning of some terms and phrases used in the specification, examples, and appended claims, are provided below. Unless stated otherwise, or implicit from context, the following terms and phrases include the meanings provided below. The definitions are provided to aid in describing particular embodiments, and are not intended to limit the claimed invention, because the scope of the invention is limited only by the claims. Unless otherwise defined, all technical and scientific terms used herein have the same meaning as commonly understood by one of ordinary skill in the art to which this invention belongs. If there is an apparent discrepancy between the usage of a term in the art and its definition provided herein, the definition provided within the specification shall prevail.

About: The term "about", when used herein in reference to a value, refers to a value that is similar, in context to the referenced value. In general, those skilled in the art, familiar with the context, will appreciate the relevant degree of variance encompassed by "about" in that context. For example, in some embodiments, the term "about" may encompass a range of values that within 25%, 20%, 19%, 18%, 17%, 16%, 15%, 14%, 13%, 12%, 11%, 10%, 9%, 8%, 7%, 6%, 5%, 4%, 3%, 2%, 1%, or less of the referred value.

Administration: As used herein, the term "administration" typically refers to the administration of a composition to a subject or system, for example to achieve delivery of an agent (e.g., an agonizing agent) that is, or is included in or otherwise delivered by, the composition. Those of ordinary skill in the art will be aware of a variety of routes that may, in appropriate circumstances, be utilized for administration to a subject, for example a human. For example, in some embodiments, administration may be ocular, oral, buccal, dermal (which may be or comprise, for example, one or more of topical to the dermis, intradermal, interdermal, transdermal, etc.), enteral, intra-arterial, intradermal, intragastric, intramedullary, intramuscular, intranasal, intraperitoneal, intrathecal, intravenous, intraventricular, within a specific organ (e.g., intrahepatic), mucosal, nasal, oral, rectal, subcutaneous, sublingual, topical, tracheal (e.g., by intratracheal instillation), vaginal, vitreal, etc. In some embodiments, an agent (e.g., an agonizing agent) is delivered to the central nervous system (CNS), e.g., delivered via intracerebroventricular administration. In some embodiments, administration may involve only a single dose. In some embodiments, administration may involve application of a fixed number of doses. In some embodiments, administration may involve dosing that is intermittent (e.g., a plurality of doses separated in time) and/or periodic (e.g., individual doses separated by a common period of time) dosing. In some embodiments, administration may involve continuous dosing (e.g., perfusion) for at least a selected period of time.

Agent: In general, the term "agent", as used herein, may be used to refer to a compound or entity of any chemical class including, for example, a polypeptide, nucleic acid, saccharide, lipid, small molecule, metal, or combination or complex thereof. In appropriate circumstances, as will be clear from context to those skilled in the art, the term may be utilized to refer to an entity that is or comprises a cell or organism, or a fraction, extract, or component thereof. Alternatively or additionally, as context will make clear, the term may be used to refer to a natural product in that it is found in and/or is obtained from nature. In some instances, again as will be clear from context, the term may be used to refer to one or more entities that is man-made in that it is designed, engineered, and/or produced through action of the hand of man and/or is not found in nature. In some embodiments, an agent may be utilized in isolated or pure form; in some embodiments, an agent may be utilized in crude form. In some embodiments, potential agents may be provided as collections or libraries, for example that may be screened to identify or characterize active agents within them. In some cases, the term "agent" may refer to a compound or entity that is or comprises a polymer; in some cases, the term may refer to a compound or entity that comprises one or more polymeric moieties. In some embodiments, the term "agent" may refer to a compound or entity that is not a polymer and/or is substantially free of any polymer and/or of one or more particular polymeric moieties. In some embodiments, the term may refer to a compound or entity that lacks or is substantially free of any polymeric moiety.

Agonist: Those skilled in the art will appreciate that the term "agonist" may be used to refer to an agent (i.e., an "agonizing agent"), condition, or event whose presence, level, degree, type, or form correlates with increased level or activity of another agent (i.e., the agonized agent or the target agent). In general, an agonist may be or include an agent of any chemical class including, for example, small molecules, polypeptides, nucleic acids, carbohydrates, lipids, metals, and/or any other entity that shows the relevant activating activity. In some embodiments, an agonist may be direct (in which case it exerts its influence directly upon its target); in some embodiments, an agonist may be indirect (in which case it exerts its influence by other than binding to its target; e.g., by interacting with a regulator of the target, so that level or activity of the target is altered). In some embodiments, an agonist is a binding agent that is a protein (e.g., an antibody) or a nucleic acid (e.g., an antisense oligonucleotide) that binds a target (e.g., a protein or nucleic acid) so that level, form, and/or or activity of the target is altered. In some embodiments, the altered level, form and/or activity is an increased level of altered protein expressed from the target nucleic acid sequence. Those skilled in the art, reading the present disclosure, will appreciate that, in some embodiments, an agonizing agent may bind to (and potentially agonize) a binding target, which binding causes an increase in level or activity of a further agonized target. To give a specific example, in some embodiments, an agonizing agent that binds to a nucleic acid target may alter level and/or activity of that target, and in some specific embodiments may agonize an activity of that nucleic acid target (e.g., by increasing its modification, splicing, 5' cap formation, and/or 3' end formation, transport, and/or translation, etc., so that a level of a desired product, e.g., mRNA, is increased) and/or may agonize a downstream target, such as a polypeptide encoded by such nucleic acid target. To give one particular such example, in some embodiments, an agonizing agent may be or comprise an oligonucleotide that binds to a primary transcript and alters its splicing pattern so that level and/or activity of a particular spliced form (e.g., mature mRNA) is increased, which may, in turn achieved increased level of a product (e.g., a polypeptide) that is or is encoded by such particular spliced form.

Agonist Therapy: The term "agonist therapy", as used herein, refers to administration of an agonist that agonizes a particular target of interest to achieve a desired therapeutic effect. In some embodiments, agonist therapy involves administering a single dose of an agonist. In some embodiments, agonist therapy involves administering multiple doses of an agonist. In some embodiments, agonist therapy involves administering an agonist according to a dosing regimen known or expected to achieve the therapeutic effect, for example, because such result has been established to a designated degree of statistical confidence, e.g., through administration to a relevant population. In some embodiments, agonist therapy involves delivery of agonizing agent as described herein. As noted above, in some embodiments, an agonizing agent may be or comprise a binding agent that is a protein (e.g., an antibody) or a nucleic acid (e.g., an antisense oligonucleotide) that binds a target (e.g., a protein or nucleic acid) a so that level, form, and/or or activity of the target is altered. In some embodiments, an agonizing agent may bind to (and potentially agonize) a binding target, which binding causes an increase in level or activity of a further agonized target. To give a specific example, in some embodiments, an agonizing agent that binds to a nucleic acid target may alter level and/or activity of that target, and in some specific embodiments may agonize an activity of that nucleic acid target (e.g., by increasing its modification, splicing, 5' cap formation, and/or 3' end formation, transport, and/or translation, etc., so that a level of a desired product, e.g., mRNA, is generated) and/or may agonize a downstream target, such as a polypeptide encoded by such nucleic acid target. To give one particular such example, in some embodiment, an agonizing agent may be or comprise an oligonucleotide that binds to a primary transcript and alters its splicing pattern so that level and/or activity of a particular spliced form (e.g., mature mRNA) is generated, which may, in turn achieved increased level of a product (e.g., a polypeptide) that is or is encoded by such particular spliced form.

Antagonist: Those skilled in the art will appreciate that the term "antagonist", as used herein, may be used to refer to an agent (i.e., an "antagonizing agent"), condition, or event whose presence, level, degree, type, or form correlates with decreased level or activity of another agent (i.e., the inhibited agent, or target). In general, an antagonist may be or include an agent of any chemical class including, for example, small molecules, polypeptides, nucleic acids, carbohydrates, lipids, metals, and/or any other entity that shows the relevant inhibitory activity. In some embodiments, an antagonist may be direct (in which case it exerts its influence directly upon its target); in some embodiments, an antagonist may be indirect (in which case it exerts its influence by other than binding to its target; e.g., by interacting with a regulator of the target, so that level or activity of the target is altered). In some embodiments, an antagonist is binding agent that is a protein (e.g., an antibody) or a nucleic acid (e.g., an antisense oligonucleotide) that binds a target (e.g., a protein or nucleic acid) so that the level, form, and/or activity of the target is altered. In some embodiments, the altered level, form and/or activity is a decreased level of altered protein expressed from the target nucleic acid sequence. Those skilled in the art, reading the present disclosure, will appreciate that, in some embodiments, an antagonizing agent may bind to (and potentially antagonize) a binding target, which binding causes a decrease in level or activity of a further antagonized target. To give a specific example, in some embodiments, an antagonizing agent that binds to a nucleic acid target may alter level and/or activity of that target, and in some specific embodiments may antagonize an activity of that nucleic acid target (e.g., by decreasing its modification, splicing, 5' cap formation, and/or 3' end formation, transport, and/or translation, etc., so that a level of an undesired product, e.g., mRNA, is suppressed) and/or may antagonize a downstream target, such as a polypeptide encoded by such nucleic acid target. To give one particular such example, in some embodiment, an antagonizing agent may be or comprise an oligonucleotide that binds to a primary transcript and alters its splicing pattern so that level and/or activity of a particular spliced form (e.g., mature mRNA) is suppressed, which may, in turn achieved decreased level of a product (e.g., a polypeptide) that is or is encoded by such particular spliced form.

Antibody agent: As used herein, the term "antibody agent" refers to an agent that specifically binds to a particular antigen (e.g., that may be or comprise an epitope of a protein of interest, e.g., a MuSK protein). In some embodiments, the term encompasses any polypeptide or polypeptide complex that includes immunoglobulin structural elements sufficient to confer specific binding. Exemplary antibody agents include, but are not limited to, monoclonal antibodies or polyclonal antibodies. In some embodiments, an antibody agent may include one or more constant region sequences that are characteristic of mouse, rabbit, primate, or human antibodies. In some embodiments, an antibody agent may include one or more sequence elements are humanized, primatized, chimeric, etc., as is known in the art. In many embodiments, the term "antibody agent" is used to refer to one or more of the art-known or developed constructs or formats for utilizing antibody structural and functional features in alternative presentation. For example, embodiments, an antibody agent utilized in accordance with the present invention is in a format selected from, but not limited to, intact IgA, IgG, IgE or IgM antibodies; bi- or multi-specific antibodies (e.g., Zybodies®, etc.); antibody fragments such as Fab fragments, Fab' fragments, F(ab')2 fragments, Fd' fragments, Fd fragments, and isolated CDRs or sets thereof; single chain Fvs; polypeptide-Fc fusions; single domain antibodies (e.g., shark single domain antibodies such as IgNAR or fragments thereof); cameloid antibodies; masked antibodies (e.g., Probodies®); Small Modular ImmunoPharmaceuticals ("SMIPs™"); single chain or Tandem diabodies (TandAb®); VHHs; Anticalins®; Nanobodies® minibodies; BiTE®s; ankyrin repeat proteins or DARPINs®; Avimers®; DARTs; TCR-like antibodies; Adnectins®; Affilins®; Trans-Bodies®; Affibodies®; TrimerX®; MicroProteins; Fynomers®, Centyrins®; and KALBITOR®. In some embodiments, an antibody may lack a covalent modification (e.g., attachment of a glycan) that it would have if produced naturally. In some embodiments, an antibody may contain a covalent modification (e.g., attachment of a glycan, a payload (e.g., a detectable moiety, a therapeutic moiety, a catalytic moiety, etc.), or other pendant group (e.g., poly-ethylene glycol, etc.). In many embodiments, an antibody agent is or comprises a polypeptide whose amino acid sequence includes one or more structural elements recognized by those skilled in the art as a complementarity determining region (CDR); in some embodiments an antibody agent is or comprises a polypeptide whose amino acid sequence includes at least one CDR (e.g., at least one heavy chain CDR and/or at least one light chain CDR) that is substantially identical to one found in a reference antibody. In some embodiments an included CDR is substantially identical to a reference CDR in that it is either identical in sequence or contains between 1-5 amino acid substitutions as compared with the reference CDR. In some embodiments an included CDR is substantially identical to a reference CDR in that it shows at least 85%, 86%, 87%, 88%, 89%, 90%, 91%, 92%, 93%, 94%, 95%, 96%, 97%, 98%, 99%, or 100% sequence identity with the reference CDR. In some embodiments an included CDR is substantially identical to a reference CDR in that it shows at least 96%, 96%, 97%, 98%, 99%, or 100% sequence identity with the reference CDR. In some embodiments an included CDR is substantially identical to a reference CDR in that at least one amino acid within the included CDR is deleted, added, or substituted as compared with the reference CDR but the included CDR has an amino acid sequence that is otherwise identical with that of the reference CDR. In some embodiments an included CDR is substantially identical to a reference CDR in that 1-5 amino acids within the included CDR are deleted, added, or substituted as compared with the reference CDR but the included CDR has an amino acid sequence that is otherwise identical to the reference CDR. In some embodiments an included CDR is substantially identical to a reference CDR in that at least one amino acid within the included CDR is substituted as compared with the reference CDR but the included CDR has an amino acid sequence that is otherwise identical with that of the reference CDR. In some embodiments an included CDR is substantially identical to a reference CDR in that 1-5 amino acids within the included CDR are deleted, added, or substituted as compared with the reference CDR but the included CDR has an amino acid sequence that is otherwise identical to the reference CDR. In some embodiments, an antibody agent is or comprises a polypeptide whose amino acid sequence includes structural elements recognized by those skilled in the art as an immunoglobulin variable domain. In some embodiments, an antibody agent is a polypeptide protein having a binding domain which is homologous or largely homologous to an immunoglobulin-binding domain.

Antibody: As used herein, the term "antibody" refers to an immunoglobulin or a derivative thereof containing an immunoglobulin domain capable of binding to an antigen (e.g., that may be or comprise an epitope of a protein of interest, e.g., a MuSK protein). The antibody can be of any species, e.g., human, rodent, rabbit, goat, chicken, etc. The antibody may be a member of any immunoglobulin class, including any of the human classes: IgG, IgM, IgA, IgD, and IgE, or subclasses thereof such as IgG1, IgG2, etc. In various embodiments of the invention the antibody is a fragment such as a Fab', F(ab')$_2$, scFv (single-chain variable) or other fragment that retains an antigen binding site, or a recombinantly produced scFv fragment, including recombinantly produced fragments. See, e.g., Allen, T. (2002), and references therein. The antibody can be monovalent, bivalent or multivalent. The antibody may be a chimeric or "humanized" antibody in which, for example, a variable domain of rodent origin is fused to a constant domain of human origin, thus retaining the specificity of the rodent antibody. The domain of human origin need not originate directly from a human in the sense that it is first synthesized in a human being. Instead, "human" domains may be generated in rodents whose genome incorporates human immunoglobulin genes. See, e.g., Vaughan, et al., (1998). The antibody may be partially or completely humanized. An antibody may be polyclonal or monoclonal, though for purposes of the present invention monoclonal antibodies are generally preferred. Methods for producing antibodies that specifically bind to virtually any molecule of interest are known in the art. For example, monoclonal or polyclonal antibodies can be purified from blood or ascites fluid of an animal that produces the antibody (e.g., following natural exposure to or immunization with the molecule or an antigenic fragment thereof), can be produced using recombinant techniques in cell culture or transgenic organisms, or can be made at least in part by chemical synthesis. In some embodiments, the antibody can act as an antagonist, e.g., by binding to a target antigen, resulting in a decreased level or activity of said antigen. In some embodiments, the antibody can act as an agonist, e.g., by binding to a target antigen, resulting in an increased level or increased activity of said antigen.

Antisense: The term "antisense" is used herein to refer to a nucleic acid whose nucleotide sequence is complementary to part or all of a sequence found in a coding strand nucleic acid. Typically, a "coding strand" nucleic acid is one whose sequence includes part or all of an open reading frame or other stretch of residues that encodes part or all of a polypeptide. In some embodiments, the term "antisense" may particularly be used herein in reference to an oligonucleotide that binds specifically to a coding strand (i.e., to a target sequence within such coding strand). In some embodiments, a coding strand may include both coding and non-coding sequences (e.g., to give but one example, may be a transcript, such as a primary transcript. that includes both intron and exon sequences). Those skilled in the art, reading the present disclosure, will appreciate that, in some embodiments, an oligonucleotide may be considered or referred to as an "antisense" oligonucleotide when some or all of its sequence is complementary to non-coding portion(s) of its target strand. In some embodiments, an antisense oligonucleotide binds to coding sequences in a target sense strand; in some embodiments, an antisense oligonucleotide binds to non-coding sequences in a target coding strand. In some embodiments, an antisense oligonucleotide binds to both coding and non-coding sequences in a target coding strand. In some embodiments, an antisense oligonucleotide is characterized in that, when bound to its target sequence in a coding strand (e.g., a transcript), it alters post-transcriptional processing (e.g., one or more of modification, splicing, 5' cap formation, and/or 3' end formation, 5' cap formation, and/or 3' end formation, transport, and/or translation) of such coding strand. In some particular embodiments, an antisense oligonucleotide alters splicing of its target coding strand, Alternatively or additionally, in some embodiments, an antisense-coding strand complex is or can be degraded, e.g., by RNase H.

Approximately: As used herein, the terms "approximately" or "about" in reference to a number are generally taken to include numbers that fall within a range of 5%, 10%, 15%, or 20% in either direction (greater than or less than) of the number unless otherwise stated or otherwise evident from the context (except where such number would be less than 0% or exceed 100% of a possible value).

Binding agent: In general, the term "binding agent" is used herein to refer to any entity that binds to a target of interest as described herein. In many embodiments, a binding agent of interest is one that binds specifically with its target in that it discriminates its target from other potential binding partners in a particular interaction context. In general, a binding agent may be or comprise an entity of any chemical class (e.g., polymer, non-polymer, small molecule, polypeptide, carbohydrate, lipid, nucleic acid, etc.). In some embodiments, a binding agent is a single chemical entity. In some embodiments, a binding agent is a complex of two or more discrete chemical entities associated with one another under relevant conditions by non-covalent interactions. For example, those skilled in the art will appreciate that in some embodiments, a binding agent may comprise a "generic" binding moiety (e.g., one of biotin/avidin/streptavidin and/or a class-specific antibody) and a "specific" binding moiety (e.g., an antibody or aptamers with a particular molecular target) that is linked to the partner of the generic biding moiety. In some embodiments, such an approach can permit modular assembly of multiple binding agents through linkage of different specific binding moieties with the same generic binding poiety partner. In some embodiments, binding agents are or comprise polypeptides (including, e.g., antibodies or antibody fragments). In some embodiments, binding agents are or comprise small molecules. In some embodiments, binding agents are or comprise nucleic acids (e.g., antisense oligonucleotides). In some embodiments, binding agents are aptamers. In some embodiments, binding agents are polymers; in some embodiments, binding agents are not polymers. In some embodiments, binding agents are non-polymeric in that they lack polymeric moieties. In some embodiments, binding agents are or comprise carbohydrates. In some embodiments, binding agents are or comprise lectins. In some embodiments, binding agents are or comprise peptidomimetics. In some embodiments, binding agents are or comprise scaffold proteins. In some embodiments, binding agents are or comprise mimeotopes. In some embodiments, binding agents are or comprise stapled peptides. In certain embodiments, binding agents are or comprise nucleic acids, such as DNA or RNA (e.g., antisense oligonucleotides).

Characteristic sequence element: As used herein, the phrase "characteristic sequence element" refers to a sequence element found in a polymer (e.g., in a polypeptide or nucleic acid) that represents a characteristic portion of that polymer. In some embodiments, presence of a characteristic sequence element correlates with presence or level of a particular activity or property of the polymer. In some embodiments, presence (or absence) of a characteristic sequence element defines a particular polymer as a member (or not a member) of a particular family or group of such polymers. A characteristic sequence element typically comprises at least two monomers (e.g., amino acids or nucleotides). In some embodiments, a characteristic sequence element includes at least 2, 3, 4, 5, 6, 7, 8, 9, 10, 11, 12, 13, 14, 15, 20, 25, 30, 35, 40, 45, 50, or more monomers (e.g., contiguously linked monomers). In some embodiments, a characteristic sequence element includes at least first and second stretches of contiguous monomers spaced apart by one or more spacer regions whose length may or may not vary across polymers that share the sequence element.

Complementary: As used herein, in accordance with its art-accepted meaning, "complementary" refers to the capacity for precise pairing between particular bases, nucleosides, nucleotides or nucleic acids. For example, adenine (A) and uridine (U) are complementary; adenine (A) and thymidine (T) are complementary; and guanine (G) and cytosine (C), are complementary and are referred to in the art as Watson-Crick base pairings. If a nucleotide at a certain position of a first nucleic acid sequence is complementary to a nucleotide located opposite in a second nucleic acid sequence when the strands are aligned in anti-parallel orientation, the nucleotides (nt) form a complementary base pair, and the nucleic acids are complementary at that position. The percent complementarity of a first nucleic acid to a second nucleic acid may be evaluated by aligning them in antiparallel orientation for maximum complementarity over a window of evaluation, determining the total number of nt in both strands that form complementary base pairs within the window, dividing by the total number of nt within the window, and multiplying by 100. For example, AAAAAAAA and TTTGTTAT are 75% complementary since there are 12 nt in complementary base pairs out of a total of 16 nt. When computing the number of complementary nt needed to achieve a particular % complementarity, fractions are rounded to the nearest whole number. A position occupied by non-complementary nucleotides constitutes a mismatch, i.e., the position is occupied by a non-complementary base pair. In certain embodiments a window of evaluation has the length described herein for duplex portions or target portions. Complementary sequences include base-pairing of a polynucleotide comprising a first nucleotide sequence to a polynucleotide comprising a second nucleotide sequence over the entire length of both nucleotide sequences (if the same length) or over the entire length of the shorter sequence (if different lengths). Such sequences can be referred to as "perfectly complementary" (100% complementarity) with respect to each other herein. Nucleic acids that are at least 70% complementary over a window of evaluation are considered "substantially complementary" over that window. In certain embodiments complementary nucleic acids are at least 75%, at least 80%, at least 85%, at least 90%, or at least 95% complementary over the window of evaluation. Where a first sequence is referred to as "substantially complementary" with respect to a second sequence herein, the two sequences may be perfectly complementary or they may comprise one or more unmatched bases upon hybridization, e.g., up to about 5%, 10%, 15%, 20%, or 25% unmatched bases upon hybridization, e.g., 1, 2, 3, 4, 5, or 6 mismatched base pairs upon hybridization for a duplex up to 30 base pairs, while retaining the ability to hybridize under the conditions most relevant to their intended use. It should be understood that where two oligonucleotides are designed to form, upon hybridization, one or more single stranded overhangs, such overhangs are not regarded as mismatches or unpaired nucleotides with regard to the determination of percent complementarity. For example, the two strands of a dsRNA comprising one oligonucleotide 21 nucleotides in length and another oligonucleotide 23 nucleotides in length, wherein the longer oligonucleotide comprises a sequence of 21 nucleotides that is perfectly complementary to the shorter oligonucleotide and a 2 nucleotide overhang, may be referred to as "perfectly complementary" herein. "Complementary" sequences, as used herein may include one or more non-Watson-Crick base pairs and/or base pairs formed from non-natural and other modified nucleotides, in so far as the requirements with respect to their ability to hybridize are fulfilled. Such non-Watson-Crick base pairs include, but are not limited to, G:U Wobble or Hoogsteen base pairing. Those of ordinary skill in the art are aware that guanine, cytosine, adenine, and uracil can be replaced by other bases without substantially altering the base pairing properties of a polynucleotide comprising a nucleotide bearing such bases, according to the so-called "wobble" rules (see, e.g., Murphy & Ramakrishnan (2004). For example, a nucleotide comprising inosine as its base can base pair with nucleotides containing adenine, cytosine, or uracil. Thus, nucleotides containing uracil, guanine, or adenine can be replaced in the nucleotide sequences of an Inhibitory RNA described herein by a nucleotide containing, for example, inosine. It will be understood that the terms "complementary", "perfectly complementary", and "substantially complementary" can be used with respect to the base matching between any two nucleic acids, e.g., the base matching between the sense strand and the antisense strand of a double stranded nucleic acid, or portion thereof. "Hybridize", as used herein, refers to the interaction between two nucleic acid sequences (which in some embodiments may be part of the same nucleic acid molecule and in other embodiments may be or include part(s) of different nucleic acid molecules) comprising or consisting of complementary portions such that a duplex structure (i.e., an intramolecular or intermolecular duplex) is formed that is stable under the particular conditions of interest, as will be understood by the ordinary skilled artisan.

Combination therapy: As used herein, the term "combination therapy" refers to those situations in which a subject is simultaneously exposed to two or more therapeutic regimens (e.g., two or more therapeutic agents). In some embodiments, the two or more regimens may be administered simultaneously; in some embodiments, such regimens may be administered sequentially (e.g., all "doses" of a first regimen are administered prior to administration of any doses of a second regimen); in some embodiments, such agents are administered in overlapping dosing regimens. In some embodiments, "administration" of combination therapy may involve administration of one or more agent(s) or modality(ies) to a subject receiving the other agent(s) or modality(ies) in the combination. For clarity, combination therapy does not require that individual agents be administered together in a single composition (or even necessarily at the same time), although in some embodiments, two or more agents, or active moieties thereof, may be administered together in a combination composition, or even in a combination compound (e.g., as part of a single chemical complex or covalent entity).

Comparable: As used herein, the term "comparable" refers to two or more agents, entities, situations, sets of conditions, etc., that may not be identical to one another but that are sufficiently similar to permit comparison there between so that one skilled in the art will appreciate that conclusions may reasonably be drawn based on differences or similarities observed. In some embodiments, comparable sets of conditions, circumstances, individuals, or populations are characterized by a plurality of substantially identical features and one or a small number of varied features. Those of ordinary skill in the art will understand, in context, what degree of identity is required in any given circumstance for two or more such agents, entities, situations, sets of conditions, etc. to be considered comparable. For example, those of ordinary skill in the art will appreciate that sets of circumstances, individuals, or populations are comparable to one another when characterized by a sufficient number and type of substantially identical features to warrant a reasonable conclusion that differences in results obtained or phenomena observed under or with different sets of circumstances, individuals, or populations are caused by or indicative of the variation in those features that are varied.

Domain: The term "domain" as used herein refers to a section or portion of an entity. In some embodiments, a "domain" is associated with a particular structural and/or functional feature of the entity so that, when the domain is physically separated from the rest of its parent entity, it substantially or entirely retains the particular structural and/or functional feature. Alternatively or additionally, a domain may be or include a portion of an entity that, when separated from that (parent) entity and linked with a different (recipient) entity, substantially retains and/or imparts on the recipient entity one or more structural and/or functional features that characterized it in the parent entity. In some embodiments, a domain is a section or portion of a molecule (e.g., a small molecule, carbohydrate, lipid, nucleic acid, or polypeptide). In some embodiments, a domain is a section of a polypeptide (e.g., the Ig3 domain of a MuSK protein); in some such embodiments, a domain is characterized by a particular structural element (e.g., a particular amino acid sequence or sequence motif, a-helix character, b-sheet character, coiled-coil character, random coil character, etc.), and/or by a particular functional feature (e.g., binding activity, enzymatic activity, folding activity, signaling activity, etc.).

Dosing regimen: Those skilled in the art will appreciate that the term "dosing regimen" may be used to refer to a set of unit doses (typically more than one) that are administered individually to a subject, typically separated by periods of time. In some embodiments, a given therapeutic agent has a recommended dosing regimen, which may involve one or more doses. In some embodiments, a dosing regimen comprises a plurality of doses each of which is separated in time from other doses. In some embodiments, individual doses are separated from one another by a time period of the same length; in some embodiments, a dosing regimen comprises a plurality of doses and at least two different time periods separating individual doses. In some embodiments, all doses within a dosing regimen are of the same unit dose amount. In some embodiments, different doses within a dosing regimen are of different amounts. In some embodiments, a dosing regimen comprises a first dose in a first dose amount, followed by one or more additional doses in a second dose amount different from the first dose amount. In some embodiments, a dosing regimen comprises a first dose in a first dose amount, followed by one or more additional doses in a second dose amount same as the first dose amount. In some embodiments, a dosing regimen is correlated with a desired or beneficial outcome when administered across a relevant population (i.e., is a therapeutic dosing regimen).

Expression: As used herein, "expression" of a nucleic acid sequence refers to one or more of the following events: (1) production of an RNA template from a DNA sequence (e.g., by transcription); (2) processing of an RNA transcript (e.g., by splicing, editing, 5' cap formation, and/or 3' end formation); (3) transport of an RNA transcript (e.g., from nucleus to cytoplasm; and/or (4) translation of an RNA into a polypeptide or protein; and/or (4) post-translational modification of a polypeptide or protein.

Fragment: A "fragment" of a material or entity as described herein has a structure that includes a discrete portion of the whole but lacks one or more moieties found in the whole. In some embodiments, a fragment consists of such a discrete portion. In some embodiments, a fragment consists of or comprises a characteristic structural element or moiety found in the whole. In some embodiments, a polymer fragment comprises or consists of at least 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 275, 300, 325, 350, 375, 400, 425, 450, 475, 500 or more monomeric units (e.g., residues) as found in the whole polymer. In some embodiments, a polymer fragment comprises or consists of at least about 5%, 10%, 15%, 20%, 25%, 30%, 25%, 40%, 45%, 50%, 55%, 60%, 65%, 70%, 75%, 80%, 85%, 90%, 95%, 96%, 97%, 98%, 99% or more of the monomeric units (e.g., residues) found in the whole polymer. The whole material or entity may in some embodiments be referred to as the "parent" of the fragment.

Gene: As used herein, the term "gene" refers to a DNA sequence in a chromosome that codes for a product (e.g., an RNA product and/or a polypeptide product). In some embodiments, a gene includes coding sequence (i.e., sequence that encodes a particular product); in some embodiments, a gene includes non-coding sequence. In some particular embodiments, a gene may include both coding (e.g., exonic) and non-coding (e.g., intronic) sequences. In some embodiments, a gene may include one or more regulatory elements that, for example, may control or impact one or more aspects of gene expression (e.g., cell-type-specific expression, inducible expression, etc.).

Gene product or expression product: As used herein, the term "gene product" or "expression product" generally refers to an RNA transcribed from the gene (pre- and/or post-processing) or a polypeptide (pre- and/or post-modification) encoded by an RNA transcribed from the gene. In some embodiments, a gene product may be or comprise a particular processed form of an RNA transcript (e.g., a particular edited form, a particular splice form, a particular capped form, etc.).

Homology: As used herein, the term "homology" refers to the overall relatedness between polymeric molecules, e.g., between nucleic acid molecules (e.g., DNA molecules and/or RNA molecules) and/or between polypeptide molecules. In some embodiments, polymeric molecules are considered to be "homologous" to one another if their sequences are at least 25%, 30%, 35%, 40%, 45%, 50%, 55%, 60%, 65%, 70%, 75%, 80%, 85%, 90%, 95%, or 99% identical. In some embodiments, polymeric molecules are considered to be "homologous" to one another if their sequences are at least 25%, 30%, 35%, 40%, 45%, 50%, 55%, 60%, 65%, 70%, 75%, 80%, 85%, 90%, 95%, or 99% similar.

Identity: As used herein, the term "identity" refers to the overall relatedness between polymeric molecules, e.g., between nucleic acid molecules (e.g., DNA molecules and/or RNA molecules) and/or between polypeptide molecules. In some embodiments, polymeric molecules are considered to be "substantially identical" to one another if their sequences are at least 25%, 30%, 35%, 40%, 45%, 50%, 55%, 60%, 65%, 70%, 75%, 80%, 85%, 90%, 95%, or 99% identical. Calculation of the percent identity of two nucleic acid or polypeptide sequences, for example, can be performed by aligning the two sequences for optimal comparison purposes (e.g., gaps can be introduced in one or both of a first and a second sequences for optimal alignment and non-identical sequences can be disregarded for comparison purposes). In certain embodiments, the length of a sequence aligned for comparison purposes is at least 30%, at least 40%, at least 50%, at least 60%, at least 70%, at least 80%, at least 90%, at least 95%, or substantially 100% of the length of a reference sequence. The nucleotides at corresponding positions are then compared. When a position in the first sequence is occupied by the same residue (e.g., nucleotide or amino acid) as the corresponding position in the second sequence, then the molecules are identical at that position. The percent identity between the two sequences is a function of the number of identical positions shared by the sequences, taking into account the number of gaps, and the length of each gap, which needs to be introduced for optimal alignment of the two sequences. The comparison of sequences and determination of percent identity between two sequences can be accomplished using a mathematical algorithm. For example, the percent identity between two nucleotide sequences can be determined using the algorithm of Meyers and Miller (1989), which has been incorporated into the ALIGN program (version 2.0). In some exemplary embodiments, nucleic acid sequence comparisons made with the ALIGN program use a PAM120 weight residue table, a gap length penalty of 12 and a gap penalty of 4. The percent identity between two nucleotide sequences can, alternatively, be determined using the GAP program in the GCG software package using an NWSgapdna.CMP matrix.

Improve, "increase", "inhibit" or "reduce": As used herein, the terms "improve", "increase", "inhibit", "reduce", or grammatical equivalents thereof, indicate values that are relative to a baseline or other reference measurement. In some embodiments, an appropriate reference measurement may be or comprise a measurement in a particular system (e.g., in a single individual, a single cell, or cell population) under otherwise comparable conditions absent presence of (e.g., prior to and/or after) a particular agent or treatment, or in presence of an appropriate reference agent (e.g., a positive control agent or a negative control agent). In some embodiments, an appropriate reference measurement may be or comprise a measurement in comparable system known or expected to respond in a particular way, in presence of the relevant agent or treatment. Those skilled in the art will appreciate that an "improvement", "increase", "reduction", etc. typically refers to a statistically significant change. Moreover, those skilled in the art will understand from context what magnitude of change may be relevant. For example, in some embodiments, a change may be a "fold" change, i.e., so that a "changed" value represents a 1.1, 1.2, 2, 3, 4, 5, 6, 7, 8, 9, 10, 15, 20, 30, 40, 50 or more (e.g., 500, 1000 times) (including all integers and decimal points in between and above 1), e.g., 1.5, 1.6, 1.7, 1.8, etc.)-fold difference relative to the relevant reference. Alternatively or additionally, in some embodiments, a "change" may be a "percentage" change, so that a "changed" value represents al %, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, or 100% increase or decrease, including all integers and decimal points in between), relative to the relevant reference.

Linked: As used herein, the term "linked", when used with respect to two or more moieties, means that the moieties are physically associated or connected with one another to form a molecular structure that is sufficiently stable so that the moieties remain associated under the conditions in which the linkage is formed and, preferably, under the conditions in which the new molecular structure is used, e.g., physiological conditions. In certain preferred embodiments of the invention the linkage is a covalent linkage. In other embodiments the linkage is noncovalent. Moieties may be linked either directly or indirectly. When two moieties are directly linked, they are either covalently bonded to one another or are in sufficiently close proximity such that intermolecular forces between the two moieties maintain their association. When two moieties are indirectly linked, they are each linked either covalently or noncovalently to a third moiety, which maintains the association between the two moieties. In general, when two moieties are referred to as being linked by a "linker" or "linking moiety" or "linking portion", the linkage between the two linked moieties is indirect, and typically each of the linked moieties is covalently bonded to the linker. The linker can be any suitable moiety that reacts with the two moieties to be linked within a reasonable period of time, under conditions consistent with stability of the moieties (which may be protected as appropriate, depending upon the conditions), and in sufficient amount, to produce a reasonable yield.

Internucleotidic linkage: As used herein, the phrase "internucleotidic linkage" refers generally to the phosphorus-containing linkage between nucleotide units of an oligonucleotide and is interchangeable with "inter-sugar linkage" and "phosphorus atom bridge," as used above and herein. In some embodiments, an internucleotidic linkage is a phosphodiester linkage, as found in naturally occurring DNA and RNA molecules. In some embodiments, an internucleotidic linkage is a "modified internucleotidic linkage" wherein each oxygen atom of the phosphodiester linkage is optionally and independently replaced by an organic or inorganic moiety. In some embodiments, such an organic or inorganic moiety is selected from but not limited to =S, =Se, =NR', —SR', —SeR', —N(R')$_2$, B(R')$_3$, —S—, —Se—, and —N(R')—, wherein each R' is independently as defined and described below. In some embodiments, an internucleotidic linkage is a phosphotriester linkage, phosphorothioate diester linkage

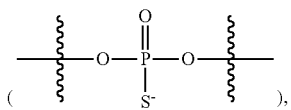 [SMILES: *OP(=O)([S-])O*]

or modified phosphorothioate triester linkage. It is understood by a person of ordinary skill in the art that the internucleotidic linkage may exist as an anion or cation at a given pH due to the existence of acid or base moieties in the linkage. In some embodiments, an internucleotide linkage may be a chiral linkage.

Moiety: Those skilled in the art will appreciate that a "moiety" is a defined chemical group or entity with a particular structure and/or or activity, as described herein.

Nanoparticle: As used herein, the term "nanoparticle" refers to a particle having a diameter of less than 1000 nanometers (nm). In some embodiments, a nanoparticle has a diameter of less than 300 nm, as defined by the National Science Foundation. In some embodiments, a nanoparticle has a diameter of less than 100 nm as defined by the National Institutes of Health. In some embodiments, nanoparticles are micelles in that they comprise an enclosed compartment, separated from the bulk solution by a micellar membrane, typically comprised of amphiphilic entities which surround and enclose a space or compartment (e.g., to define a lumen). In some embodiments, a micellar membrane is comprised of at least one polymer, such as for example a biocompatible and/or biodegradable polymer.

Nucleic acid: As used herein, in its broadest sense, refers to any compound and/or substance that is or can be incorporated into an oligonucleotide chain. In some embodiments, a nucleic acid is a compound and/or substance that is or can be incorporated into an oligonucleotide chain via a phosphodiester linkage. As will be clear from context, in some embodiments, "nucleic acid" refers to an individual nucleic acid residue (e.g., a nucleotide and/or nucleoside); in some embodiments, "nucleic acid" refers to an oligonucleotide chain comprising individual nucleic acid residues. In some embodiments, a "nucleic acid" is or comprises RNA; in some embodiments, a "nucleic acid" is or comprises DNA. In some embodiments, a nucleic acid is, comprises, or consists of one or more natural nucleic acid residues. In some embodiments, a nucleic acid is, comprises, or consists of one or more nucleic acid analogs. In some embodiments, a nucleic acid analog differs from a nucleic acid in that it does not utilize a phosphodiester backbone. For example, in some embodiments, a nucleic acid is, comprises, or consists of one or more "peptide nucleic acids", which are known in the art and have peptide bonds instead of phosphodiester bonds in the backbone, are considered within the scope of the present invention. Alternatively or additionally, in some embodiments, a nucleic acid has one or more phosphorothioate and/or 5'-N-phosphoramidite linkages rather than phosphodiester bonds. In some embodiments, a nucleic acid is, comprises, or consists of one or more natural nucleosides (e.g., adenosine, thymidine, guanosine, cytidine, uridine, deoxyadenosine, deoxythymidine, deoxy guanosine, and deoxycytidine). In some embodiments, a nucleic acid is, comprises, or consists of one or more nucleoside analogs (e.g., 2-aminoadenosine, 2-thiothymidine, inosine, pyrrolopyrimidine, 3-methyl adenosine, 5-methylcytidine, C-5 propynyl-cytidine, C-5 propynyl-uridine, 2-aminoadenosine, C5-bromouridine, C5-fluorouridine, C5-iodouridine, C5-propynyl-uridine, C5-propynyl-cytidine, C5-methylcytidine, 2-aminoadenosine, 7-deazaadenosine, 7-deazaguanosine, 8-oxoadenosine, 8-oxoguanosine, 0(6)-methylguanine, 2-thiocytidine, methylated bases, intercalated bases, and combinations thereof). In some embodiments, a nucleic acid comprises one or more modified sugars (e.g., 2'-fluororibose, ribose, 2'-deoxyribose, arabinose, and hexose) as compared with those in natural nucleic acids. In some embodiments, a nucleic acid has a nucleotide sequence that encodes a functional gene product such as an RNA or protein. In some embodiments, a nucleic acid includes one or more introns. In some embodiments, nucleic acids are prepared by one or more of isolation from a natural source, enzymatic synthesis by polymerization based on a complementary template (in vivo or in vitro), reproduction in a recombinant cell or system, and chemical synthesis. In some embodiments, a nucleic acid is at least 3, 4, 5, 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, 20, 225, 250, 275, 300, 325, 350, 375, 400, 425, 450, 475, 500, 600, 700, 800, 900, 1000, 1500, 2000, 2500, 3000, 3500, 4000, 4500, 5000 or more residues long. In some embodiments, a nucleic acid is partly or wholly single stranded; in some embodiments, a nucleic acid is partly or wholly double stranded. In some embodiments a nucleic acid has a nucleotide sequence comprising at least one element that encodes, or is the complement of a sequence that encodes, a polypeptide. In some embodiments, a nucleic acid has enzymatic activity.

Prodrug: A general, a "prodrug," as that term is used herein and as is understood in the art, is an entity that, when administered to an organism, is metabolized in the body to deliver an active (e.g., therapeutic or diagnostic) agent of interest. Typically, such metabolism involves removal of at least one "prodrug moiety" so that the active agent is formed. Various forms of "prodrugs" are known in the art. For examples of such prodrug moieties, see:

a) Design of Prodrugs, edited by H. Bundgaard, (Elsevier, 1985) and Methods in Enzymology, 42:309-396, edited by K. Widder, et al., (Academic Press, 1985);
b) Prodrugs and Targeted Delivery, edited by J. Rautio (Wiley, 2011);
c) A Textbook of Drug Design and Development, edited by Krogsgaard-Larsen;
d) Bundgaard, Chapter 5 "Design and Application of Prodrugs", by H. Bundgaard, p. 113-191 (1991);
e) Bundgaard, Advanced Drug Delivery Reviews, 8:1-38 (1992);
f) Bundgaard, et al., Journal of Pharmaceutical Sciences, 77:285 (1988); and
g) Kakeya, et al., Chem. Pharm. Bull., 32:692 (1984).

As with other compounds described herein, prodrugs may be provided in any of a variety of forms, e.g., crystal forms, salt forms etc. In some embodiments, prodrugs are provided as pharmaceutically-acceptable salts thereof.

Operably linked: As used herein, the term "operably linked" refers to a juxtaposition wherein the components described are in a relationship permitting them to function in their intended manner. A control element "operably linked" to a functional element is associated in such a way that expression and/or activity of the functional element is achieved under conditions compatible with the control element. In some embodiments, "operably linked" control elements (e.g., promoters, enhancers, etc.) are contiguous (e.g., covalently linked) with the coding elements of interest; in some embodiments, control elements act in trans- or cis- with the coding functional element of interest.

Patient: As used herein, the term "patient" refers to any organism to which a provided composition (e.g., an agonizing agent such as an ASO) is or may be administered, e.g., for experimental, diagnostic, prophylactic, cosmetic, and/or therapeutic purposes. Typical patients include animals (e.g., mammals such as mice, rats, rabbits, non-human primates, and/or humans). In some embodiments, a patient is a human. In some embodiments, a patient is suffering from or susceptible to one or more disorders or conditions. In some embodiments, a patient displays one or more symptoms of a disorder or condition. In some embodiments, a patient has been diagnosed with one or more disorders or conditions. In some embodiments, the disorder or condition is Alzheimer's disease (AD) or other disease characterized by neurodegeneration. In some embodiments, the patient is receiving or has received certain therapy to diagnose and/or to treat a disease, disorder, or condition.

Pharmaceutical composition: As used herein, the term "pharmaceutical composition" refers to an active agent (e.g., an agonizing agent), formulated together with one or more pharmaceutically-acceptable carriers. In some embodiments, active agent is present in unit dose amount appropriate for administration in a therapeutic regimen that shows a statistically significant probability of achieving a predetermined therapeutic effect when administered to a relevant population. In some embodiments, pharmaceutical compositions may be specially formulated for administration in solid or liquid form, including those adapted for the following: oral administration, for example, drenches (aqueous or non-aqueous solutions or suspensions), tablets, e.g., those targeted for buccal, sublingual, and systemic absorption, boluses, powders, granules, pastes for application to the tongue; parenteral administration, for example, by subcutaneous, intramuscular, intravenous, intraperitoneal, intrathecal, intravenous, intraventricular or epidural injection as, for example, a sterile solution or suspension, or sustained-release formulation; topical application, for example, as a cream, ointment, or a controlled-release patch or spray applied to the skin, lungs, or oral cavity; intravaginally or intrarectally, for example, as a pessary, cream, or foam; sublingually; ocularly; transdermally; or nasally, pulmonary, and to other mucosal surfaces.

Pharmaceutically-acceptable: As used herein, the phrase "pharmaceutically-acceptable" refers to those compounds, materials, compositions and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

Pharmaceutically-acceptable carrier: As used herein, the term "pharmaceutically-acceptable carrier" means a pharmaceutically-acceptable material, composition or vehicle, such as a liquid or solid filler, diluent, excipient, or solvent encapsulating material, involved in carrying or transporting the subject compound from one organ, or portion of the body, to another organ, or portion of the body. Each carrier must be "acceptable" in the sense of being compatible with the other ingredients of the formulation and not injurious to the patient. Some examples of materials which can serve as pharmaceutically-acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; pH buffered solutions; polyesters, polycarbonates and/or polyanhydrides; and other non-toxic compatible substances employed in pharmaceutical formulations.

Pharmaceutically-acceptable salt: The term "pharmaceutically-acceptable salt", as used herein, refers to salts of such compounds that are appropriate for use in pharmaceutical contexts, i.e., salts which are, within the scope of sound medical judgment, suitable for use in contact with the tissues of humans and lower animals without undue toxicity, irritation, allergic response and the like, and are commensurate with a reasonable benefit/risk ratio. Pharmaceutically-acceptable salts are well known in the art. For example, Berge, et al., (1977) describes pharmaceutically-acceptable salts in detail. In some embodiments, pharmaceutically-acceptable salt include, but are not limited to, nontoxic acid addition salts, which are salts of an amino group formed with inorganic acids such as hydrochloric acid, hydrobromic acid, phosphoric acid, sulfuric acid and perchloric acid or with organic acids such as acetic acid, maleic acid, tartaric acid, citric acid, succinic acid or malonic acid or by using other methods used in the art such as ion exchange. In some embodiments, pharmaceutically-acceptable salts include, but are not limited to, adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. In some embodiments, a provided compound comprises one or more acidic groups, e.g., an oligonucleotide, and a pharmaceutically-acceptable salt is an alkali, alkaline earth metal, or ammonium (e.g., an ammonium salt of $N(R)_3$, wherein each R is independently defined and described in the present disclosure) salt. Representative alkali or alkaline earth metal salts include sodium, lithium, potassium, calcium, magnesium, and the like. In some embodiments, a pharmaceutically-acceptable salt is a sodium salt. In some embodiments, a pharmaceutically-acceptable salt is a potassium salt. In some embodiments, a pharmaceutically-acceptable salt is a calcium salt. In some embodiments, pharmaceutically-acceptable salts include, when appropriate, nontoxic ammonium, quaternary ammonium, and amine cations formed using counterions such as halide, hydroxide, carboxylate, sulfate, phosphate, nitrate, alkyl having from 1 to 6 carbon atoms, sulfonate and aryl sulfonate. In some embodiments, a provided compound comprises more than one acid groups, for example, an oligonucleotide may comprise two or more acidic groups (e.g., in natural phosphate linkages and/or modified internucleotidic linkages). In some embodiments, a pharmaceutically-acceptable salt, or generally a salt, of such a compound comprises two or more cations, which can be the same or different. In some embodiments, in a pharmaceutically-acceptable salt (or generally, a salt), all ionizable hydrogen (e.g., in an aqueous solution with a pKa no more than about 11, 10, 9, 8, 7, 6, 5, 4, 3, or 2; in some embodiments, no more than about 7; in some embodiments, no more than about 6; in some embodiments, no more than about 5; in some embodiments, no more than about 4; in some embodiments, no more than about 3) in the acidic groups are replaced with cations. In some embodiments, each internucleotidic linkage, e.g., phosphate group, independently exists in its salt form (e.g., if sodium salt, —O—P(O)(ONa)—O—). In some embodiments, a pharmaceutically-acceptable salt is a sodium salt of an oligonucleotide. In some embodiments, a pharmaceutically-acceptable salt is a sodium salt of an oligonucleotide, wherein each acidic phosphate and modified phosphate group, if any, exists as a salt form (all sodium salt).

Polypeptide: As used herein, the term "polypeptide," which is interchangeably used herein with the term "protein," refers to a polymer of at least three amino acid residues. In some embodiments, a polypeptide comprises one or more, or all, natural amino acids. In some embodiments, a polypeptide comprises one or more, or all non-natural amino acids. In some embodiments, a polypeptide comprises one or more, or all, D-amino acids. In some embodiments, a polypeptide comprises one or more, or all, L-amino acids. In some embodiments, a polypeptide comprises one or more pendant groups or other modifications, e.g., modifying or attached to one or more amino acid side chains, at the polypeptide's N-terminus, at the polypeptide's C-terminus, or any combination thereof. In some embodiments, a polypeptide comprises one or more modifications such as acetylation, amidation, aminoethylation, biotinylation, carbamylation, carbonylation, citrullination, deamidation, deimination, eliminylation, glycosylation, lipidation, methylation, pegylation, phosphorylation, sumoylation, or combinations thereof. In some embodiments, a polypeptide may participate in one or more intra- or inter-molecular disulfide bonds. In some embodiments, a polypeptide may be cyclic, and/or may comprise a cyclic portion. In some embodiments, a polypeptide is not cyclic and/or does not comprise any cyclic portion. In some embodiments, a polypeptide is linear. In some embodiments, a polypeptide may comprise a stapled polypeptide. In some embodiments, a polypeptide participates in non-covalent complex formation by non-covalent or covalent association with one or more other polypeptides (e.g., as in an antibody). In some embodiments, a polypeptide has an amino acid sequence that occurs in nature. In some embodiments, a polypeptide has an amino acid sequence that does not occur in nature. In some embodiments, a polypeptide has an amino acid sequence that is engineered in that it is designed and/or produced through action of the hand of man. In some embodiments, the term "polypeptide" may be appended to a name of a reference polypeptide, activity, or structure; in such instances it is used herein to refer to polypeptides that share the relevant activity or structure and thus can be considered to be members of the same class or family of polypeptides. For each such class, the present specification provides and/or those skilled in the art will be aware of exemplary polypeptides within the class whose amino acid sequences and/or functions are known; in some embodiments, such exemplary polypeptides are reference polypeptides for the polypeptide class or family. In some embodiments, a member of a polypeptide class or family shows significant sequence homology or identity with, shares a common sequence motif (e.g., a characteristic sequence element) with, and/or shares a common activity (in some embodiments at a comparable level or within a designated range) with a reference polypeptide of the class; in some embodiments with all polypeptides within the class). For example, in some embodiments, a member polypeptide shows an overall degree of sequence homology or identity with a reference polypeptide that is at least about 30-40%, and is often greater than about 50%, 60%, 70%, 80%, 90%, 91%, 92%, 93%, 94%, 95%, 96%, 97%, 98%, 99% or more and/or includes at least one region (e.g., a conserved region that may in some embodiments comprise a characteristic sequence element) that shows very high sequence identity, often greater than 90% or even 95%, 96%, 97%, 98%, or 99%. Such a conserved region usually encompasses at least 3-4 and often up to 20 or more amino acids; in some embodiments, a conserved region encompasses at least one stretch of at least 2, 3, 4, 5, 6, 7, 8, 9, 10, 11, 12, 13, 14, 15 or more contiguous amino acids. In some embodiments, a useful polypeptide may comprise a fragment of a parent polypeptide. In some embodiments, a useful polypeptide as may comprise a plurality of fragments, each of which is found in the same parent polypeptide in a different spatial arrangement relative to one another than is found in the polypeptide of interest (e.g., fragments that are directly linked in the parent may be spatially separated in the polypeptide of interest or vice versa, and/or fragments may be present in a different order in the polypeptide of interest than in the parent), so that the polypeptide of interest is a derivative of its parent polypeptide.

Prevent or prevention: As used herein when used in connection with the occurrence of a disease, disorder, and/or condition, refers to reducing the risk of developing the disease, disorder and/or condition and/or to delaying onset of one or more characteristics or symptoms of the disease, disorder or condition. Prevention may be considered complete when onset of a disease, disorder or condition has been delayed for a predefined period of time.

Recombinant: As used herein, the term "recombinant" is intended to refer to polypeptides that are designed, engineered, prepared, expressed, created, manufactured, and/or or isolated by recombinant means, such as polypeptides expressed using a recombinant expression vector transfected into a host cell; polypeptides isolated from a recombinant, combinatorial human polypeptide library; polypeptides isolated from an animal (e.g., a mouse, rabbit, sheep, fish, etc.) that is transgenic for or otherwise has been manipulated to express a gene or genes, or gene components that encode and/or direct expression of the polypeptide or one or more component(s), portion(s), element(s), or domain(s) thereof; and/or polypeptides prepared, expressed, created or isolated by any other means that involves splicing or ligating selected nucleic acid sequence elements to one another, chemically synthesizing selected sequence elements, and/or otherwise generating a nucleic acid that encodes and/or directs expression of the polypeptide or one or more component(s), portion(s), element(s), or domain(s) thereof. In some embodiments, one or more of such selected sequence elements is found in nature. In some embodiments, one or more of such selected sequence elements is designed in silico. In some embodiments, one or more such selected sequence elements results from mutagenesis (e.g., in vivo or in vitro) of a known sequence element, e.g., from a natural or synthetic source such as, for example, in the germline of a source organism of interest (e.g., of a human, a mouse, etc.).

Small molecule: As used herein, the term "small molecule" means a low molecular weight organic and/or inorganic compound. In general, a "small molecule" is a molecule that is less than about 5 kilodaltons (kD) in size. In some embodiments, a small molecule is less than about 4 kD, 3 kD, about 2 kD, or about 1 kD. In some embodiments, the small molecule is less than about 800 daltons (D), about 600 D, about 500 D, about 400 D, about 300 D, about 200 D, or about 100 D. In some embodiments, a small molecule is less than about 2000 g/mol, less than about 1500 g/mol, less than about 1000 g/mol, less than about 800 g/mol, or less than about 500 g/mol. In some embodiments, a small molecule is not a polymer. In some embodiments, a small molecule does not include a polymeric moiety. In some embodiments, a small molecule is not and/or does not comprise a protein or polypeptide (e.g., is not an oligopeptide or peptide). In some embodiments, a small molecule is not and/or does not comprise a polynucleotide (e.g., is not an oligonucleotide). In some embodiments, a small molecule is not and/or does not comprise a polysaccharide; for example, in some embodiments, a small molecule is not a glycoprotein, proteoglycan, glycolipid, etc.). In some embodiments, a small molecule is not a lipid. In some embodiments, a small molecule is a modulating agent (e.g., is an inhibiting agent or an activating agent). In some embodiments, a small molecule is biologically active. In some embodiments, a small molecule is detectable (e.g., comprises at least one detectable moiety). In some embodiments, a small molecule is a therapeutic agent. Those of ordinary skill in the art, reading the present disclosure, will appreciate that certain small molecule compounds described herein may be provided and/or utilized in any of a variety of forms such as, for example, crystal forms, salt forms, protected forms, prodrug forms, ester forms, isomeric forms (e.g., optical and/or structural isomers), isotopic forms, etc. Those of skill in the art will appreciate that certain small molecule compounds have structures that can exist in one or more stereoisomeric forms. In some embodiments, such a small molecule may be utilized in accordance with the present disclosure in the form of an individual enantiomer, diastereomer or geometric isomer, or may be in the form of a mixture of stereoisomers; in some embodiments, such a small molecule may be utilized in accordance with the present disclosure in a racemic mixture form. Those of skill in the art will appreciate that certain small molecule compounds have structures that can exist in one or more tautomeric forms. In some embodiments, such a small molecule may be utilized in accordance with the present disclosure in the form of an individual tautomer, or in a form that interconverts between tautomeric forms. Those of skill in the art will appreciate that certain small molecule compounds have structures that permit isotopic substitution (e.g., $^2$H or $^3$H for H; $^{11}$C, $^{13}$C or $^{14}$C for $^{12}$C; $^{13}$N or $^{15}$N for $^{14}$N; $^{17}$O or $^{18}$O for $^{16}$O; $^{36}$Cl for $^{35}$Cl; $^{18}$F for $^{19}$F; $^{131}$I or $^{125}$I for $^{127}$I; etc.). In some embodiments, such a small molecule may be utilized in accordance with the present disclosure in one or more isotopically modified forms, or mixtures thereof. In some embodiments, reference to a particular small molecule compound may relate to a specific form of that compound. In some embodiments, a particular small molecule compound may be provided and/or utilized in a salt form (e.g., in an acid-addition or base-addition salt form, depending on the compound); in some such embodiments, the salt form may be a pharmaceutically-acceptable salt form. In some embodiments, where a small molecule compound is one that exists or is found in nature, that compound may be provided and/or utilized in accordance in the present disclosure in a form different from that in which it exists or is found in nature. Those of ordinary skill in the art will appreciate that, in some embodiments, a preparation of a particular small molecule compound that contains an absolute or relative amount of the compound, or of a particular form thereof, that is different from the absolute or relative (with respect to another component of the preparation including, for example, another form of the compound) amount of the compound or form that is present in a reference preparation of interest (e.g., in a primary sample from a source of interest such as a biological or environmental source) is distinct from the compound as it exists in the reference preparation or source. Thus, in some embodiments, for example, a preparation of a single stereoisomer of a small molecule compound may be considered to be a different form of the compound than a racemic mixture of the compound; a particular salt of a small molecule compound may be considered to be a different form from another salt form of the compound; a preparation that contains only a form of the compound that contains one conformational isomer ((Z) or (E)) of a double bond may be considered to be a different form of the compound from one that contains the other conformational isomer ((E) or (Z)) of the double bond; a preparation in which one or more atoms is a different isotope than is present in a reference preparation may be considered to be a different form; etc.

Specific binding: As used herein, the term "specific binding" refers to an ability to discriminate between possible binding partners in the environment in which binding is to occur. A binding agent that interacts with one particular target when other potential targets are present is said to "bind specifically" to the target (e.g., a target amino acid or nucleic acid sequence on a target protein/gene of interest) with which it interacts. In some embodiments, specific binding is assessed by detecting or determining degree of association between the binding agent and its partner; in some embodiments, specific binding is assessed by detecting or determining degree of dissociation of a binding agent-partner complex; in some embodiments, specific binding is assessed by detecting or determining ability of the binding agent to compete an alternative interaction between its partner and another entity. In some embodiments, specific binding is assessed by performing such detections or determinations across a range of concentrations.

Specificity: As is known in the art, "specificity" is a measure of the ability of a particular ligand to distinguish its binding partner from other potential binding partners.

Subject: As used herein, the term "subject" refers an organism, typically a mammal (e.g., a human, in some embodiments including prenatal human forms). In some embodiments, a subject is suffering from a relevant disease, disorder or condition (e.g., Alzheimer's disease (AD) or other disease characterized by neurodegeneration). In some embodiments, a subject is susceptible to a disease, disorder, or condition. In some embodiments, a subject displays one or more symptoms or characteristics of a disease, disorder or condition. In some embodiments, a subject does not display any symptom or characteristic of a disease, disorder, or condition. In some embodiments, a subject is someone with one or more features characteristic of susceptibility to or risk of a disease, disorder, or condition. In some embodiments, a subject is a patient. In some embodiments, a subject is an individual to whom diagnosis and/or therapy is and/or has been administered.

Substantially: As used herein, the term "substantially" refers to the qualitative condition of exhibiting total or near-total extent or degree of a characteristic or property of interest. One of ordinary skill in the biological arts will understand that biological and chemical phenomena rarely, if ever, go to completion and/or proceed to completeness or achieve or avoid an absolute result. The term "substantially" is therefore used herein to capture the potential lack of completeness inherent in many biological and chemical phenomena.

Substantial identity: As used herein refers to a comparison between amino acid or nucleic acid sequences. As will be appreciated by those of ordinary skill in the art, two sequences are generally considered to be "substantially identical" if they contain identical residues in corresponding positions. As is well known in this art, amino acid or nucleic acid sequences may be compared using any of a variety of algorithms, including those available in commercial computer programs such as BLASTN for nucleotide sequences and BLASTP, gapped BLAST, and PSI-BLAST for amino acid sequences. Exemplary such programs are described in Altschul et al., Basic local alignment search tool, J. Mol. Biol., 215(3): 403-410, 1990; Altschul et al., Methods in Enzymology; Altschul et al., Nucleic Acids Res. 25:3389-3402, 1997; Baxevanis et al., Bioinformatics: A Practical Guide to the Analysis of Genes and Proteins, Wiley, 1998; and Misener, et al, (eds.), Bioinformatics Methods and Protocols (Methods in Molecular Biology, Vol. 132), Humana Press, 1999. In addition to identifying identical sequences, the programs mentioned above typically provide an indication of the degree of identity. In some embodiments, two sequences are considered to be substantially identical if at least 50%, 55%, 60%, 65%, 70%, 75%, 80%, 85%, 90%, 91%, 92%, 93%, 94%, 95%, 96%, 97%, 98%, 99% or more of their corresponding residues are identical over a relevant stretch of residues. In some embodiments, the relevant stretch is a complete sequence. In some embodiments, the relevant stretch is at least 10, 15, 20, 25, 30, 35, 40, 45, 50, 55, 60, 65, 70, 75, 80, 85, 90, 95, 100, 125, 150, 175, 200, 225, 250, 275, 300, 325, 350, 375, 400, 425, 450, 475, 500 or more residues.

Suffering from: An individual who is "suffering from" a disease, disorder, and/or condition (e.g., Alzheimer's disease (AD) or other disease characterized by neurodegeneration) has been diagnosed with and/or displays one or more symptoms of a disease, disorder, and/or condition.

Susceptible to: An individual who is "susceptible to" a disease, disorder, and/or condition (e.g., Alzheimer's disease (AD) or other disease characterized by neurodegeneration) is one who has a higher risk of developing the disease, disorder, and/or condition than does a member of the general public. In some embodiments, an individual who is susceptible to a disease, disorder and/or condition may not have been diagnosed with the disease, disorder, and/or condition. In some embodiments, an individual who is susceptible to a disease, disorder, and/or condition may exhibit symptoms of the disease, disorder, and/or condition. In some embodiments, an individual who is susceptible to a disease, disorder, and/or condition may not exhibit symptoms of the disease, disorder, and/or condition. In some embodiments, an individual who is susceptible to a disease, disorder, and/or condition will develop the disease, disorder, and/or condition. In some embodiments, an individual who is susceptible to a disease, disorder, and/or condition will not develop the disease, disorder, and/or condition.

Symptoms are reduced: According to the present invention, "symptoms are reduced" when one or more symptoms of a particular disease, disorder or condition (e.g., Alzheimer's disease (AD) or other disease characterized by neurodegeneration) is reduced in magnitude (e.g., intensity, severity, etc.) and/or frequency. For purposes of clarity, a delay in the onset of a particular symptom is considered one form of reducing the frequency of that symptom.

Target gene: A "target gene", as used herein, refers to a gene whose expression is to be modulated, e.g., through modifying splice activity (e.g., by inducing exon-skipping). As used herein, the term "target portion" or "target region" refers to a contiguous portion of the nucleotide sequence of a target gene. In some embodiments, a target portion or target region is one or more exons within the target gene sequence. A target portion may be from about 8-36 nucleotides in length, e.g., about 10-20 or about 15-30 nucleotides in length. A target portion length may have specific value or subrange within the afore-mentioned ranges. For example, in certain embodiments a target portion may be between about 15-29, 15-28, 15-27, 15-26, 15-25, 15-24, 15-23, 15-22, 15-21, 15-20, 15-19, 15-18, 15-17, 18-30, 18-29, 18-28, 18-27, 18-26, 18-25, 18-24, 18-23, 18-22, 18-21, 18-20, 19-30, 19-29, 19-28, 19-27, 19-26, 19-25, 19-24, 19-23, 19-22, 19-21, 19-20, 20-30, 20-29, 20-28, 20-27, 20-26, 20-25, 20-24, 20-23, 20-22, 20-21, 21-30, 21-29, 21-28, 21-27, 21-26, 21-25, 21-24, 21-23, or 21-22 nucleotides in length.

Therapeutic agent: As used herein, the phrase "therapeutic agent" refers to any agent that, when administered to a subject, has a therapeutic effect and/or elicits a desired biological and/or pharmacological effect. In some embodiments, a therapeutic agent is any substance that can be used to alleviate, ameliorate, relieve, inhibit, prevent, delay onset of, reduce severity of, and/or reduce incidence of one or more symptoms or features of a disease, disorder, and/or condition (e.g., one or more symptoms or features of Alzheimer's disease (AD) or other disease characterized by neurodegeneration).

Therapeutically effective amount: As used herein, the term "therapeutically effective amount" means an amount of a substance (e.g., a therapeutic agent, composition, and/or formulation) that elicits a desired biological response when administered as part of a therapeutic dosing regimen. In some embodiments, a therapeutically effective amount of a substance is an amount that is sufficient, when administered to a subject suffering from or susceptible to a disease, disorder, and/or condition, to treat, diagnose, prevent, and/or delay the onset of the disease, disorder, and/or condition. As will be appreciated by those of ordinary skill in this art, the effective amount of a substance may vary depending on such factors as the desired biological endpoint, the substance to be delivered, the target cell or tissue, etc. For example, the effective amount of compound in a formulation to treat a disease, disorder, and/or condition is the amount that alleviates, ameliorates, relieves, inhibits, prevents, delays onset of, reduces severity of and/or reduces incidence of one or more symptoms or features of the disease, disorder, and/or condition (e.g., one or more symptoms or features of Alzheimer's disease (AD) or another disease characterized by neurodegeneration). In some embodiments, a therapeutically effective amount is administered in a single dose; in some embodiments, multiple unit doses are required to deliver a therapeutically effective amount.

Treating: As used herein, the term "treating" refers to providing treatment, i.e., providing any type of medical or surgical management of a subject. The treatment can be provided in order to reverse, alleviate, inhibit the progression of, prevent or reduce the likelihood of a disease, disorder, or condition, or in order to reverse, alleviate, inhibit or prevent the progression of, prevent or reduce the likelihood of one or more symptoms or manifestations of a disease, disorder or condition. Treating can include administering an agent to the subject following the development of one or more symptoms or manifestations indicative of Alzheimer's disease (AD) or another other disease characterized by neurodegeneration, e.g., in order to reverse, alleviate, reduce the severity of, and/or inhibit or prevent the progression of the condition and/or to reverse, alleviate, reduce the severity of, and/or inhibit or one or more symptoms or manifestations of the condition. A composition of the disclosure can be administered to a subject who has developed Alzheimer's disease (AD) or another other disease characterized by neurodegeneration or is at increased risk of developing such a disorder relative to a member of the general population. A composition of the disclosure can be administered prophylactically, i.e., before development of any symptom or manifestation of the condition. Typically in this case the subject will be at risk of developing the condition.

Variant: As used herein in the context of molecules, e.g., nucleic acids (e.g., antisense oligonucleotides (ASOs)), proteins, or small molecules, the term "variant" refers to a molecule that shows significant structural identity with a reference molecule but differs structurally from the reference molecule, e.g., in the presence or absence or in the level of one or more chemical moieties as compared to the reference entity. In some embodiments, a variant also differs functionally from its reference molecule. In general, whether a particular molecule is properly considered to be a "variant" of a reference molecule is based on its degree of structural identity with the reference molecule. As will be appreciated by those skilled in the art, any biological or chemical reference molecule has certain characteristic structural elements. A variant, by definition, is a distinct molecule that shares one or more such characteristic structural elements but differs in at least one aspect from the reference molecule. To give but a few examples, a polypeptide may have a characteristic sequence element comprised of a plurality of amino acids having designated positions relative to one another in linear or three-dimensional space and/or contributing to a particular structural motif and/or biological function; a nucleic acid may have a characteristic sequence element comprised of a plurality of nucleotide residues having designated positions relative to on another in linear or three-dimensional space. In some embodiments, a variant polypeptide or nucleic acid may differ from a reference polypeptide or nucleic acid as a result of one or more differences in amino acid or nucleotide sequence and/or one or more differences in chemical moieties (e.g., carbohydrates, lipids, phosphate groups) that are covalently components of the polypeptide or nucleic acid (e.g., that are attached to the polypeptide or nucleic acid backbone). In some embodiments, a variant polypeptide or nucleic acid shows an overall sequence identity with a reference polypeptide or nucleic acid that is at least 85%, 86%, 87%, 88%, 89%, 90%, 91%, 92%, 93%, 94%, 95%, 96%, 97%, or 99%. In some embodiments, a variant polypeptide or nucleic acid does not share at least one characteristic sequence element with a reference polypeptide or nucleic acid. In some embodiments, a reference polypeptide or nucleic acid has one or more biological activities. In some embodiments, a variant polypeptide or nucleic acid shares one or more of the biological activities of the reference polypeptide or nucleic acid. In some embodiments, a variant polypeptide or nucleic acid lacks one or more of the biological activities of the reference polypeptide or nucleic acid. In some embodiments, a variant polypeptide or nucleic acid shows a reduced level of one or more biological activities as compared to the reference polypeptide or nucleic acid. In some embodiments, a polypeptide or nucleic acid of interest is considered to be a "variant" of a reference polypeptide or nucleic acid if it has an amino acid or nucleotide sequence that is identical to that of the reference but for a small number of sequence alterations at particular positions. Typically, fewer than about 20%, about 15%, about 10%, about 9%, about 8%, about 7%, about 6%, about 5%, about 4%, about 3%, or about 2% of the residues in a variant are substituted, inserted, or deleted, as compared to the reference. In some embodiments, a variant polypeptide or nucleic acid comprises about 10, about 9, about 8, about 7, about 6, about 5, about 4, about 3, about 2, or about 1 substituted residues as compared to a reference. Often, a variant polypeptide or nucleic acid comprises a very small number (e.g., fewer than about 5, about 4, about 3, about 2, or about 1) number of substituted, inserted, or deleted, functional residues (i.e., residues that participate in a particular biological activity) relative to the reference. In some embodiments, a variant polypeptide or nucleic acid comprises not more than about 5, about 4, about 3, about 2, or about 1 addition or deletion, and, in some embodiments, comprises no additions or deletions, as compared to the reference. In some embodiments, a variant polypeptide or nucleic acid comprises fewer than about 25, about 20, about 19, about 18, about 17, about 16, about 15, about 14, about 13, about 10, about 9, about 8, about 7, about 6, and commonly fewer than about 5, about 4, about 3, or about 2 additions or deletions as compared to the reference. In some embodiments, a reference polypeptide or nucleic acid is one found in nature. In some embodiments, a reference polypeptide or nucleic acid is a human polypeptide or nucleic acid.

Vector: As used herein, the term "vector" refers to a nucleic acid molecule capable of transporting another nucleic acid to which it has been linked. One type of vector is a "plasmid", which refers to a circular double stranded DNA loop into which additional DNA segments may be ligated. Another type of vector is a viral vector, wherein additional DNA segments may be ligated into the viral genome. Certain vectors are capable of autonomous replication in a host cell into which they are introduced (e.g., bacterial vectors having a bacterial origin of replication and episomal mammalian vectors). Other vectors (e.g., non-episomal mammalian vectors) can be integrated into the genome of a host cell upon introduction into the host cell, and thereby are replicated along with the host genome. Moreover, certain vectors are capable of directing the expression of genes to which they are operatively linked. Such vectors are referred to herein as "expression vectors". Standard techniques may be used for recombinant DNA, oligonucleotide synthesis, and tissue culture and transformation (e.g., electroporation, lipofection). Enzymatic reactions and purification techniques may be performed according to manufacturer's specifications or as commonly accomplished in the art or as described herein. The foregoing techniques and procedures may be generally performed according to conventional methods well known in the art and as described in various general and more specific references that are cited and discussed throughout the present specification. See, e.g., MOLECULAR CLONING: A LABORATORY MANUAL (2012).

Unless otherwise defined herein, scientific and technical terms used in connection with the present application shall have the meanings that are commonly understood by those of ordinary skill in the art to which this disclosure belongs. It should be understood that this invention is not limited to the particular methodology, protocols, and reagents, etc., described herein and as such can vary. The terminology used herein is for the purpose of describing particular embodiments only and is not intended to limit the scope of the present invention, which is defined solely by the claims. Definitions of common terms in immunology and molecular biology can be found in THE MERCK MANUAL OF DIAGNOSIS AND THERAPY; THE ENCYCLOPEDIA OF MOLECULAR CELL BIOLOGY AND MOLECULAR MEDICINE; MOLECULAR BIOLOGY AND BIOTECHNOLOGY: A COMPREHENSIVE DESK REFERENCE; IMMUNOLOGY; JANEWAY'S IMMUNOBIOLOGY; LEWIN'S GENES XI; MOLECULAR CLONING: A LABORATORY MANUAL; BASIC METHODS IN MOLECULAR BIOLOGY; LABORATORY METHODS IN ENZYMOLOGY; CURRENT PROTOCOLS IN MOLECULAR BIOLOGY (CPMB); CURRENT PROTOCOLS IN PROTEIN SCIENCE (CPPS); and CURRENT PROTOCOLS IN IMMUNOLOGY (CPI).

In some embodiments of any of the aspects, the disclosure described herein does not concern a process for cloning human beings, processes for modifying the germ line genetic identity of human beings, uses of human embryos for industrial or commercial purposes or processes for modifying the genetic identity of animals which are likely to cause them suffering without any substantial medical benefit to man or animal, and also animals resulting from such processes.

Other terms are defined herein within the description of the various aspects of the invention.

Detailed Description of Certain Embodiments

Neurogenesis

Neurogenesis occurs in distinct regions of the adult mammalian brain. Neural stem cells (NSCs) are the endogenous source of new neurons and are active throughout life in virtually all mammals, including humans (Eriksson et al., 1998; Ernst et al., 2014; Moreno-Jimenez et al., 2019; Spalding et al., 2013). Extensive work in rodent models shows that neurogenesis supports learning and memory, sensory functions, and mood regulation (Enwere et al., 2004; Gage, 2019; Imayoshi et al., 2008; Zhang et al., 2008b). NSCs reside in two neurogenic niches: the subgranular zone (SGZ) in the dentate gyrus of the hippocampus and the subventricular zone (SVZ) lining the lateral ventricles. NSCs in the SVZ generate astrocytes and oligodendrocytes that support the existing circuitry as well as neurons in the olfactory bulb that are critical for olfactory discrimination. NSCs in the dentate gyrus give rise to granule neurons important for learning and memory. The majority of NSCs in the human brain are located in the hippocampus. Most hippocampal NSCs reside in a state of dormancy, termed quiescence. For neurogenesis to occur, quiescent NSCs must become activated in response to extrinsic or intrinsic cues. Newly born neurons functionally integrate into the local circuitry within the hippocampus and contribute to cognitive functions. The capacity of quiescent NSCs to activate declines during healthy and pathological aging and this loss precedes the decline in cognition (Enwere et al., 2004; Giachino et al., 2014; Capilla-Gonzalez et al., 2014).

Recent work indicates that endogenous or exogenous NSCs may be a valuable source of new neurons for the millions of individuals suffering from cognitive decline or brain injury. Activation of endogenous NSCs through exercise, re-feeding, or young blood improves age-related cognitive impairments in mice (Brandhorst et al., 2015; van Praag et al., 2005; Villeda et al., 2011, 2014). Accumulation of negative signals that degrade the neurogenic niche may contribute to reduction in newborn neurons in aging and AD. However, it has been difficult to harness the neurogenic potential of NSCs due to the lack of a specific therapeutic target that has the ability to overcome inhibitory signals. The present disclosure appreciates that recent mechanistic studies suggest that BMP signaling may represent a promising pathway to target in the context of AD and other diseases characterized by neurodegeneration. BMPs negatively regulate activation of NSCs (Mira et al., 2010) and are upregulated in AD and APP transgenic mice (Crews et al., 2010). The present disclosure provides technologies to specifically modulate BMP signaling in the neurogenic niche.

Adult Hippocampal Neurogenesis

Adult Hippocampal Neurogenesis (AHN) is critical for normal learning and memory. AHN is abundant in healthy aged humans but is reduced from the earliest stages of Alzheimer's Disease (AD). AHN occurs throughout life in humans and is dramatically reduced in AD (Moreno-Jimenez et al., 2019; Steiner et al., 2019). Work in animal models has underscored the role of AHN in improving cognition in the face of AD pathology. Thus, restoring AHN may be an attractive target for an AD therapy. Interventions that promote adult hippocampal neurogenesis could enhance cognitive function and combat neurodegeneration.

AHN is critical for learning and memory. Newborn dentate granule cells are hyperexcitable and exhibit robust synaptic plasticity. Thus, dysregulation of the quiescent state and/or a failure to integrate into the mature circuitry are thought to contribute to the age-associated decline in neurogenesis and cognitive performance in aging and dementia.

AHN in Humans. Although AHN has been established in rodents and other species for decades, the existence of this process in human has been controversial until quite recently. Reports using BrdU incorporation (Eriksson et al., 1998), $^{14}C$ dating (Ernst et al., 2014; Spalding et al., 2013) and markers of immature neuron (Boldrini et al., 2018; Moreno-Jimenez et al., 2019; Tobin et al., 2019) have provided independent lines of support from multiple labs supporting human AHN. Mathematical modeling of radiocarbon birth dating data yielded estimates that in humans 35% of hippocampal neurons are replaced by newborn neurons during adulthood at a rate of 1.75% per year (Spalding et al., 2013).

On the other hand, another recent report using markers for immature neurons failed to detect significant levels of AHN in adult humans (Sorrells et al., 2018). In depth comparison of these reports have revealed several methodological and sample differences that seem likely to explain the failure to detect adult neurogenesis the Sorrells et al., paper (Kempermann et al., 2018; Lucassen et al., 2019).

AHN and Alzheimer's Disease. Alzheimer's Disease is a devastating disorder. It is progressive, fatal and has an enormous societal and economic cost. Over 5.8 million Americans are living with AD. By 2050, this number is projected to rise to over 14 million. In 2019, AD and other dementias will cost the nation $290 billion. By 2050, these costs could rise as high as $1.1 trillion. There are no effective treatments. There have been several recent high profile drug trial failures in AD, including the discontinuation for futility of the aducanumab trial by Biogen. Almost all of these trails have been based upon the 'amyloid hypothesis', which is increasingly is being viewed as insufficient and perhaps even irrelevant to AD therapy. There is an enormous unmet need for Innovative and effective therapies for AD. Alzheimer's Disease devastates the hippocampus, a brain region necessary for encoding memories. The hippocampus is one of the two sites of adult neurogenesis in the brain. A large number of animal studies have shown that these adult-born neurons are necessary for learning and memory. A recent crucial study provided convincing evidence for robust neurogenesis in the adult human brain. Importantly, the level adult neurogenesis in AD brain is greatly diminished compared to age-matched controls. See Editorial in Nature (567:433; 28 Mar. 2019. Thus, promoting adult neurogenesis is emerging as a highly attractive target in treating AD.

The hippocampus is one of the earliest and most affected brain regions in AD and its atrophy is a hallmark of disease progression (Allison et al., 2019). Moreover, work in both rodents and humans has demonstrated that hippocampal-dependent learning is impaired in the Alzheimer's setting (Crews et al., 2010). Notably, AHN levels in AD patients are only 30% of those observed in age-matched controls (Moreno-Jimenez et al., 2019). Critically, a recent mouse study using genetically diverse AD mouse models showed that the total number of hippocampal neurons (NeuN+ cells) correlates with cognition (Neuner Neuron 2019). Finally, a recent study has shown that exercise-mediated rescue of pathology in AD mice requires AHN, and that AHN ablation alone exacerbates cognitive defects in these mice (Choi et al., 2018). Thus, strategies to compensate for the degeneration of hippocampal neurons through enhancing endogenous neurogenesis have the potential to open a new pathway for treating Alzheimer's disease.

Other diseases associated with impaired AHN include, e.g., diseases and disorders associated with progressive memory loss, such as Frontotemporal Dementia (Terreros-Roncal et al., 2019), stroke (Lindvall et al., 2015). Impaired AHN is also associated with psychiatric disorders such as major depressive disorder (MDD), bipolar disorder, schizophrenia, post-traumatic stress disorder (PTSD), substance-related and addictive disorders (Yun et al., 2016), and other diseases such as Temporal-Lobe Epilepsy (Cook et al., 1992), Hippocampal Sclerosis (Tai et al., 2018), Niemann Pick Type C (Hong et al., 2015), and Diabetes-mediated hippocampal neuronal loss (Ho et al, 2013; Gold et al., 2007).

Subventricular Zone Neurogenesis

In addition to the hippocampus (i.e., the subgranular zone (SGZ) in the dentate gyrus of the hippocampus), NSCs reside in the subventricular zone (SVZ) lining the lateral ventricles. NSCs in the SVZ generate astrocytes and oligodendrocytes that support the existing circuitry as well as neurons in the olfactory bulb that are critical for olfactory discrimination. Recent evidence suggests that SVZ NSCs can give rise to terminally differentiated neurons in the striatum in response to ischemic stroke or neurodegenerative diseases (Arvidsson et al., 2002; Parent et al., 2002; Thored et al., 2006; Ernst et al., 2014).

The present disclosure recognizes that strategies to compensate for the degeneration of neurons in the SVZ through enhancing endogenous neurogenesis have the potential to open a new pathway for treating diseases specifically associated with striatal neurogenesis such as Parkinsons' disease (which could benefit both from increasing AHN and striatal neurogenesis in the SVZ; Pitcher et al., 2012; Sterling et al., 2013) and Huntington's disease (Sassone et al., 2018). Other diseases including addiction (e.g., chronic cocaine use and lifelong cigarette smoking) are also associated with reduced striatal volume (Barrós-Loscertales et al., 2011; Das et al., 2012) and have the potential to be treated through enhancing endogenous neurogenesis in the SVZ.

MuSK

MuSK is a receptor tyrosine kinase comprised extracellularly of three Ig and one CRD/Fz domain and an intracellular tyrosine domain (TK; FIG. 1). The best understood function of MuSK is at the neuromuscular junction (NMJ) where agrin-LRP4 binding to the Ig1 domain triggers MuSK TK activity and synapse differentiation (Kim et al., 2008; Zhang et al., 2008a).

The MuSK-BMP Pathway. The brain harbors neural stem cells (NSCs) that generate neurons and glial cells throughout life (Moreno-Jimenez et al., 2019; Steiner et al., 2019). BMPs regulate at least two important NSC decision points: 1) quiescence, where proliferating stem cells exit the cell cycle and return to replenish a reserve pool that can supply fresh stem cells; and; 2) differentiation into mature progeny (Mira et al., 2010). The present disclosure contemplates that manipulating the BMP pathway in NSCs is an attractive target for regulating neurogenesis in the adult brain.

It was recently discovered that MuSK is also a BMP co-receptor that binds BMP and its receptors ALK3 and 6, upregulates BMP signaling and shapes the composition of the transcriptional response in myogenic cells (Yilmaz et al., 2016). This BMP signaling pathway neither requires nor requires MuSK TK activity nor is it activated by agrin-LRP4. Importantly, the MuSK Ig3 domain is necessary for high affinity BMP binding but is dispensable for agrin-LRP4 TK activation. Moreover, the Ig3 domain is endogenously alternatively spliced, including in the brain (Garcia-Osta et al., 2006; Hesser et al., 1999). Since BMP signaling induces NSC quiescence and can inhibit integration of newborn neurons we have found that restraining BMP drive by reducing MuSK-BMP signaling could increase neurogenesis (FIG. 1).

Yilmaz et al., 2016 discloses that the 'Ig3' domain of MuSK is required for high affinity binding of BMPs. The major species of MuSK expressed endogenously is full length. This Ig3 domain can be alternatively spliced endogenously, creating an isoform termed "Δg3MuSK". This splicing entails the coordinated removal of exons 6 and 7 from the MuSK pre-mRNA.

Exemplary amino acid sequences of human and mouse MuSK Ig3 domains (i.e., of MuSK Ig3 domain polypeptides) are as set out below:

```
MuSK HUMAN_Ig3_Domain:
                                              (SEQ ID NO: 1)
ARILRAPESHNVIFGSFVTLHCTATGIPVPTITWIENGNAVSSGSIQESVK

DRVIDSRLQLFITKPGLYTCIAINKHGEKFSTAKAAATIS

MuSK MOUSE Ig3 Domain
                                              (SEQ ID NO: 2)
ARILRAPESHNVTFGSFVTLRCTAIGIPVPTISWIENGNAVSSGSIQESVK

DRVIDSRLQLFITKPGLYTCIATNKHGEKFSTAKAAATVS
```

The present disclosure teaches that that regulating MuSK alternative splicing is a strategy for increasing AHN in AD.

MuSK Neurogenesis Agonizing Agents

In some embodiments, the present disclosure provides technologies for achieving (e.g., inducing, enhancing, etc.) neurogenesis in a subject by administering an agent (i.e., a MuSK neurogenesis (MuSK NG) agonizing agent) in whose presence MuSK neurogenesis level and/or activity in increased. For example, in some embodiments, a MuSK NG agonizing agent is an agent that increases level or activity of one or more MuSK polypeptides (e.g., ΔIg3-MuSK) that lacks an effective Ig3 domain, e.g., because such domain has been mutated, removed, or otherwise inactivated (e.g., by blocking, modification, etc.). Alternatively or additionally, in some embodiments, a MuSK NG agonizing agent is one that blocks, inactivates, mutates, or removes a functional Ig3 domain from MuSK, or achieves, supports, or contributes to such blocking, inactivation, mutation or removal.

In some embodiments, the present disclosure provides technologies that relate to MuSK NG agonizing agents—including, for example, providing such agents themselves, and/or providing methods and/or reagents for identifying, characterizing, manufacturing and/or using them and/or compositions that comprise and/or deliver them.

In some embodiments, a MuSK NG agonizing agent may interact directly with a MuSK polypeptide (e.g., with full-length MuSK and/or with ΔIg3-MuSK). In some embodiments, a MuSK NG agonizing agent may not interact directly with a MuSK polypeptide but rather, through some other interaction (e.g., with a precursor or regulator or downstream product of MuSK), impacts level and/or activity of ΔIg3-MuSK.

In principle, an ΔIg3-MuSK NG agonizing agent may be of any chemical class (e.g., small molecule, polypeptide [e.g., antibody], nucleic acid, etc.).

In some embodiments, a MuSK NG agonizing agent is agent that downregulates the MuSK Ig3 domain protein expression, the MuSK Ig3 domain gene expression, and/or the MuSK Ig3 activation of BMP signaling, thereby inducing neurogenesis.

In some embodiments, a MuSK NG agonizing agent is an agonizing agent that increases expression of MuSK ΔIg3.

In some particular embodiments, described in more detail herein, a MuSK NG agonizing agent may be or comprise a small molecule.

In some particular embodiments, described in more detail herein, a MuSK NG agonizing agent may be or comprise an antibody that binds to a MuSK polypeptide (e.g., an antibody that blocks MuSK Ig3 and/or that sequesters one or more MuSK polypeptide forms that include functional Ig3).

In some particular embodiments, described in more detail herein, a MuSK NG agonizing agent may be or comprise a nucleic acid agent. For example, in some embodiments, a MuSK NG agonizing agent may be or comprise a nucleic acid (e.g., a gene therapy vector or an RNA therapeutic such as an mRNA) encoding a MuSk form (e.g., ΔIg3-MuSK) that lacks a functional Ig3 domain. Alternatively or additionally, in some embodiments, a nucleic acid MuSK NG agonizing agent may be or comprise an oligonucleotide, such as a MuSK Ig3-targeted exon-skipping oligonucleotide, a MuSK Ig3-targeted CRISPR/Cas9 gRNA (e.g., that modifies and/or removes Ig3), a MuSK Ig3-targeted siRNA (e.g., that inhibits production/expression of MuSK Ig3, for example from a transcript that encodes it), and/or a MuSK Ig3-targeted shRNA.

Small Molecules

In some embodiments, a MuSK NG agonizing agent may be or comprise a small molecule compound.

In some embodiments, a small molecule MuSK NG agonizing agent targets therapeutic agent that targets MuSK splicing; for example, in some embodiments such a small molecule compound enhances splicing event(s) that generate(s) message encoding ΔIg3-MuSK and/or inhibits splicing event(s) that generate(s) message(s) encoding other MuSK splice variants. In some embodiments, a small molecule MuSK NG agonizing agent alters the BMP signaling pathway. In some embodiments, a small molecule MuSK NG agonizing agent alters the BMP signaling pathway which further induces neurogenesis.

In some embodiments, a small molecule MuSK NG agonizing agent targets one or more of type I BMP receptors, ALK3 (ALK is Anaplastic lymphoma kinase) and ALK6, and type I activin receptor ALK4. In some embodiments, a small molecule MuSK NG agonizing agent is an ALK inhibitor. In some embodiments, a small molecule MuSK NG agonizing agent is an ALK inhibitor selected from the group consisting of crizotinib, ceritinib, alectinib, brigatinib, lorlatinib.

In some embodiments, a small molecule MuSK NG agonizing agent targets the MuSK Ig3 domain and/or BMP so that level and/or activity of a MuSK/BMP complex is reduced. In some such embodiments, a small molecule MuSK NG agonizing agent inhibits formation of and/or disrupts such complex(es). In some embodiments, such a MuSK NG agonizing agent competes with BMP for binding to MuSK Ig3 and/or competes with MuSK Ig3 for binding to BMP.

Antibody Agents

In some embodiments, a MuSK NG agonizing agent is an antibody agent.

In some embodiments, such an antibody agent specifically binds to a MuSK polypeptide. In some embodiments, an antibody agent targeting MuSK specifically binds to the Ig3 domain of a MuSK polypeptide.

In some embodiments, an antibody targeting the Ig3 domain of MuSK protein may bind specifically to the Ig3 domain relative to the Ig1 or Ig2 domains of MuSK.

In some embodiments, an antibody MuSK NG agonizing agent targets the MuSK Ig3 domain and/or BMP so that level and/or activity of a MuSK/BMP complex is reduced. In some such embodiments, an antibody MuSK NG agonizing agent inhibits formation of and/or disrupts such complex (es). In some embodiments, such an antibody MuSK NG agonizing agent competes with BMP for binding to MuSK Ig3 and/or competes with MuSK Ig3 for binding to BMP.

In some embodiments, an anti-MUSK antibody agent is internalized by a cell (e.g., a cell with a neuronal cell type). In some embodiments, an antibody or antigen-binding fragment thereof described herein can be or comprise an immunoglobulin, heavy chain antibody, light chain antibody, or other protein scaffold with antibody-like properties, as well as other immunological binding moiety known in the art, including a Fab fragment, a Fab' fragment, a F(ab')2 fragment, a Fv fragment, a disulfide-bonded Fv fragment, a scFv fragment, a diabody, a triabody, a tetrabody, a minibody, a maxibody, a tandab, BiTe, and any combination thereof. In some embodiments, anti-MUSK antibodies or antigen-binding fragments thereof target, for example, the Ig3 domain of MUSK. In some embodiments, such antibodies, or antigen-binding fragments thereof, may inhibit or substantially prevent the binding of a BMP to the MuSK Ig3 domain.

An antibody can be an immunoglobulin molecule of four polypeptide chains, e.g., two heavy (H) chains and two light (L) chains. A heavy chain can include a heavy chain variable domain and a heavy chain constant domain. A heavy chain constant domain can include CH1, hinge, CH2, CH3, and in some instances CH4 regions. A light chain can include a light chain variable domain and a light chain constant domain. A light chain constant domain can include a CL. A heavy chain variable domain of a heavy chain and a light chain variable domain of a light chain can typically be further subdivided into regions of variability, termed complementarity determining regions (CDRs), interspersed with regions that are more conserved, termed framework regions (FR). Such heavy chain and light chain variable domains can each include three CDRs and four framework regions, arranged from amino-terminus to carboxyl-terminus in the following order: FR1, CDR1, FR2, CDR2, FR3, CDR3, FR4, one or more of which can be engineered as described herein.

In some embodiments, an antibody agent (e.g., anti-MUSK antibodies) can include various heavy chains and light chains described herein. In some embodiments, an antibody can include two heavy chains and light chains. In various embodiments, the present disclosure encompasses an antibody including at least one heavy chain and/or light chain as disclosed herein, at least one heavy chain and/or light chain framework domain as disclosed herein, at least one heavy chain and/or light chain CDR domain as disclosed herein, and/or any heavy chain and/or light chain constant domain as disclosed herein.

In some embodiments, an antibody agent is or comprises a monoclonal antibody. Typically, monoclonal antibodies are obtained from a population of substantially homogeneous antibodies, i.e., the individual antibodies comprising the population are substantially identical except for possible naturally occurring mutations that may be present in minor amounts. Thus, the modifier "monoclonal" as used herein, indicates the character of the antibody as not being a mixture of discrete antibodies. In some embodiments, monoclonal antibodies directed to a particular epitope are derived from a single cell line (e.g., a B cell line).

In some embodiments, an antibody agent (e.g., an anti-MUSK antibody) may be or comprise a polyclonal antibody. In contrast to monoclonal antibodies, polyclonal antibodies typically represent a population of heterogeneous antibodies, i.e., the antibodies in a particular population include structural variation, for example, affinity for different epitope(s) on a particular antigen (e.g., the Ig3 domain of MuSK, or a region within the Ig3 domain). Several methods of producing polyclonal antibodies are known in the art, including use of multiple subcutaneous and/or intraperitoneal injections of the relevant antigen into an animal, optionally including co-administration of one or more adjuvants.

Oligonucleotides

In some embodiments, a MuSK NG agonizing agent as described herein is or comprises an oligonucleotide.

Synthetic oligonucleotides provide useful molecular tools in a wide variety of applications. For example, oligonucleotides are useful in therapeutic, diagnostic, research, and new nanomaterials applications. The use of naturally occurring nucleic acids (e.g., unmodified DNA or RNA) is limited, for example, by their susceptibility to endo- and exo-nucleases. As such, various synthetic counterparts have been developed to circumvent these shortcomings. These include synthetic oligonucleotides that contain chemical modification, e.g., base modifications, sugar modifications, backbone modifications, etc., which, among other things, render these molecules less susceptible to degradation and improve other properties of oligonucleotides. Chemical modifications may also lead to certain undesired effects, such as increased toxicities, etc.

Among other things, the present disclosure encompasses the recognition that structural elements of oligonucleotides, such as base sequence, chemical modifications (e.g., modifications of sugar, base, and/or internucleotidic linkages, and patterns thereof), and/or stereochemistry (e.g., stereochemistry of backbone chiral centers (chiral internucleotidic linkages), and/or patterns thereof), can have significant impact on properties, e.g., stability, splicing-altering capabilities, etc. In some embodiments, oligonucleotide properties can be adjusted by optimizing chemical modifications (modifications of base, sugar, and/or internucleotidic linkage) and/or stereochemistry (pattern of backbone chiral centers).

In some embodiments, the present disclosure demonstrates that oligonucleotide compositions comprising oligonucleotides with controlled structural elements, e.g., controlled chemical modification, provide unexpected properties, including but not limited to those described herein. In some embodiments, provided compositions comprising oligonucleotides having chemical modifications (e.g., base modifications, sugar modification, internucleotidic linkage modifications, etc.) have improved properties, such as improved splicing-altering capabilities, or improved protein binding profile, and/or improved delivery, etc. Particularly, in some embodiments, the present disclosure provides compositions and methods for altering splicing of transcripts. In some embodiments, the present disclosure provides compositions and methods for improving splicing of transcripts. In some embodiments, altered transcript splicing by provided compositions and methods include production of products having desired and/or improved biological functions, and/or knockdown of undesired product by, e.g., modifying splicing products so that undesired biological functions can be suppressed or removed.

In some embodiments, a splicing product is mRNA. In some embodiments, alteration comprises skipping one or more exons. In some embodiments, splicing of a transcript is improved in that exon skipping increases levels of mRNA and proteins that have improved beneficial activities compared with absence of exon skipping.

In some embodiments, splicing of a transcript is improved in that exon skipping lowers levels of mRNA and proteins that have undesired activities compared with absence of exon skipping. In some embodiments, a target is knocked down through exon skipping which, by skipping one or more exons, causes premature stop codon and/or frameshift mutations.

In some embodiments, an oligonucleotide of the disclosure includes one or more natural nucleobase and/or one or more modified nucleobases derived from a natural nucleobase. Examples include, but are not limited to, uracil, thymine, adenine, cytosine, and guanine having their respective amino groups protected by acyl protecting groups, 2-fluorouracil, 2-fluorocytosine, 5-bromouracil, 5-iodouracil, 2,6-diaminopurine, azacytosine, pyrimidine analogs such as pseudoisocytosine and pseudouracil and other modified nucleobases such as 8-substituted purines, xanthine, or hypoxanthine (the latter two being the natural degradation products).

Modified nucleobases also include expanded-size nucleobases in which one or more aryl rings, such as phenyl rings, have been added.

In some embodiments, modified nucleobases are of any one of the following structures, optionally substituted:

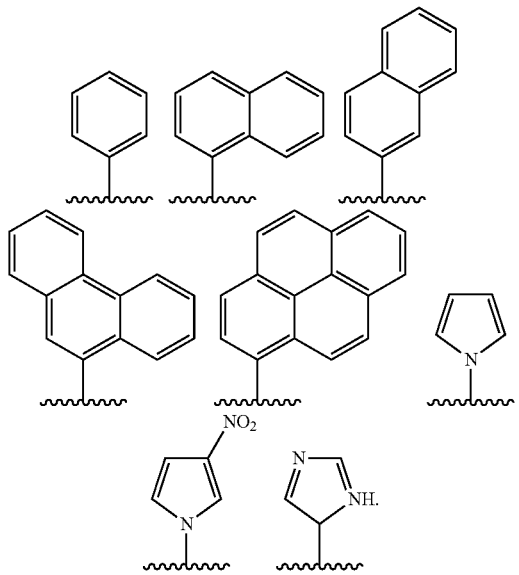

In some embodiments, a modified nucleobase is unsubstituted. In some embodiments, a modified nucleobase is substituted. In some embodiments, a modified nucleobase is substituted such that it contains, e.g., heteroatoms, alkyl groups, or linking moieties connected to fluorescent moieties, biotin or avidin moieties, or other protein or peptides. In some embodiments, a modified nucleobase is a "universal base" that is not a nucleobase in the most classical sense, but that functions similarly to a nucleobase. One representative example of such a universal base is 3-nitropyrrole.

In some embodiments, an oligonucleotide described herein includes nucleosides that incorporate modified nucleobases and/or nucleobases covalently bound to modified sugars. Some examples of nucleosides that incorporate modified nucleobases include 4-acetylcytidine; 5-(carboxyhydroxylmethyl)uridine; 2'-O-methylcytidine; 5-carboxymethylaminomethyl-2-thiouridine; 5-carboxymethylaminomethyluridine; dihydrouridine; 2'-O-methylpseudouridine; beta,D-galactosylqueosine; 2'-O-methylguanosine; $N^6$-isopentenyladenosine; 1-methyladenosine; 1-methylpseudouridine; 1-methylguanosine; I-methylinosine; 2,2-dimethylguanosine; 2-methyladenosine; 2-methylguanosine; $N^7$-methylguanosine; 3-methyl-cytidine; 5-methylcytidine; 5-hydroxymethylcytidine; 5-methylcytosine, 5-formylcytosine; 5-carboxylcytosine; $N^6$-methyladenosine; 7-methylguanosine; 5-methylaminoethyluridine; 5-methoxyaminomethyl-2-thiouridine; beta,D-mannosylqueosine; 5-methoxycarbonylmethyluridine; 5-methoxyuridine; 2-methylthio-$N^6$-isopentenyladenosine; N-((9-beta,D-ribofuranosyl-2-methylthiopurine-6-yl)carbamoyl)threonine; N-((9-beta,D-ribofuranosylpurine-6-yl)-N-methylcarbamoyl)threonine; uridine-5-oxyacetic acid methylester; uridine-5-oxyacetic acid (v); pseudouridine; queosine; 2-thiocytidine; 5-methyl-2-thiouridine; 2-thiouridine; 4-thiouridine; 5-methyluridine; 2'-O-methyl-5-methyluridine; and 2'-O-methyluridine.

In some embodiments, nucleosides include 6'-modified bicyclic nucleoside analogs that have either (R) or (S)-chirality at the 6'-position and include the analogs described in U.S. Pat. No. 7,399,845. In other embodiments, nucleosides include 5'-modified bicyclic nucleoside analogs that have either (R) or (S)-chirality at the 5'-position and include the analogs described in U.S. Publ. No. 20070287831. In some embodiments, a nucleobase or modified nucleobase is 5-bromouracil, 5-iodouracil, or 2,6-diaminopurine. In some embodiments, a nucleobase or modified nucleobase is modified by substitution with a fluorescent moiety.

In some embodiments, an oligonucleotide described herein includes one or more modified nucleotides wherein a phosphate group or linkage phosphorus in the nucleotides are linked to various positions of a sugar or modified sugar. As non-limiting examples, the phosphate group or linkage phosphorus can be linked to the 2', 3', 4' or 5' hydroxyl moiety of a sugar or modified sugar. Nucleotides that incorporate modified nucleobases as described herein are also contemplated in this context.

Other modified sugars can also be incorporated within an oligonucleotide molecule. In some embodiments, a modified sugar contains one or more substituents at the 2' position including one of the following: —F; —$CF_3$, —CN, —$N_3$, —NO, —$NO_2$, —OR', —SR', or —N(R')$_2$, wherein each R' is independently as defined above and described herein; —O—($C_1$-$C_{10}$ alkyl), —S—($C_1$-$C_{10}$ alkyl), —NH—($C_1$-$C_{10}$ alkyl), or —N($C_1$-$C_{10}$ alkyl)$_2$; —O—($C_2$-$C_{10}$ alkenyl), —S—($C_2$-$C_{10}$ alkenyl), —NH—($C_2$-$C_{10}$ alkenyl), or —N($C_2$-$C_{10}$ alkenyl)$_2$; —O—($C_2$-$C_{10}$ alkynyl), —S—($C_2$-$C_{10}$ alkynyl), —NH—($C_2$-$C_{10}$ alkynyl), or —N($C_2$-$C_{10}$ alkynyl)$_2$; or —O—($C_1$-$C_{10}$ alkylene)-O—($C_1$-$C_{10}$ alkyl), —O—($C_1$-$C_{10}$ alkylene)-NH—($C_1$-$C_{10}$ alkyl) or —O—($C_1$-$C_{10}$ alkylene)-NH($C_1$-$C_{10}$ alkyl)$_2$, —NH—($C_1$-$C_{10}$ alkylene)-O—($C_1$-$C_{10}$ alkyl), or —N($C_1$-$C_{10}$ alkyl)-($C_1$-$C_{10}$ alkylene)-O—($C_1$-$C_{10}$ alkyl), wherein the alkyl, alkylene, alkenyl and alkynyl may be substituted or unsubstituted. Examples of substituents include, and are not limited to, —O($CH_2$)$_n$OCH$_3$, and —O($CH_2$)$_n$NH$_2$, wherein n is from 1 to about 10, MOE, DMAOE, DMAEOE.

In some embodiments, the 2'-OH of a ribose is replaced with a substituent including one of the following: —H, —F; —$CF_3$, —CN, —$N_3$, —NO, —$NO_2$, —OR', —SR', or —N(R')$_2$, wherein each R' is independently as defined above and described herein; —O—($C_1$-$C_{10}$ alkyl), —S—($C_1$-$C_{10}$ alkyl), —NH—($C_1$-$C_{10}$ alkyl), or —N($C_1$-$C_{10}$ alkyl)$_2$; —O—($C_2$-$C_{10}$ alkenyl), —S—($C_2$-$C_{10}$ alkenyl), —NH—($C_2$-$C_{10}$ alkenyl), or —N($C_2$-$C_{10}$ alkenyl)$_2$; —O—($C_2$-$C_{10}$ alkynyl), —S—($C_2$-$C_{10}$ alkynyl), —NH—($C_2$-$C_{10}$ alkynyl), or —N($C_2$-$C_{10}$ alkynyl)$_2$; or —O—($C_1$-$C_{10}$ alkylene)-O—($C_1$-$C_{10}$ alkyl), —O—($C_1$-$C_{10}$ alkylene)-NH—($C_1$-$C_{10}$ alkyl) or —O—($C_1$-$C_{10}$ alkylene)-NH($C_1$-$C_{10}$ alkyl)$_2$, —NH—($C_1$-$C_{10}$ alkylene)-O—($C_1$-$C_{10}$ alkyl), or —N($C_1$-$C_{10}$ alkyl)-($C_1$-$C_{10}$ alkylene)-O—($C_1$-$C_{10}$ alkyl), wherein the alkyl, alkylene, alkenyl and alkynyl may be substituted or unsubstituted. In some embodiments, the 2'-OH is replaced with —H (deoxyribose). In some embodiments, the 2'-OH is replaced with —F. In some embodiments, the 2'-OH is replaced with —OR'. In some embodiments, the 2'-OH is replaced with —OMe. In some embodiments, the 2'-OH is replaced with —OCH$_2$CH$_2$OMe (MOE).

Modified sugars also include locked nucleic acids (LNAs). In some embodiments, the locked nucleic acid has the structure indicated below. A locked nucleic acid of the structure below is indicated, wherein Ba represents a nucleobase or modified nucleobase as described herein and wherein $R^{2s}$ is —OCH$_2$C4'-

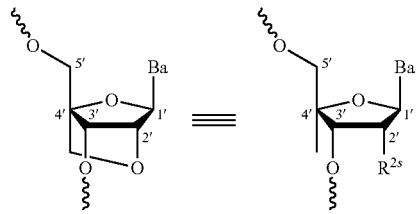

C2'OCH$_2$C4' = LNA
(Locked Nucleic Acid)

$R^{2s}$ = OCH$_2$C4'

In some embodiments, the present invention provides an oligonucleotide comprising one or more modified internucleotidic linkages independently having the structure of formula I:

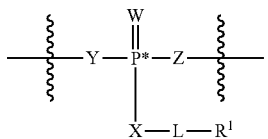

(I)

wherein:
P* is an asymmetric phosphorus atom and is either Rp or Sp;
W is O, S or Se;
each of X, Y and Z is independently —O—, —S—, —N(-L-R$^1$)—, or L;
L is a covalent bond or an optionally substituted, linear or branched C$_1$-C$_{10}$ alkylene, wherein one or more methylene units of L are optionally and independently replaced by an optionally substituted C$_1$-C$_6$ alkylene, C$_1$-C$_6$ alkenylene, —C≡C—, —C(R')$_2$—, -Cy-, —O—, —S—, —S—S—, —N(R')—, —C(O)—, —C(S)—, —C(NR')—, —C(O)N(R')—, —N(R')C(O)N(R')—, —N(R')C(O)—, —N(R')C(O)O—, —OC(O)N(R')—, —S(O)—, —S(O)$_2$—, —S(O)$_2$N(R')—, —N(R')S(O)$_2$—, —SC(O)—, —C(O)S—, —OC(O)—, or —C(O)O—;
R$^1$ is halogen, R, or an optionally substituted C$_1$-C$_{50}$ aliphatic wherein one or more methylene units are optionally and independently replaced by an optionally substituted C$_1$-C$_6$ alkylene, C$_1$-C$_6$ alkenylene, —C≡C—, —C(R')$_2$—, -Cy-, —O—, —S—, —S—S—, —N(R')—, —C(O)—, —C(S)—, —C(NR')—, —C(O)N(R')—, —N(R')C(O)N(R')—, —N(R')C(O)—, —N(R')C(O)O—, —OC(O)N(R')—, —S(O)—, —S(O)$_2$—, —S(O)$_2$N(R')—, —N(R')S(O)$_2$—, —SC(O)—, —C(O)S—, —OC(O)—, or —C(O)O—;
each R' is independently —R, —C(O)R, —CO$_2$R, or —SO$_2$R, or:
two R' on the same nitrogen are taken together with their intervening atoms to form an optionally substituted heterocyclic or heteroaryl ring, or
two R' on the same carbon are taken together with their intervening atoms to form an optionally substituted aryl, carbocyclic, heterocyclic, or heteroaryl ring;

-Cy- is an optionally substituted bivalent ring selected from phenylene, carbocyclylene, arylene, heteroarylene, or heterocyclylene;
each R is independently hydrogen, or an optionally substituted group selected from C$_1$-C$_6$ aliphatic, phenyl, carbocyclyl, aryl, heteroaryl, or heterocyclyl; and
each

independently represents a connection to a nucleoside.
In some embodiments, the internucleotidic linkage having the structure of formula I is

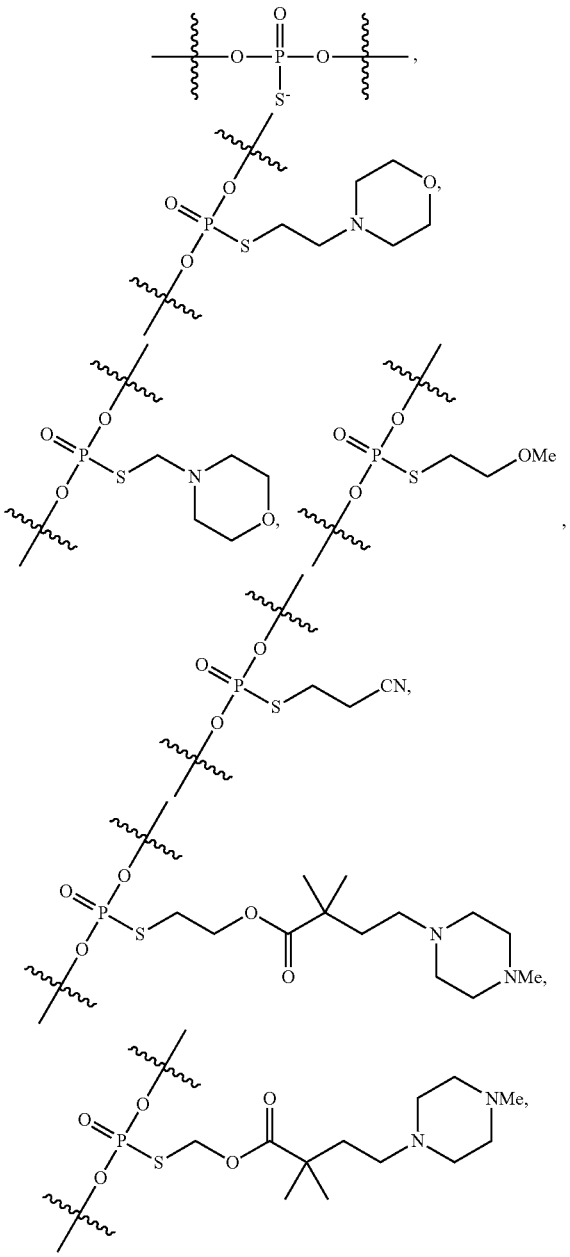

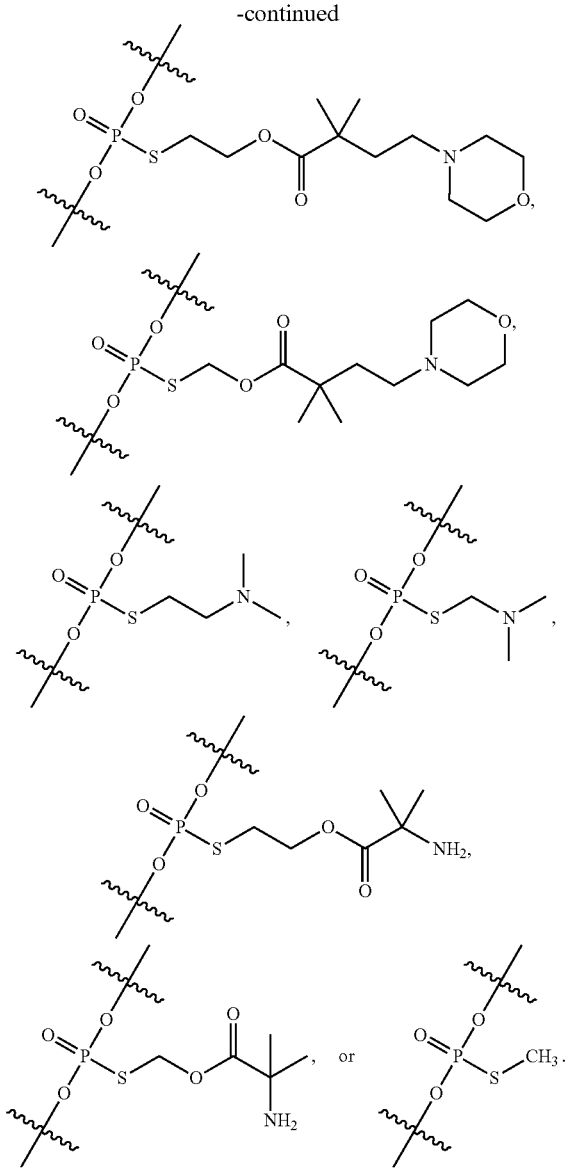

-continued

Among other things, the present disclosure provides oligonucleotides of various designs, which may comprise various nucleobases and patterns thereof, sugars and patterns thereof, internucleotidic linkages and patterns thereof, and/or additional chemical moieties and patterns thereof as described in the present disclosure. In some embodiments, provided oligonucleotides can downregulates the MuSK Ig3 domain protein expression, the MuSK Ig3 domain gene expression, and/or the MuSK Ig3 activation of BMP signaling level, thereby increasing adult hippocampal neurogenesis (AHN) and improving cognition in AD. In some embodiments, provided oligonucleotides can direct a decrease in the expression, level and/or activity of MuSK Ig3 domain and/or one or more of its products in a cell of a subject or patient. In some embodiments, a cell normally expresses or produces protein encoded by MuSK Ig3 domain. In some embodiments, provided oligonucleotides can direct a decrease in the expression, level and/or activity of MuSK Ig3 domain gene or a gene product and has a base sequence which consists of, comprises, or comprises a portion (e.g., a span of 10, 11, 12, 13, 14, 15, 16, 17, 18, 19, 20 or more contiguous bases) of the base sequence of a oligonucleotide disclosed herein, wherein each T can be independently substituted with U and vice versa, and the oligonucleotide comprises at least one non-naturally-occurring modification of a base, sugar and/or internucleotidic linkage.

As described herein, the highly abundant full length MuSK harbors the BMP-binding Ig3 domain and potentiates BMP signaling and thus restrains neurogenesis. In contrast, ΔIg3-MuSK has lower BMP signaling and promotes AHN and improves cognition. In some embodiments, the present disclosure provides exon-skipping ASOs that switch MuSK from the AHN-restraining full length MuSK to the AHN-permissive ΔIg3-MuSK splice form.

In some embodiments, one or more skipped exons are selected from exon 6 and 7 or MuSK gene. In some embodiments, exon 6 of MuSK is skipped. In some embodiments, exon 7 of MuSK is skipped. In some embodiments, both exons 6 and 7 of MuSK are skipped.

In various embodiments, an active compound is an oligonucleotide that directs skipping of one or more exons in a MuSK gene. In various embodiments, an active compound is an oligonucleotide that directs skipping of multiple exons in a MuSK gene. In some embodiments, an active compound is an oligonucleotide that directs skipping of exon 6, exon 7, or both in a MuSK gene. In some embodiments, an active compound is an oligonucleotide that directs skipping of exon 6 in a MuSK gene. In some embodiments, an active compound is an oligonucleotide that directs skipping of exon 7 in a MuSK gene. In some embodiments, an active compound is an oligonucleotide that directs skipping of exons 6 and 7 in a MuSK gene. In some embodiments, a plurality of oligonucleotides may be used together. In some such embodiments, two or more different exon skipping oligonucleotides (e.g., at least one that directs skipping of exon 6 and one that directs skipping of exon 7) may be used in combination. Alternatively or additionally, in some embodiments, at least one exon skipping oligonucleotide may be used in combination with at least one degrading oligonucleotide (e.g., that targets a transcript for RNase H degradation) which, for example, may target MuSK transcript(s) that include a functional Ig3 domain, or portion thereof.

In some embodiments, oligonucleotides are provided and/or utilized in salt forms. In some embodiments, oligonucleotides are provided as salts comprising negatively-charged internucleotidic linkages (e.g., phosphorothioate internucleotidic linkages, natural phosphate linkages, etc.) existing as their salt forms. In some embodiments, oligonucleotides are provided as pharmaceutically-acceptable salts. In some embodiments, oligonucleotides are provided as metal salts. In some embodiments, oligonucleotides are provided as sodium salts. In some embodiments, oligonucleotides are provided as metal salts, e.g., sodium salts, wherein each negatively-charged internucleotidic linkage is independently in a salt form (e.g., for sodium salts, —O—P(O)(SNa)—O— for a phosphorothioate internucleotidic linkage, —O—P(O)(ONa)—O— for a natural phosphate linkage, etc.).

Characterization of MuSK Neurogenesis Agonizing Agents

MuSK neurogenesis agonizing agents provided herein may be identified, assessed and/or characterized for one or more their physical/chemical properties and/or biological activities. Those skilled in the art will be aware of a variety of approaches, including particular assays, that may be utilized for such identification, assessment, and/or characterization.

In some embodiments, a small molecule MuSK NG agonizing agent may interfere with interaction between MuSK Ig3 and BMP, for example by binding directly to MuSK Ig3 or to BMP. In some such embodiments, such agents may be characterized by direct binding assays (e.g., that assess their affinity for, specificity to, and/or one or more kinetic or thermodynamic features of their interaction with, their target(s)) to MuSK Ig3 and/or to BMP, and/or by competitive binding assays (e.g., that assess their ability to disrupt or undue pre-formed complexes of MuSK Ig3 and BMP and/or to reduce complex formation). In some embodiments, such biding assays are desirably performed at multiple concentrations; in some embodiments, such binding assays may be performed with full-length MuSK, or with some other polypeptide or agent that is or comprises MuSK Ig3.

In some embodiments, a MuSK NG agonizing agent, (e.g., an antibody or small molecule that binds the Ig3 domain of MuSK), when contacted with a cell expressing MuSK, will compete with BMP for binding of the Ig3 domain. In some embodiments, such an antibody agent specifically binds to an epitope of MuSK that is expressed in a particular cell type (e.g., neuronal cell types). In some embodiments, such an antibody agent may have a binding affinity (e.g., as measured by a dissociation constant) for MuSK protein, e.g., the Ig3 domain of MuSK protein) of at least about $10^{-4}$M, at least about $10^{-5}$M, at least about $10^{-6}$M, at least about $10^{-7}$M, at least about $10^{-8}$M, at least about $10^{-9}$M, or lower. Those skilled in the art will appreciate that, in some cases, binding affinity (e.g., as measured by a dissociation constant) may be influenced by non-covalent intermolecular interactions such as hydrogen bonding, electrostatic interactions, hydrophobic and Van der Waals forces between the two molecules. Alternatively or additionally, binding affinity between a ligand and its target molecule may be affected by the presence of other molecules. Those skilled in the art will be familiar with a variety of technologies for measuring binding affinity and/or dissociation constants in accordance with the present disclosure, including, e.g., but not limited to ELISAs, gel-shift assays, pull-down assays, equilibrium dialysis, analytical ultracentrifugation, surface plasmon resonance (SPR), bio-layer interferometry, grating-coupled interferometry, and spectroscopic assays.

In some embodiments, competition assays may be used to identify an antibody that competes with the anti-MuSK antibody agents described herein for binding to the Ig3 domain of MuSK. In some embodiments, such a competing antibody binds to the same epitope within the Ig3 domain of MuSK that is bound by the anti-MuSK antibodies described herein. Exemplary epitope mapping methods are known. See, e.g., Morris "Epitope Mapping Protocols", *Methods in Molecular Biology*, vol. 66 (1996).

In some embodiments, assays can be provided for identifying anti-MuSK antibody agents thereof having biological activity. In some embodiments, assays can be provided for identifying anti-MuSK antibody agents thereof having neutralization activity for MuSK. Antibody agents having such biological activity in vivo and/or in vitro can be also provided. In some embodiments, an antibody of the disclosure can be tested for such biological activity.

The "biological activity" of an anti-MuSK antibody agent can refer to, for example, binding affinity for a particular MuSK epitope (e.g., within the Ig3 domain), neutralization or inhibition of MuSK binding to BMP, neutralization or inhibition of MuSK activity in vivo (e.g., $IC_{50}$), pharmacokinetics, and cross-reactivity (e.g., with non-human homologs or orthologs of the MUSK protein, or with other proteins or tissues). Other biological properties or characteristics of an antigen-binding agent recognized in the art can include, for example, avidity, selectivity, solubility, folding, immunotoxicity, expression, and formulation. The aforementioned properties or characteristics can be observed, measured, and/or assessed using standard techniques including, but not limited to, ELISA, competitive ELISA, surface plasmon resonance analysis (BIACORE™), or Kinetic Exclusion Assay (KINEXA™), in vitro or in vivo neutralization assays, receptor-ligand binding assays, cytokine or growth factor production and/or secretion assays, and signal transduction and immunohistochemistry assays.

In some embodiments, a MuSK NG agonizing agent as described herein is characterized in that, for example, the MuSK NG agonizing agent (e.g., an agonizing oligonucleotide), when contacted with a cell expressing MuSK, will increase the level or activity of MuSK ΔIg3 mRNA and/or protein.

In some embodiments, a MuSK NG agonizing oligonucleotide is characterized by its ability to alter splicing activity of MuSK pre-mRNA in a cell. For example, a cell may be transfected with a MuSK NG agonizing oligonucleotide, and after a period of incubation, expression of an alternative form of processed form of a MuSK RNA transcript (e.g., where exons 6 and 7 have been skipped), can be measured by RT-PCR. For example, the efficiency of MuSK exon skipping in cultured cells greater than 10%, 20%, 30%, 40%, 50%, 60%, 70%, 80%, 90%, 95%, or 95%.

In some aspects, a MuSK NG agonizing oligonucleotide increases of MuSK ΔIg3 mRNA. In some aspects, a MuSK NG agonizing oligonucleotide alters splicing of MuSK pre-mRNA. In some aspects, a MuSK NG agonizing oligonucleotide promotes the skipping of exon 6 and/or exon 7.

Modulation of expression of MuSK ΔIg3 can be measured in a bodily fluid of a subject treated with MuSK NG agonizing oligonucleotide, which may or may not contain cells; tissue; or organ of the animal. Methods of obtaining samples for analysis, such as body fluids (e.g., sputum, serum, CSF), tissues (e.g., biopsy), or organs, and methods of preparation of the samples to allow for analysis are well known to those skilled in the art. The effects of treatment on a subject can be assessed by measuring biomarkers associated with the target gene expression in one or more biological fluids, tissues or organs, collected from an animal contacted with one or more compositions described in this application.

In some embodiments, an increase in MuSK ΔIg3 mRNA means that the intracellular level of MuSK ΔIg3 mRNA is higher than a reference level, such as the level of MuSK ΔIg3 mRNA in a control (for example in a subject that is not being administered a MuSK NG agonizing oligonucleotide). An increase in intracellular MuSK ΔIg3 mRNA can be measured as an increase in the level of MuSK ΔIg3 protein and/or mRNA produced. In some embodiments, an increase in MuSK ΔIg3 mRNA can be determined by, e.g., methods as described below in the examples, and/or by assay techniques such as RNA solution hybridization, nuclease protection, Northern hybridization, reverse transcription, gene expression monitoring with a microarray, antibody binding, enzyme linked immunosorbent assay (ELISA), nucleic acid sequencing, Western blotting, radioimmunoassay (RIA), other immunoassays, fluorescence activated cell analysis (FACS), or any technique or combination of techniques that can detect the presence of MuSK ΔIg3 mRNA or protein (e.g., in a subject or a sample obtained from a subject).

In some embodiments, by comparing the level of MuSK ΔIg3 mRNA in a sample obtained from a subject receiving a MuSK NG agonizing oligonucleotide treatment to a level of MuSK ΔIg3 mRNA in a subject not treated with a MuSK NG agonizing oligonucleotide, the extent to which the MuSK NG agonizing oligonucleotide treatment increased MuSK ΔIg3 mRNA can be determined. In some embodiments, the reference level of MuSK ΔIg3 mRNA is obtained from the same subject prior to receiving MuSK NG agonizing oligonucleotide treatment. In some embodiments, the reference level of MuSK ΔIg3 mRNA is a range determined by a population of subjects not receiving MuSK NG agonizing oligonucleotide treatment. In some embodiments, the level of full-length MuSK mRNA is compared to the level of MuSK ΔIg3 mRNA. In some embodiments, the ratio of the MuSK ΔIg3 mRNA to a full length MuSK mRNA (e.g., MuSK mRNA without exons 6 and 7) in a subject receiving a MuSK NG agonizing oligonucleotide treatment, for example, greater than 1 fold, 1.5-5 fold, 5-10 fold, 10-50 fold, 50-100 fold, about 1.1-, 1.2-, 1.5-, 2-, 3-, 4-, 5-, 6-, 7-, 8-, 9-, 10-, 15-, 20-, 30-, 40-, 50-, 60-, 70-, 80-, 90-, 100-fold or more higher than a reference ratio.

In some embodiments, an increased level of MuSK ΔIg3 mRNA is, for example, greater than 1 fold, 1.5-5 fold, 5-10 fold, 10-50 fold, 50-100 fold, about 1.1-, 1.2-, 1.5-, 2-, 3-, 4-, 5-, 6-, 7-, 8-, 9-, 10-, 15-, 20-, 30-, 40-, 50-, 60-, 70-, 80-, 90-, 100-fold or more higher than a reference value.

In some embodiments, the increase of MuSK ΔIg3 mRNA in a subject can be indicated by the increase of MuSK ΔIg3 protein as compared to a reference level. In some embodiments, the reference level of MuSK ΔIg3 protein is the MuSK ΔIg3 protein level obtained from a subject having or at risk of having e.g., AD or a disease characterized by neurodegeneration, prior to treatment. Methods whereby bodily fluids, organs or tissues are contacted with an effective amount of one or more compositions described herein are also contemplated. Bodily fluids, organs or tissues can be contacted with one or more compositions comprising MuSK NG agonizing oligonucleotides, resulting in expression of MuSK ΔIg3 and modulation of MuSK expression in the cells of bodily fluids, organs or tissues. An effective amount of can be determined by monitoring the effect on functional MuSK ΔIg3 protein expression of MuSK NG agonizing oligonucleotides that are administered to a subject or contacted to a cell.

In some embodiments, a MuSK NG agonizing agent, when administered to a population of cells, (e.g., comprising NSCs and/or neural progenitor cells (NPCs)), increases the number of cells that are in an activated state (e.g., active proliferation). Cells within a population can be assessed for whether they are in an activated state by known methods in the art, including, e.g., an EdU assay, where EdU+ cycling cells are compared with total cell counts. In some embodiments, a MuSK NG agonizing agent, when administered to a population of cells comprising NSCs, decreases the number of quiescent NSCs in the population and/or increases the number of activated NSCs.

In some embodiments, a MuSK NG agonizing agent, when administered to a population of cells comprising NSCs and/or NPCs, increases the number of cells expressing genes associated with early neurons (e.g., Dcx) and/or decreases the number of cells expressing genes associated with mature neurons (e.g., Map2), astrocytes (e.g., GFAP and S100b), and/or oligodendrocytes (e.g., CNPase and O4). In some embodiments, a MuSK NG agonizing agent, when administered to a population of cells comprising NSCs and/or NPCs, increases the level of expression of genes associated with early neurons (e.g., Dcx) and/or decreases the level of expression of genes associated with mature neurons (e.g., Map2), astrocytes (e.g., GFAP and S100b), and/or oligodendrocytes (e.g., CNPase and O4) in the population of cells.

In some embodiments, a population of cells comprises NSCs that have been induced to be NSCs (e.g., from stem cells such as embryonic stems cells or pluripotent stem cells).

In some embodiments, a population of cells is obtained from a healthy subject. In some embodiments, a population of cells is obtained from a subject suffering from a disease characterized by neurodegeneration.

In some embodiments, a MuSK NG agonizing agent, when contacted with a population of cells from a subject, increases neurogenesis in a subject. In some embodiments, a MuSK NG agonizing agent is contacted with the population of cells in vivo, for example, by injection into a subject. In some embodiments, a MuSK NG agonizing agent is contacted with the population of cells ex vivo by obtaining a population of cells from a subject, and neurogenesis is increased when the treated cells are re-introduced into the subject.

In some embodiments, a MuSK NG agonizing agent, when administered to a subject, will increase neurogenesis and/or improve cognition. Examples of methods to assess these biological effects are detailed, e.g., in the below examples.

Production of Agonizing Agents

Antibodies

Antibodies and antigen-binding fragments of the present invention may be prepared and/or purified by any technique known in the art, which allows for the subsequent formation of a stable antibody or antibody fragment.

A nucleic acid encoding an anti-MuSK antibody agent of the present disclosure may be easily isolated and sequenced by conventional procedures.

In some embodiments, an expressed antibody of the present disclosure may be uniformly purified after being isolated from a host cell. Isolation and/or purification of an antibody of the present disclosure may be performed by a conventional method for isolating and purifying a protein. For example, not wishing to be bound by theory, an MuSK antibody agent of the present disclosure can be recovered and purified from recombinant cell cultures by well-known methods including, but not limited to, protein A purification, protein G purification, ammonium sulfate or ethanol precipitation, acid extraction, anion or cation exchange chromatography, phosphocellulose chromatography, hydrophobic interaction chromatography, affinity chromatography, hydroxylapatite chromatography and lectin chromatography. High performance liquid chromatography ("HPLC") can also be employed for purification. See, e.g., Colligan, Current Protocols in Immunology, or Current Protocols in Protein Science, John Wiley & Sons, NY, N.Y., (1997-2001), e.g., chapters 1, 4, 6, 8, 9, and 10, each entirely incorporated herein by reference. In some embodiments, an antibody of the present disclosure may be isolated and/or purified by additionally combining filtration, superfiltration, salting out, dialysis, etc.

Purified anti-MuSK agents of the present disclosure can be characterized by, for example, ELISA, ELISPOT, flow cytometry, immunocytology, BIACORE™ analysis, SAPIDYNE KINEXA™ kinetic exclusion assay, SDS-PAGE and Western blot, or by HPLC analysis as well as by a number of other functional assays disclosed herein.

Oligonucleotides

An agonizing agent, e.g., an agonizing oligonucleotide described herein can be synthesized by standard methods known in the art, e.g., by use of an automated synthesizer. Following chemical synthesis (e.g., solid-phase synthesis using phosphoramidite method), agonizing oligonucleotide molecules can be deprotected, annealed to ds molecules, and purified (e.g., by gel electrophoresis or HPLC). Protocols for preparation of agonizing oligonucleotides are known in the art.

An agonizing oligonucleotides can also be formed within a cell by transcription of RNA from an expression construct introduced into the cell (see, e.g., Yu et al., Proc. Natl. Acad. Sci. USA 2002; 99:6047-6052). An expression construct for in vivo production of agonizing oligonucleotide molecules can include one or more antisense encoding sequences operably linked to elements necessary for the proper transcription of the antisense encoding sequence(s), including, e.g., promoter elements and transcription termination signals. Preferred promoters for use in such expression constructs include the polymerase-III HI-RNA promoter (see, e.g., Brummelkamp et al., Science 2002; 296:550-553) and the U6 polymerase-III promoter (see, e.g., Sui et al., Proc. Natl. Acad. Sci. USA 2002; Paul et al., Nature Biotechnol. 2002; 20:505-508; and Yu et al., Proc. Natl. Acad. Sci. USA 2002; 99:6047-6052). An agonizing oligonucleotide expression construct can further comprise one or more vector sequences that facilitate the cloning of the expression construct. Standard vectors that can be used include, e.g., pSilencer 2.0-U6 vector (Ambion Inc., Austin, Tex.).

Pharmaceutical Compositions

The present disclosure provides pharmaceutical compositions that comprise and/or deliver agonizing agent(s) as described herein. The present disclosure also provides pharmaceutical compositions that are or comprise cell populations that have been exposed to agonizing agent(s) as described herein.

For example, in some embodiments, a provided pharmaceutical composition may comprise and/or deliver a MuSK NG agonizing agent such as, for example, an antibody agent or nucleic acid agent that, when administered, achieves an increase in level and/or activity of a MuSK polypeptide (e.g., a MuSK ΔIg3 polypeptide, or another MuSK variant polypeptide with disrupted Ig3) that lacks an Ig3 domain functional for interaction with BMP. Alternatively or additionally, in some embodiments, a provided pharmaceutical composition may comprise and/or deliver a population of cells that has been exposed to a MuSK NG agonizing agent, so that neuronal cell number and/or activity is increased in the population.

In many embodiments, a pharmaceutical composition will be or comprise an active agent (e.g., an agonizing agent as described herein or a precursor thereof) in combination with one or more pharmaceutically-acceptable excipients. Those skilled in the art will appreciate that components of a particular pharmaceutical composition may be influenced by route of administration of the pharmaceutical composition.

The compositions of the disclosure can be formulated for a variety of modes of administration, including systemic and topical or localized administration. Techniques and formulations generally may be found in Remington, The Science and Practice of Pharmacy, (20th ed. 2000).

Compositions of the present invention can be prepared and administered in a wide variety of oral, parenteral, and topical dosage forms. Thus, the compositions of the present invention can be administered by injection (e.g., intravenously, intramuscularly, intracutaneously, subcutaneously, intraduodenally, or intraperitoneally). Also, the compositions described herein can be administered by inhalation, for example, intranasally. Additionally, the composition of the present invention can be administered transdermally. It is also envisioned that multiple routes of administration (e.g., intramuscular, oral, transdermal) can be used to administer the compositions of the invention.

In some embodiments, a pharmaceutical composition as described herein may be formulated for delivery by a route selected from intravenous injection, intrathecal administration, oral administration, buccal administration, inhalation, nasal administration, topical administration, ophthalmic administration or otic administration. In some embodiments, a pharmaceutical composition may be formulated for delivery by intrathecal administration. In some embodiments, a pharmaceutical composition may be formulated for delivery by intravenous administration. In some embodiments, a pharmaceutical composition may be formulated for delivery by oral administration.

In certain embodiments, oligonucleotides and compositions are delivered to the CNS. In certain embodiments, oligonucleotides and compositions are delivered to the cerebrospinal fluid. In certain embodiments, oligonucleotides and compositions are administered to the brain parenchyma. In certain embodiments, oligonucleotides and compositions are delivered to an animal/subject by intrathecal administration, or intracerebroventricular administration. Broad distribution of oligonucleotides and compositions, described herein, within the central nervous system may be achieved with intraparenchymal administration, intrathecal administration, or intracerebroventricular administration.

In certain embodiments, parenteral administration is by injection, by, e.g., a syringe, a pump, etc. In certain embodiments, the injection is a bolus injection. In certain embodiments, the injection is administered directly to a tissue, such as striatum, caudate, cortex, hippocampus and cerebellum.

In certain embodiments, methods of specifically localizing a pharmaceutical agent, such as by bolus injection, decreases median effective concentration ($EC_{50}$) by a factor of 20, 25, 30, 35, 40, 45 or 50. In certain embodiments, the pharmaceutical agent in an antisense compound as further described herein. In certain embodiments, the targeted tissue is brain tissue. In certain embodiments the targeted tissue is hippocampus tissue. In certain embodiments, decreasing $EC_{50}$ is desirable because it reduces the dose required to achieve a pharmacological result in a patient in need thereof.

In certain embodiments, an antisense oligonucleotide is delivered by injection or infusion once every month, every two months, every 90 days, every 3 months, every 6 months, twice a year or once a year.

In addition to the active ingredients, these pharmaceutical compositions may contain suitable pharmaceutically-acceptable carriers comprising excipients and auxiliaries which facilitate processing of an active compound into preparations which can be used pharmaceutically. The preparations formulated for oral administration may be in the form of tablets, dragees, capsules, or solutions.

Pharmaceutical preparations for oral use can be obtained by combining an active compound with solid excipients, optionally grinding a resulting mixture, and processing the mixture of granules, after adding suitable auxiliaries, if desired, to obtain tablets or dragee cores. Suitable excipients are, in particular, fillers such as sugars, including lactose, sucrose, mannitol, or sorbitol; cellulose preparations, for example, maize starch, wheat starch, rice starch, potato starch, gelatin, gum tragacanth, methyl cellulose, hydroxypropylmethyl-cellulose, sodium carboxymethyl-cellulose (CMC), and/or polyvinylpyrrolidone (PVP: povidone). If desired, disintegrating agents may be added, such as the cross-linked polyvinylpyrrolidone, agar, or alginic acid or a salt thereof such as sodium alginate.

Dragee cores are provided with suitable coatings. For this purpose, concentrated sugar solutions may be used, which may optionally contain gum arabic, talc, polyvinylpyrrolidone, carbopol gel, polyethylene glycol (PEG), and/or titanium dioxide, lacquer solutions, and suitable organic solvents or solvent mixtures. Dye-stuffs or pigments may be added to the tablets or dragee coatings for identification or to characterize different combinations of active compound doses.

Pharmaceutical preparations that can be used orally include push-fit capsules made of gelatin, as well as soft, sealed capsules made of gelatin, and a plasticizer, such as glycerol or sorbitol. The push-fit capsules can contain the active ingredients in admixture with filler such as lactose, binders such as starches, and/or lubricants such as talc or magnesium stearate and, optionally, stabilizers. In soft capsules, an active compound may be dissolved or suspended in suitable liquids, such as fatty oils, liquid paraffin, or liquid polyethylene glycols (PEGs). In addition, stabilizers may be added.

In some embodiments, the pharmaceutical composition is a tablet, a pill, a capsule, a liquid, an inhalant, a nasal spray solution, a suppository, a suspension, a gel, a colloid, a dispersion, a suspension, a solution, an emulsion, an ointment, a lotion, an eye drop or an ear drop.

Depending on the specific conditions being treated, pharmaceutical composition of the present disclosure may be formulated into liquid or solid dosage forms and administered systemically or locally. The pharmaceutical composition may be delivered, for example, in a timed- or sustained-low release form as is known to those skilled in the art. Techniques for formulation and administration may be found in Remington, The Science and Practice of Pharmacy (20th ed. 2000). Suitable routes may include oral, buccal, by inhalation spray, sublingual, rectal, transdermal, vaginal, transmucosal, nasal or intestinal administration; parenteral delivery, including intramuscular, subcutaneous, intramedullary injections, as well as intrathecal, direct intraventricular, intravenous, intra-articular, intra-sternal, intra-synovial, intra-hepatic, intralesional, intracranial, intraperitoneal, intranasal, or intraocular injections or other modes of delivery.

For injection, the pharmaceutical composition of the disclosure may be formulated and diluted in aqueous solutions, such as in physiologically compatible buffers such as Hank's solution, Ringer's solution, or physiological saline buffer. For such transmucosal administration, penetrants appropriate to the barrier to be permeated are used in the formulation. Such penetrants are generally known in the art.

Use of pharmaceutically-acceptable inert carriers to formulate the compositions herein disclosed for the practice of the disclosure into dosages suitable for systemic administration is within the scope of the disclosure. With proper choice of carrier and suitable manufacturing practice, the compositions of the present disclosure, in particular, those formulated as solutions, may be administered parenterally, such as by intravenous injection.

In some embodiments, compositions as described herein can be formulated using pharmaceutically-acceptable carriers available in the art into dosages suitable for oral administration. Such carriers enable the compounds of the disclosure to be formulated as tablets, pills, capsules, liquids, gels, syrups, slurries, suspensions and the like, for oral ingestion by a subject (e.g., patient) to be treated.

For nasal or inhalation delivery, one or more solubilizing, diluting, or dispersing substances such as, saline, preservatives, such as benzyl alcohol, absorption promoters, and fluorocarbons, may be employed.

In some embodiments, a provided composition may comprise and/or deliver a precursor of an active agent, wherein the precursor becomes or releases active therapeutic agent upon administration. In some embodiments, for example, a precursor may be or comprise a prodrug of a small molecule agonizing agent, or a nucleic acid that encodes a protein agonizing agent, etc.

In some particular embodiments, a provided pharmaceutical composition comprises or delivers a therapeutically effective amount (e.g., an amount that is effective when administered according to an established protocol) of a provided oligonucleotide (which may, as described herein, be provided in a pharmaceutically-acceptable salt form, e.g., as a sodium salt, ammonium salt, etc.); in some embodiments, such provided pharmaceutical composition includes a relevant oligonucleotide and at least one pharmaceutically-acceptable inactive ingredient selected from pharmaceutically-acceptable diluents, pharmaceutically-acceptable excipients, and pharmaceutically-acceptable carriers. In some embodiments, a salt form of a provided oligonucleotide comprises two or more cations, for example, in some embodiments, up to the number of negatively charged acidic groups (e.g., phosphate, phosphorothioate, etc.) in an oligonucleotide.

Pharmaceutically-acceptable salts are generally well known to those of ordinary skill in the art, and may include, by way of example but not limitation, acetate, benzenesulfonate, besylate, benzoate, bicarbonate, bitartrate, bromide, calcium edetate, carnsylate, carbonate, citrate, edetate, edisylate, estolate, esylate, fumarate, gluceptate, gluconate, glutamate, glycollylarsanilate, hexylresorcinate, hydrabamine, hydrobromide, hydrochloride, hydroxynaphthoate, iodide, isethionate, lactate, lactobionate, malate, maleate, mandelate, mesylate, mucate, napsylate, nitrate, pamoate (embonate), pantothenate, phosphate/diphosphate, polygalacturonate, salicylate, stearate, subacetate, succinate, sulfate, tannate, tartrate, or teoclate. Other pharmaceutically-acceptable salts may be found in, for example, Remington, The Science and Practice of Pharmacy (20th ed. 2000). Preferred pharmaceutically-acceptable salts include, for example, acetate, benzoate, bromide, carbonate, citrate, gluconate, hydrobromide, hydrochloride, maleate, mesylate, napsylate, pamoate (embonate), phosphate, salicylate, succinate, sulfate, or tartrate.

As appreciated by a person having ordinary skill in the art, oligonucleotides may be formulated as a number of salts for, e.g., pharmaceutical uses. In some embodiments, a salt is a metal cation salt and/or ammonium salt. In some embodiments, a salt is a metal cation salt of an oligonucleotide. In some embodiments, a salt is an ammonium salt of an oligonucleotide. Representative alkali or alkaline earth metal salts include sodium, lithium, potassium, calcium, magnesium, and the like. In some embodiments, a salt is a sodium salt of an oligonucleotide. In some embodiments, pharmaceutically-acceptable salts include, when appropriate, nontoxic ammonium, quaternary ammonium, and amine cations formed with counterions such as hydroxide, carboxylate, sulfate, phosphate, nitrate, sulfonate, phosphorothioate, etc. that may be within provided oligonucleotides. As appreciated by a person having ordinary skill in the art, a salt of an oligonucleotide may contain more than one cations, e.g., sodium ions, as there may be more than one anions within an oligonucleotide.

In some embodiments, provided oligonucleotides, and compositions thereof, may be effective over a wide dosage range. For example, in the treatment of adult humans, dosages from about 0.01 to about 1000 mg, from about 0.5 to about 100 mg, from about 1 to about 50 mg per day, and from about 5 to about 100 mg per day are examples of dosages that may be used. The exact dosage will depend upon the route of administration, the form in which the compound is administered, the subject to be treated, the body weight of the subject to be treated, and the preference and experience of the attending physician.

In some embodiments, the present disclosure provides technologies (e.g., compositions, methods, etc.) for combination therapy, for example, with other therapeutic agents and/or medical procedures. In some embodiments, provided oligonucleotides and/or compositions may be used together with one or more other therapeutic agents. In some embodiments, provided compositions comprise provided oligonucleotides, and one or more other therapeutic agents. In some embodiments, the one or more other therapeutic agents may have one or more different targets, and/or one or more different mechanisms toward targets, when compared to provided oligonucleotides in the composition. In some embodiments, a therapeutic agent is an oligonucleotide. In some embodiments, a therapeutic agent is a small molecule drug. In some embodiments, a therapeutic agent is a protein. In some embodiments, a therapeutic agent is an antibody. A number of a therapeutic agent may be utilized in accordance with the present disclosure. In some embodiments, provided oligonucleotides or compositions thereof are administered prior to, concurrently with, or subsequent to one or more other therapeutic agents and/or medical procedures. In some embodiments, provided oligonucleotides or compositions thereof are administered concurrently with one or more other therapeutic agents and/or medical procedures. In some embodiments, provided oligonucleotides or compositions thereof are administered prior to one or more other therapeutic agents and/or medical procedures. In some embodiments, provided oligonucleotides or compositions thereof are administered subsequent to one or more other therapeutic agents and/or medical procedures. In some embodiments, provide compositions comprise one or more other therapeutic agents.

Production of Pharmaceutical Compositions

For preparing pharmaceutical compositions from the compositions of the present invention, pharmaceutically-acceptable carriers can be either solid or liquid. Solid form preparations include powders, tablets, pills, capsules, cachets, suppositories, and dispersible granules. A solid carrier can be one or more substance that may also act as diluents, flavoring agents, binders, preservatives, tablet disintegrating agents, or an encapsulating material.

In powders, the carrier is a finely divided solid in a mixture with the finely divided active component. In tablets, the active component is mixed with the carrier having the necessary binding properties in suitable proportions and compacted in the shape and size desired.

The powders and tablets preferably contain from 5% to 70% of the therapeutic agent. Suitable carriers are magnesium carbonate, magnesium stearate, talc, sugar, lactose, pectin, dextrin, starch, gelatin, tragacanth, methylcellulose, sodium carboxymethylcellulose, a low melting wax, cocoa butter, and the like. The term "preparation" is intended to include the formulation of the active therapeutic agent with encapsulating material as a carrier providing a capsule in which the active component with or without other carriers, is surrounded by a carrier, which is thus in association with it. Similarly, cachets and lozenges are included. Tablets, powders, capsules, pills, cachets, and lozenges can be used as solid dosage forms suitable for oral administration.

For preparing suppositories, a low melting wax, such as a mixture of fatty acid glycerides or cocoa butter, is first melted and the active component is dispersed homogeneously therein, as by stirring. The molten homogeneous mixture is then poured into convenient sized molds, allowed to cool, and thereby to solidify.

Liquid form preparations include solutions, suspensions, and emulsions, for example, water or water/propylene glycol solutions. For parenteral injection, liquid preparations can be formulated in solution in aqueous polyethylene glycol solution.

When parenteral application is needed or desired, particularly suitable admixtures for compositions of the invention are injectable, sterile solutions, preferably oily or aqueous solutions, as well as suspensions, emulsions, or implants, including suppositories. In particular, carriers for parenteral administration include aqueous solutions of dextrose, saline, pure water, ethanol, glycerol, propylene glycol, peanut oil, sesame oil, polyoxyethylene-block polymers, and the like. Ampoules are convenient unit dosages. The compositions of the invention can also be incorporated into liposomes or administered via transdermal pumps or patches. Pharmaceutical admixtures suitable for use in the present invention include those described, for example, in Pharmaceutical Sciences (17th Ed., Mack Pub. Co., Easton, Pa.) and WO 96/05309.

Aqueous solutions suitable for oral use can be prepared by dissolving the active component in water and adding suitable colorants, flavors, stabilizers, and thickening agents as desired. Aqueous suspensions suitable for oral use can be made by dispersing the finely divided active component in water with viscous material, such as natural or synthetic gums, resins, methylcellulose, sodium carboxymethylcellulose, and other well-known suspending agents.

Also included are solid form preparations that are intended to be converted, shortly before use, to liquid form preparations for oral administration. Such liquid forms include solutions, suspensions, and emulsions. These preparations may contain, in addition to the active component, colorants, flavors, stabilizers, buffers, artificial and natural sweeteners, dispersants, thickeners, solubilizing agents, and the like.

The pharmaceutical preparation is preferably in unit dosage form. In such form the preparation is subdivided into unit doses containing appropriate quantities of the active component. The unit dosage form can be a packaged preparation, the package containing discrete quantities of preparation, such as packed tablets, capsules, and powders in vials or ampoules. Also, the unit dosage form can be a capsule, tablet, cachet, or lozenge itself, or it can be the appropriate number of any of these in packaged form.

The quantity of active component in a unit dose preparation may be varied or adjusted according to the particular application and the potency of the active component. The composition can, if desired, also contain other compatible therapeutic agents.

Patient Populations

In some embodiments, an appropriate patient or population is one suffering from and/or susceptible to a disease, disorder or condition associated with neurodegeneration (e.g., Alzheimer's disease (AD)) or that otherwise would benefit from increased neurogenesis).

In some embodiments, a subject and/or population may additionally or alternatively be suffering from and/or susceptible to a disease, disorder or condition that is a neuromuscular dysfunction disease, disorder, or condition. In some embodiments, such neuromuscular dysfunction disease, disorder, or condition is one or more of Becker muscular dystrophy, Congenital muscular dystrophy, Distal muscular dystrophy, Duchenne muscular dystrophy, Emery-Dreifuss muscular dystrophy, Facioscapulohumeral muscular dystrophy, Limb-girdle muscular dystrophy, Myotonic muscular dystrophy, and Oculo-pharyngeal muscular dystrophy.

In some embodiments, an appropriate patient or population is model organisms. In some embodiments, an appropriate patient or population is humans. In some embodiments, a human has an age in a range of from about 0 months to about 6 months old, from about 6 to about 12 months old, from about 6 to about 18 months old, from about 18 to about 36 months old, from about 1 to about 5 years old, from about 5 to about 10 years old, from about 10 to about 15 years old, from about 15 to about 20 years old, from about 20 to about 25 years old, from about 25 to about 30 years old, from about 30 to about 35 years old, from about 35 to about 40 years old, from about 40 to about 45 years old, from about 45 to about 50 years old, from about 50 to about 55 years old, from about 55 to about 60 years old, from about 60 to about 65 years old, from about 65 to about 70 years old, from about 70 to about 75 years old, from about 75 to about 80 years old, from about 80 to about 85 years old, from about 85 to about 90 years old, from about 90 to about 95 years old or from about 95 to about 100 years old.

In some embodiments, a human is a human infant. In some embodiments, a human is a human toddler. In some embodiments, a human is a human child. In some embodiments, a human is a human adult. In yet other embodiments, a human is an elderly human.

In some embodiments, an appropriate patient or population may be defined by one or more criterion such as age group, gender, genetic background, preexisting clinical conditions, prior exposure to therapy.

In some embodiments, an appropriate patient or population is one suffering from Alzheimer's disease (AD) or other disease characterized by neurodegeneration. In some embodiments, an appropriate patient or population maybe defined by those in accordance with the screening tools for Alzheimer's Disease. In some embodiments, an appropriate patient or population maybe defined by those in accordance with the screening tools for other diseases characterized by neurodegeneration, e.g., Parkinsons' disease, dementia (e.g., Frontotemporal dementia), stroke, Major Depressive Disorder (MDD), bipolar disorder, Schizophrenia, Post-Traumatic Stress Disorder (PTSD), substance-related and addictive disorders (e.g., chronic cocaine use and lifelong cigarette smoking), Temporal-Lobe Epilepsy, Hippocampal Sclerosis, Niemann Pick Type C, Diabetes-mediated hippocampal neuronal loss, and Huntington's disease.

In some embodiments, an appropriate patient or population may be defined according to the results obtained in structural imaging (e.g., magnetic resonance imaging (MRI), computed tomography (CT), etc.). In some embodiments, an appropriate patient or population maybe defined according to the results of cognitive tests. In some embodiments, the cognitive tests involve one or more tests of Motor Screening Task (MOT), Reaction Time (RTI), Paired Associates Learning (PAL), Spatial Working Memory (SWM), Pattern Recognition Memory (PRM), Delayed Matching to Sample (DMS), Rapid Visual Information Processing (RVP). Rapid Visual Information Processing (RVP), Delayed Matching to Sample (DMS), Match to Sample Visual Search (MTS).

Administration

Those skilled in the art will appreciate that, in some embodiments, dosage administered to a subject, particularly a human, may vary, for example depending on the particular therapeutic and/or formulation employed, the method of administration, the dosing regimen, one or more characteristics of the particular subject being treated, etc. In some embodiments, a clinician skilled in the art will determine the therapeutically effective amount of a therapeutic to be administered to a human or other subject in order to treat or prevent a particular medical condition. The precise amount of the therapeutic required to be therapeutically effective will depend upon numerous factors, e.g., such as the specific activity of the therapeutic, and the route of administration, in addition to many subject-specific considerations, which are within those of skill in the art.

Those skilled in the art, reading the present disclosure will appreciate that, in some embodiments, it may be desirable to achieve delivery of a MuSK NG agonizing agent to the CNS, and, in some embodiments to the brain.

In some embodiments, effective delivery may be achieved by systemic administration of a composition as described herein. Alternatively or additionally, in some embodiments, effective delivery may be achieved by local administration to the CNS and/or to the brain, for example by intrathecal and/or intracavitary (e.g., intracerebroventricular) delivery.

Technologies for local administration to the CNS and/or to the brain have been developed and demonstrated to be effective, for example, for various protein therapeutics (see, for example, Calias et al., *Pharmacol. & Therap.* 144:122, 2014), for small molecules (see, for example, Dodou *Pharm. J.* 289:501, 2012), for cell compositions (see, for example, Eftekharzadeh et al., *Iran J Basic Med Sci* 18:520, 2015); and nucleic acid therapeutics (see, for example, Otsuka et al, *J. Neurotrauma* 28:1063, 2011; see also prescribing information for onasemnogene abeparvovec-xioi [sold under the brand name Zolgensma™] and that for nusinersen [sold under the brand name Spinraza™]).

Those skilled in the art will be aware that intrathecal delivery may be particularly effective to achieve delivery to the hippocampus, including for cellular, protein, and nucleic acid therapeutics.

Systemic administration technologies (including, e.g., oral, parenteral, mucosal, etc.) are well established for a wide variety of agents. Systemic administration that achieves CNS and/or brain delivery, in some embodiments, may depend on ability to cross the blood brain barrier (BBB).

Certain viral vectors are known to selectively target neurons, and to effectively deliver genetic payloads to the brain. For example, AAV2/1 vectors have been established to effectively deliver nucleic acid payloads (e.g., gene therapy, encoded RNAs, etc.) to neuronal cells in the hippocampus. See, for example, Hammond et al., *PLoS One* 12:e0188830, 2017; Guggenhuber et al., *PLoS One* 5:e15707, 2010; Lawlor et al., *Mol. Neurodeg.* 2:11, 2007). Analogously, certain AAV vectors (e.g., AAV2/1 and/or AAV4 vectors) have been established to target and effectively deliver nucleic acid payloads to certain cells in the subventricular zone cells. See, for example, Liu et al., *Gene Thep* 12:1503, 2005; Bockstael et al., *Hum Gene Therap* 23:doi.org/10.1089/hum.2011.216, 2012).

Certain active agents and/or delivery systems are known to cross the BBB. Recent technologies have been shown to achieve CNS and/or brain delivery even of agents, such as oligonucleotides, that had historically been considered to be particularly challenging in that regard. To give but one example, Min et al., *Angew Chem Int Ed Engl* doi: 10.1002/anie.201914751, 2020, incorporated herein by reference, describes glucose-coated polymeric nanocarriers that transport oligonucleotides across the BBB.

Figure 2:
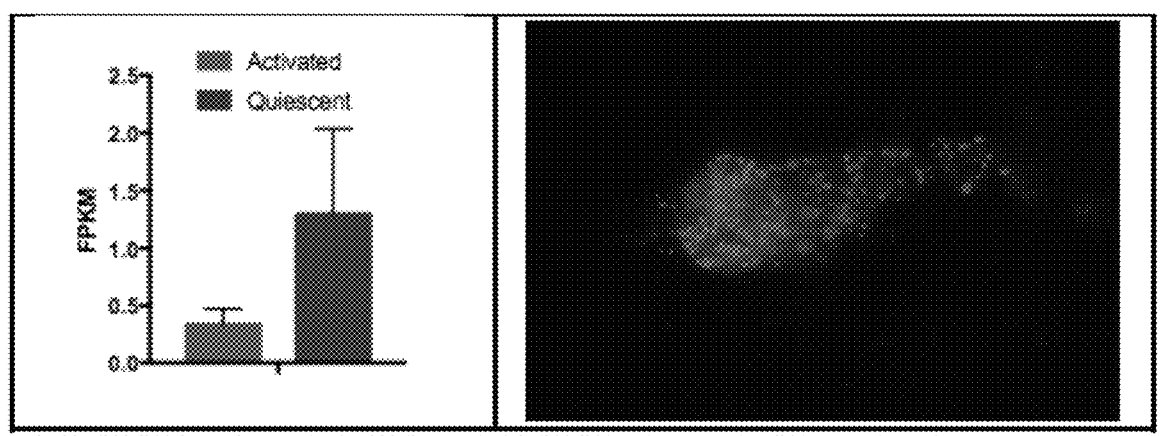
FIG. 2 depicts MuSK RNA and protein in NSCs. Panel A shows MuSK RNA detected by RNA-seq in quiescent and activated NSCs freshly isolated from the adult mouse SVZ. Panel B shows MuSK visualized in freshly isolated adult NSCs by anti-MuSK antibodies.

It has also been reported that incorporation of certain particular chemistries into oligonucleotide therapeutics can facilitate their travel across the BBB. For example, Khorkova et al., (*Nature Biotech* 35:249, 2017, incorporated herein by reference) have described that:

> "2'-modified phosphorothioate oligonucleotides . . . may be particularly adaptable for CNS disorders, given their long half-life, with effects in the brain lasting up to 6 months following a single injection. In another type of sugar moiety modification, locked nucleic acids (LNAs), a bridge is introduced that connects the 2' oxygen and 4' carbon. This modification substantially elevates the melting temperature of the LNA-DNA and LNA-RNA hybrids, thus allowing the creation of shorter ODN-based compounds with increased bioavailability and reduced manufacturing costs. A recently proposed tricyclo-DNA, a conformationally constrained oligonucleotide analog, has three additional C-atoms between C(5') and C(3') of the sugar (FIG. 2). This modification increases stability, hydrophobicity and RNA affinity, and improves tissue uptake and BBB permeability".

(citations omitted).

Oligonucleotides

Those skilled in the art will be familiar with nusinersen [sold under the brand name Spinraza™], an antisense oligonucleotide therapeutic that targets the survival motor neuron-2 (SMN2)-directed gene transcript and is indicated for the treatment of spinal muscular atrophy (SMA) in pediatric and adult patients. Spinraza is administered intrathecally. In particular, its recommended dosage is 12 mg/5 mL (2.4 mg/mL) in a single-dose vial per administration, according to a regiment that involves four loading doses; the first three of which are administered at 14-day intervals, and the fourth of which is administered 30 days after the 3rd dose; a maintenance dose is administered once every 4 months thereafter. It is recommended that platelet count, coagulation laboratory testing, and quantitative spot urine protein testing is done at baseline, and prior to each dose.

In some embodiments, an oligonucleotide therapeutic as described herein may be administered intrathecally. In some such embodiments, such oligonucleotide therapeutic may be administered according to a regimen reasonably comparable to that used for nusinersen (sold under the brand name Spinraza™).

In some embodiments a lower dose of an agonizing oligonucleotide as described herein is 12 mg. In some embodiments, a total of 5 mg to 60 mg per dose of agonizing oligonucleotide is administered to a subject. In some embodiments, a total of 12 mg to 48 mg per dose of agonizing oligonucleotide is administered to a subject. In some aspects, a total of 12 mg to 36 mg per dose of agonizing oligonucleotide is administered to a subject. In some aspects, a total of 12 mg per dose of agonizing oligonucleotide is administered to a subject.

Cell Therapy

In light of the ability of MuSK NG agonizing agents, as described herein, to promote neurogenesis (e.g., from cell populations that are or comprise neural progenitor cells), those skilled in the art reading the present disclosure will appreciate that, among other things, the present disclosure provides technologies for enhancing level of neural cells present in a cell population. That is, contacting an original cell population with a MuSK NG agonizing agent as described herein can generate a resulting population with an increased level and/or percentage of neural cells as compared with that in the original population: administration of such MuSK NG agonizing agent as described herein can achieve such increase.

In some embodiments, an original cell population may be or comprise NSCs and/or NPCs. In some embodiments, an original cell population is or comprises embryonic stems cells and/or pluripotent stem cells. In some embodiments, embryonic stems cells and/or pluripotent stem cells are or have been differentiated into neural or neural precursor cells, for example using techniques known in the art. See, e.g., U.S. Pat. No. 9,631,175.

In some embodiments, as discussed above, such administration delivers the MuSK NG agonizing agent such that it is exposed to (i.e., contacts) a relevant original cell population in vivo (e.g., in a human), and in particular in an adult human, for example in the brain, e.g., the hippocampus and/or subventricular region of the brain, of such human.

In some embodiments, administration in accordance with the present disclosure contacts a MuSK NG agonizing agent with a population of cells (e.g., an original population of cells), that for example, may be or comprise neural progenitor cells, ex vivo. For example, in some embodiments, a MuSK NG agonizing agent is administered ex vivo (e.g., in vitro) to a population of cells from a subject. In some embodiments, a population of cells obtained from a subject.

In some embodiments, a MuSK NG agonizing agent of particular use ex vivo may be or comprise a small molecule, and antibody, or a nucleic acid agent, or a combination thereof. In some particular such embodiments, one or more agents that is or comprises a nucleic acid (e.g., one or more gene therapy [e.g., nucleic acid vector and/or transcript], oligonucleotide, and/or gRNAs) may be particular useful for ex vivo and/or in vitro administration to cells. CRISPR/Cas modification of cell populations is an established and growing field, and those skilled in the art will appreciate applicability of such strategies in accordance with the present disclosure, e.g, to modify and/or disrupt MuSK Ig3 domain sequences. Alternatively or additionally, nucleic acids that encode (or whose expression products encode) MuSK forms lacking a functional Ig3 domain may be introduced into cells ex vivo and/or in vitro. Still further alternatively or additionally, oligonucleotides that direct exon skipping of MuSK transcript(s) to favor forms that lack functional Ig3, and/or that direct degradation (and/or block translation) of forms that include functional Ig3, may be utilized.

In some embodiments, a population of cells is contacted with a MuSK NG agonizing agent and simultaneously or subsequently stimulated and/or expanded. Alternatively or additionally, a population of cells is enriched and/or selected for cells exhibiting characteristics of activated NSCs (e.g., expression of Dex).

In some embodiments, a resulting population of cells, achieved by contacting an original population of cells with a MuSK NG agonizing agent ex vivo is then administered to a subject. In some embodiments, a resulting population of cells is administered to a subject suffering from or susceptible to a neurodegenerative disease, disorder or condition. In some embodiments, a resulting population of cells is administered to the subject from whom the original population of cells was obtained. In some embodiments, a resulting population of cells is administered to a different subject than the one from which the original population of cells was obtained; in some such embodiments, the original population was obtained from a healthy subject and the resulting population is administered to a subject suffering from or susceptible to a neurodegenerative disease disorder or condition (e.g., AD).

In some embodiments, administering a population of cells, contacted with a MuSK NG agonizing agent effectively treats AD or a disease associated with neurodegeneration in the subject.

In some embodiments, a population of stimulated and/or expanded NSCs described herein can be formulated into a cellular therapeutic. In some embodiments, a cellular therapeutic includes a pharmaceutically-acceptable carrier, diluent, and/or excipient. Pharmaceutically-acceptable carriers described herein, for example, vehicles, adjuvants, excipients, and diluents, are well-known and readily available to those skilled in the art. Preferably, the pharmaceutically-acceptable carrier is chemically inert to the active agent(s), e.g., a cellular therapeutic, and does not elicit any detrimental side effects or toxicity under the conditions of use.

In some embodiments, a cellular therapeutic can be formulated for administration by any suitable route, such as, for example, intravenous, intratumoral, intraarterial, intramuscular, intraperitoneal, intrathecal, epidural, and/or subcutaneous administration routes. Preferably, the cellular therapeutic is formulated for a parenteral route of administration. In some embodiments, a cellular therapeutic is administered to a subject via an infusion.

In some embodiments, a cellular therapeutic suitable for parenteral administration can be an aqueous or non-aqueous, isotonic sterile injection solution, which can contain antioxidants, buffers, bacteriostats, and solutes, for example, that render the composition isotonic with the blood of the intended recipient. An aqueous or nonaqueous sterile suspension can contain one or more suspending agents, solubilizers, thickening agents, stabilizers, and preservatives.

In some embodiments, a single therapeutic cell described herein is capable of expanding and providing a therapeutic benefit. In some embodiments, $10^2$ or more, e.g., $10^3$ or more, $10^4$ or more, $10^5$ or more, or $10^8$ or more, therapeutic cells are administered as a cellular therapeutic. Alternatively, or additionally $10^{12}$ or less, e.g., $10^{11}$ or less, $10^9$ or less, $10^7$ or less, or $10^5$ or less, therapeutic cells described herein are administered to a subject as a cellular therapeutic. In some embodiments, $10^2$-$10^5$, $10^4$-$10^7$, $10^3$-$10^9$, or $10^5$-$10^{10}$ therapeutic cells described herein are administered as a cellular therapeutic.

A dose of a cellular therapeutic described herein can be administered to a subject at one time or in a series of subdoses administered over a suitable period of time, e.g., on a daily, semi-weekly, weekly, bi-weekly, semi-monthly, bi-monthly, semi-annual, or annual basis, as needed. A dosage unit comprising an effective amount of a cellular therapeutic may be administered in a single daily dose, or the total daily dosage may be administered in two, three, four, or more divided doses administered daily, as needed. In some embodiments, a cellular therapeutic is administered in combination with another therapy.

Combination Therapy

In some embodiments, MuSK NG agonizing therapy as described herein is administered in combination with another therapy, i.e., so that a subject is simultaneously exposed to both therapies.

The dosage of the MuSK NG agonizing therapy as described herein and the dosage of another therapy administered in combination, as well as the dosing schedule can depend on various parameters, including, but not limited to, the disease being treated (e.g., AD), the subject's general health, and the administering physician's discretion. MuSK NG agonizing therapy can be administered prior to (e.g., 5 minutes, 15 minutes, 30 minutes, 45 minutes, 1 hour, 2 hours, 4 hours, 6 hours, 12 hours, 24 hours, 48 hours, 72 hours, 96 hours, 1 week, 2 weeks, 3 weeks, 4 weeks, 5 weeks, 6 weeks, 8 weeks, or 12 weeks before), concurrently with, or subsequent to (e.g., 5 minutes, 15 minutes, 30 minutes, 45 minutes, 1 hour, 2 hours, 4 hours, 6 hours, 12 hours, 24 hours, 48 hours, 72 hours, 96 hours, 1 week, 2 weeks, 3 weeks, 4 weeks, 5 weeks, 6 weeks, 8 weeks, or 12 weeks after) the administration of the other therapy, to a subject in need thereof. In various embodiments MuSK NG agonizing therapy and the other therapy are administered 1 minute apart, 10 minutes apart, 30 minutes apart, less than 1 hour apart, 1 hour apart, 1 hour to 2 hours apart, 2 hours to 3 hours apart, 3 hours to 4 hours apart, 4 hours to 5 hours apart, 5 hours to 6 hours apart, 6 hours to 7 hours apart, 7 hours to 8 hours apart, 8 hours to 9 hours apart, 9 hours to 10 hours apart, 10 hours to 11 hours apart, 11 hours to 12 hours apart, no more than 24 hours apart or no more than 48 hours apart. In one embodiment, MuSK NG agonizing therapy and the other therapy are administered within 3 hours. In another embodiment, MuSK NG agonizing therapy and the other anti-neurodegenerative disease agent are administered at 1 minute to 24 hours apart.

A synergistic combination of MuSK NG agonizing therapy and the other therapy, might allow the use of lower dosages of one or both of these agents and/or less frequent administration of the therapies to a subject with AD or a neurodegenerative disease. A synergistic effect might result in the improved efficacy of these agents in the treatment of AD or a neurodegenerative disease and/or the reduction of any adverse or unwanted side effects associated with the use of either agent alone.

In some embodiments, MuSK NG agonizing therapy is administered in combination with a standard of care treatment for a relevant disease, disorder, or condition (e.g., Alzheimer's Disease).

Approved therapies for AD include cholinesterase inhibitors (e.g., galantamine [Razadyne®], rivastigmine [Exelon®], and donepezil [marketed under the brandname Aricept®], and memantine (Namenda), and the combination of memantine and donepezil (Namzaric®), etc. In some embodiments, MuSK NG agonizing therapy is administered in combination with Razadyne. In some embodiments, MuSK NG agonizing therapy is administered in combination with Namenda. In some embodiments, MuSK NG agonizing therapy is administered in combination with Exelon. In some embodiments, MuSK NG agonizing therapy is administered in combination with Namzaric. In some embodiments, MuSK NG agonizing therapy is administered in combination with one or more therapies for Alzheimer's Disease.

In some embodiments, MuSK NG agonizing therapy is administered in combination with one or more therapies that relieves a symptom or characteristic of a relevant disease, disorder or condition, or of a therapy therefor. In some embodiments, MuSK NG agonizing therapy is administered in combination with one or more other therapies that relieves a symptom or characteristic so that the side effects associated with said other therapies are relieved. In some embodiments, the side effect associated with therapy is characterized by one or more of nausea, vomiting, loss of appetite, muscle cramps, increased frequency of bowel movements, headache, constipation, confusion and dizziness.

Any therapy which is known to be useful, or which has been used, will be used or is currently being used for the treatment or prevention of AD, or a disease characterized by neurodegeneration, can be used in combination with the MuSK NG agonizing therapy in accordance with the invention described herein.

The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments described herein can be combined to provide further embodiments. Aspects of the disclosure can be modified, if necessary, to employ the compositions, functions and concepts of the above references and application to provide yet further embodiments of the disclosure. Moreover, due to biological functional equivalency considerations, some changes can be made in protein structure without affecting the biological or chemical action in kind or amount. These and other changes can be made to the disclosure in light of the detailed description. All such modifications are intended to be included within the scope of the appended claims.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The technology described herein is further illustrated by the following examples which in no way should be construed as being further limiting. Although methods and materials similar or equivalent to those described herein can be used in the practice or testing of this disclosure, suitable methods and materials are described below.

EXAMPLES

The invention now being generally described, it will be more readily understood by reference to the following examples which are included merely for purposes of illustration of certain aspects and embodiments of the present invention and are not intended to limit the invention.

Example 1 Characterization of MuSK in NSC Quiescence and Neurogenesis In Vitro/In Vivo MuSK mRNA and Protein are Expressed in Neural Stem Cells (NSC)

The present example confirms, among other things, that MuSK is expressed in NSCs.

Neural stem cells in culture and in vivo are responsive to BMP, which drives them towards quiescence and also inhibits their differentiation (Mira et al., 2010; Webb et al., 2013). As a first step towards testing whether the MuSK-BMP pathway plays a role in NSCs and their activity, we probed MuSK expression in these cells. RNA-seq analysis of freshly isolated, FACS-sorted NSCs showed that both quiescent and activated NSCs express MuSK transcripts, while immunostaining showed that they express MuSK protein (FIG. 2).

Methods

NSC isolation and culture: Primary adult NSCs isolated from the SVZ of wild type and MuSK-Ig3$^{-/-}$ littermate controls. Each individual mouse will generate a single culture, and therefore will serve as a biological replicate. After isolation, NSCs are plated at 50,000 cells/ml in growth medium containing Neurobasal A, 2% 827 (without Vitamin A), penicillin/streptomycin/glutamine, and 20 ng/ml each of EGF and FGF2. Under these growth conditions the NSCs actively proliferate and can be expanded in culture. For the experiments described below, NSCs are plated on poly-D-lysine coated coverslips and treated as described in each section. For each experiment, we will perform three biological replicates, and each biological replicate will include three technical replicates. The experimenter will be blinded to the genotypes.

NSC quiescence assay: An in vitro model of NSC quiescence to probe the role of MuSK-BMP signaling in regulating this critical cellular decision was used. In preliminary and published work, it was discovered that actively dividing primary mouse NSCs can be induced to enter a quiescent state upon treatment with BMP4 (Mira et al., 2010; Martynoga et al., 2013). NSCs will be isolated from wild type and MuSK-Ig3$^{-/-}$ adult mice and culture them in standard growth conditions. Cells will be treated with BMP4 at a range of concentrations and assess their ability to respond to BMP4 and enter quiescence after 24 hours using an EdU assay. EdU is a thymidine analog that is incorporated into DNA during S-phase of the cell cycle and that can be detected using fluorescent "Click-IT" chemistry (Thermo) and quantified using fluorescence microscopy. NSCs will be incubated for 2 hours with 10 µM EdU, fixed, and the percentage of EdU+ cycling cells will be assessed. All nuclei will be labeled with DAPI to obtain total cell numbers.

Differentiation assay: The possibility that MuSK is required for differentiation of NSCs to neurons, astrocytes and oligodendrocytes will also be investigated. As described above, we will use primary adult NSCs isolated from wild type and MuSK-Ig3−/− mice. The cells were differentiated for 7 days on poly-D-lysine coated coverslips in differentiation media (NeurobasalA, 827, 1% serum). Under these conditions, primary NSCs differentiate to astrocytes, oligodendrocytes and neurons, with approximately 5% of the cells becoming neurons. Since published work implicated BMP signaling in differentiation, the frequency of each differentiated cell type in wild type and MuSK-Ig3$^{-/-}$ NSCs using specific neuronal markers will be determined (Dex for early neurons, Tuj1 and Map2 for more mature neurons), astrocyte markers (GFAP and S100b), and oligodendrocyte markers (CNPase and O4).

MuSK-Ig3$^{-/-}$ mice. MuSK null mice fail to form nerve-muscle synapses and die at birth. To circumvent this limitation and to focus on the MuSK-BMP pathway, knock-in mice lacking the Ig3 domain (MuSK-Ig3$^{-/-}$) were made in the Brown transgenic core. These mice were shown to be viable and fertile but show muscle phenotypes consistent with dysregulation of MuSK-BMP signaling. Floxed MuSK-Ig3$^{-/-}$ mice were also created to inducibly delete the Ig3 domain.

Figure 4:
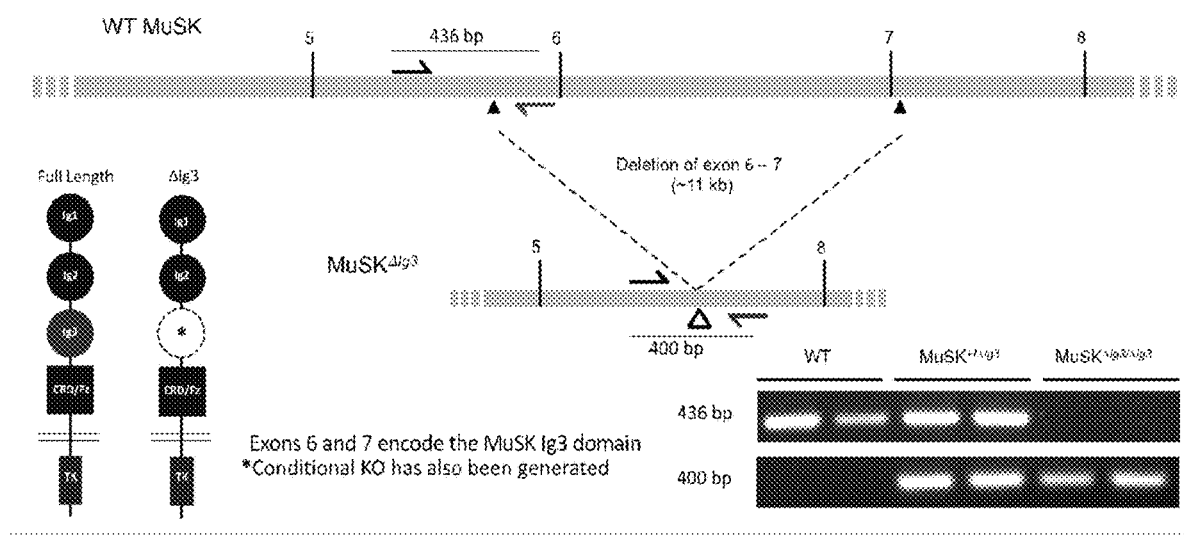
FIG. 4 shows the design rationale for generation of the ΔIg3-MuSK model by CRISPR/Cas9. Exons 6 and 7, which, as depicted in FIG. 3, encode the MuSK Ig3 domain, were deleted by gene editing. Those skilled in the art will be aware that alternative numbering nomenclature is sometimes used for MuSK (e.g., via ENSEMBL); the present disclosure uses the numbering strategy as presented in Hesser, B. et al., (1999).

The alternatively-spliced MuSK Ig3 domain is required for high affinity BMP binding, but is dispensable for agrin-LRP4-mediated MuSK activity (Burden et al., 2013; Hesser et al., 1999; Yilmaz et al., 2016). Selective deletion of the Ig3 domain would yield viable mice with the neuromuscular junction (NMJ) largely intact but have defective MuSK-dependent BMP signaling. CRISPR was used to generate constitutive 'ΔIg3-MuSK' mice that express only this alternatively spliced form (FIG. 4). As predicted, NMJ formation is preserved and the mice are viable and have a normal lifespan.

Plasmids (▲) encoding hSpCas9 and gRNAs flanking the locus that encodes the Ig3 domain were designed to excise an approximate 11 kb region thereby generating a novel MuSK allele (MuSK$^{\Delta Ig3}$) that lacks the Ig3 encoding domain (FIG. 4). Arrows indicate PCR primers designed to amplify either the WT or MuSK$^{\Delta Ig3}$. gDNA sequences used to target sequences within the MuSK gene are shown below:

```
Musk_sgRNAex6up1:
                         (SEQ ID NO: 3)
TGCTCATATCTAAATGCGAT Musk_sgRNAex7dw1:
                         (SEQ ID NO: 4)
GCACTCCATGGCATCTGGAA Musk_sgRNAex6up2:
                         (SEQ ID NO: 5)
GAGCATAAATGTTCTAGACT Musk_sgRNAex7dw2:
                         (SEQ ID NO: 6)
CTCCATGGCATCTGGAAGGG
```

Mice that were homozygous for MuSK$^{\Delta Ig3}$ were selected by genotyping and confirmed by DNA sequencing. Amplification of genomic DNA of the WT and MuSK$^{\Delta Ig3}$ alleles by PCR produces amplicons of 436 and 400 bp, respectively. WT mice have the WT MuSK allele but not the MuSK$^{\Delta Ig3}$. Heterozygous MuSK$^{\Delta Ig3}$ mice have both WT and MuSK$^{\Delta Ig3}$ alleles as evidenced by 436 and 400 bp products, respectively, while MuSK$^{\Delta Ig3}$ homozygotes only amplify the 436 bp MuSK$^{\Delta Ig3}$ allele (FIG. 4).

NSC quiescence in vivo: To examine whether the MuSK-BMP interaction mediates NSC quiescence in vivo we will perform long term EdU labeling of NSCs in adult mice. We will inject animals with 25 mg/kg EdU intraperitoneally for five consecutive days followed by a one month chase. After one month, mice will be perfused with 4% PFA and brains will be collected and prepared for immunohistochemistry (IHC). EdU ClickIT chemistry will be used to detect EdU incorporation in the SVZ and the sections will be co-stained with the NSC marker S0+X2 will be used to establish the identity of the EdU+ cells. The number of EdU+S0X2+ cells will be quantified, comparing wild type to MuSK-Ig3• mutants.

Differentiation in vivo: New neurons, astrocytes, and oligodendrocytes are continually generated from SVZ NSCs in the adult mouse. To quantify differentiation to each of these cell types in the wild type and MuSK-Ig3• animals, we will inject three month old animals with EdU for three consecutive days followed by perfusion on day four. We will perform IHC on olfactory bulbs (where new neurons are formed from SVZ NSCs), combining EdU detection with staining for doublecortin (DCX), to identify neurons generated during the labeling period. We will also investigate formation of new glial cells in the SVZ using markers of oligodendrocytes (CNPase and 04) and astrocytes (GFAP and S100b) that are also EdU+ The number of these cells will be quantified in wild type and MuSK-Ig3• animals.

Results

Function of MuSK in NSC Quiescence and Differentiation In Vitro

In addition, the present example confirms that MuSK functions as a BMP co-receptor in mouse NSCs that is critical for stem cells to exit the cell cycle. Actively proliferating NSCs that exit the cell cycle either re-enter the quiescent state (self-renewal) or terminally differentiate to neurons, astrocytes, or oligodendrocytes. Thus, as NSCs exit the cycling state, they must make a critical decision between self-renewal and differentiation. The decision is essential to balance maintenance of the stem cell pool with generation of new cells for lifelong neurogenesis. The mechanism that governs this key decision remains unknown. In this example, two ex vivo assays were performed using primary adult NCS from the mouse subventricular zone (SVZ) to probe the role of MuSK-BMP signaling in the entry of NSCs to the quiescent state their differentiation into neurons, oligodendrocytes, and astrocytes.

Figure 3:
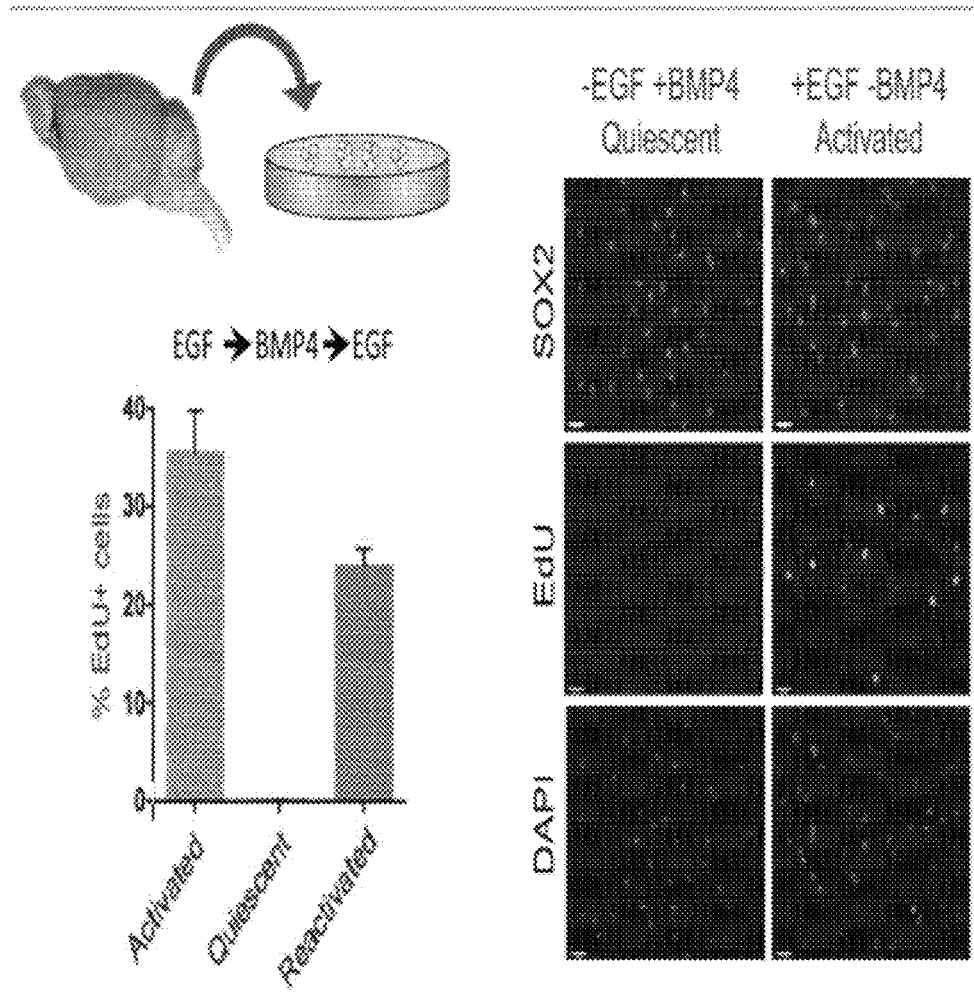
FIG. 3 shows that BMP4 induces a reversible state of quiescence in adult NSCs. Panel (A) EdU incorporation assay showing the rate of NSC proliferation under basal conditions (−BMP4, +EGF), in response to BMP4 (+BMP4, −EGF), or after removal of BMP4 (BMP4 Removed). Panel (B) shows example images of EdU incorporation in NSCs under basal conditions (EGF+) and treated with BMP4. DAPI shows all nuclei. When BMP was removed from culture, NSCs became re-activated, or no longer in the quiescent state.

FIG. 3 shows that BMP4 induces a reversible state of quiescence in adult NSCs. Panel (A) EdU incorporation assay showing the rate of NSC proliferation under basal conditions (−BMP4, +EGF), in response to BMP4 (+BMP4, −EGF), or after removal of BMP4 (BMP4 Removed). Panel (B) shows example images of EdU incorporation in NSCs under basal conditions (EGF+) and treated with BMP4. DAPI shows all nuclei. When BMP was removed from culture, NSCs became re-activated, or no longer in the quiescent state.

BMP4 Signaling is Defective in ΔIg3-MuSK Cells

Figure 5:
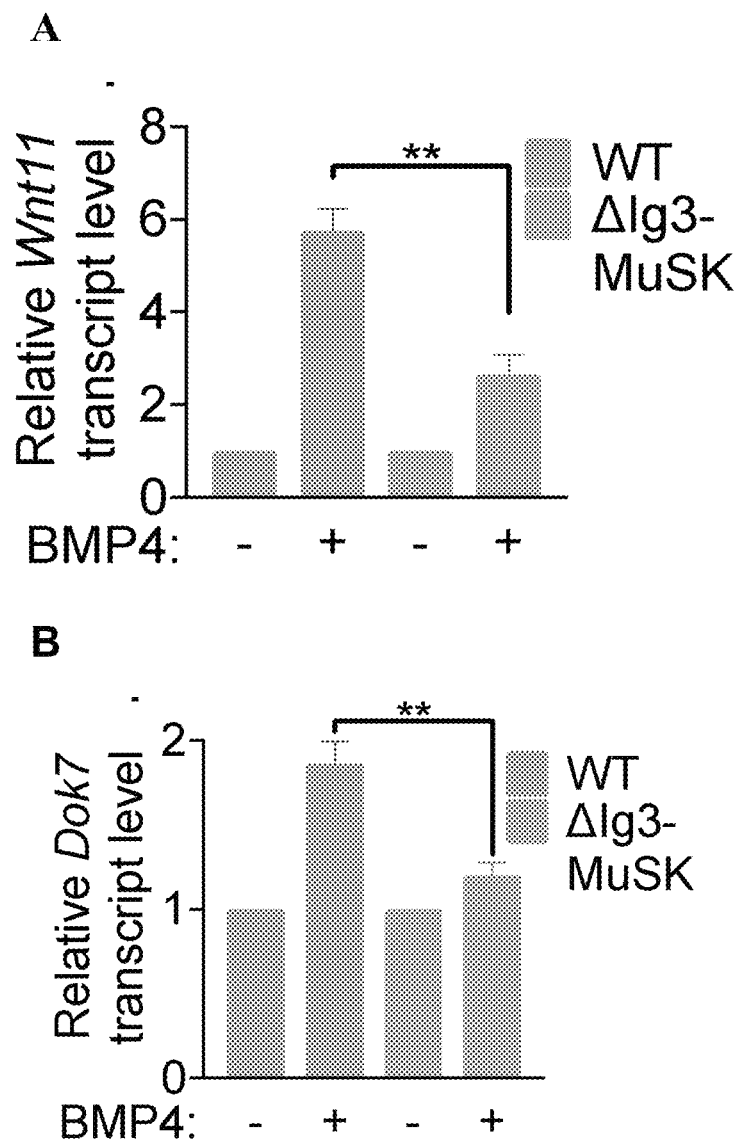
FIG. 5 shows ΔIg3-MuSK myotubes display impaired expression of Wnt11 (panel A) and Dok7 (panel B) in response to BMP4. WT and ΔIg3-MuSK myotubes were treated with BMP4 or left untreated as shown. Transcript levels were determined by qRT-PCR. *P<0.001; P<0.005. T-tests with Bonferroni-Dunn correction for multiple comparisons were used.

The role of the MuSK Ig3 domain in BMP signaling was studied by performing cell culture experiments using primary myotubes generated from ΔIg3-MuSK and WT myoblasts. Both ΔIg3-MuSK and WT myotubes respond to agrin treatment by forming AChR clusters (WT: 4.15 0.24 clusters/myotube segment, ΔIg3-MuSK: 4.72±0.22, mean±SEM; n=60 myotubes/genotype over 2 experiments). However, as shown in FIG. 5, transcription of MuSK-BMP dependent genes in response to BMP4 treatment was reduced in ΔIg3-MuSK myotubes. As measured by quantitative reverse transcription PCR (qRT-PCR), transcription of Wnt11 in response to BMP4 in WT was 2.2 times the magnitude of the ΔIg3-MuSK response, and transcriptional response to Dok7 was 1.6-fold greater in WT than in ΔIg3-MuSK. These data support the use of ΔIg3-MuSK mice as a model for probing MuSK-BMP signaling in vivo.

These observations support that MuSK functions in BMP-mediated quiescence and/or differentiation of NSCs.

ΔIg3-MuSK Mouse Model to Selectively Modulate MuSK-BMP Signaling

The inventors have developed a mouse model that expresses only the Δg3MuSK form. The Δg3MuSK mice have two striking phenotypes: 1) They show increased adult hippocampal neurogenesis; and 2) They exhibit enhanced performance in a hippocampal-dependent memory task. These results suggest that elevating level of Δg3MuSK in the brain could promote adult hippocampal neurogenesis and improve memory in AD patient.

Figure 6:
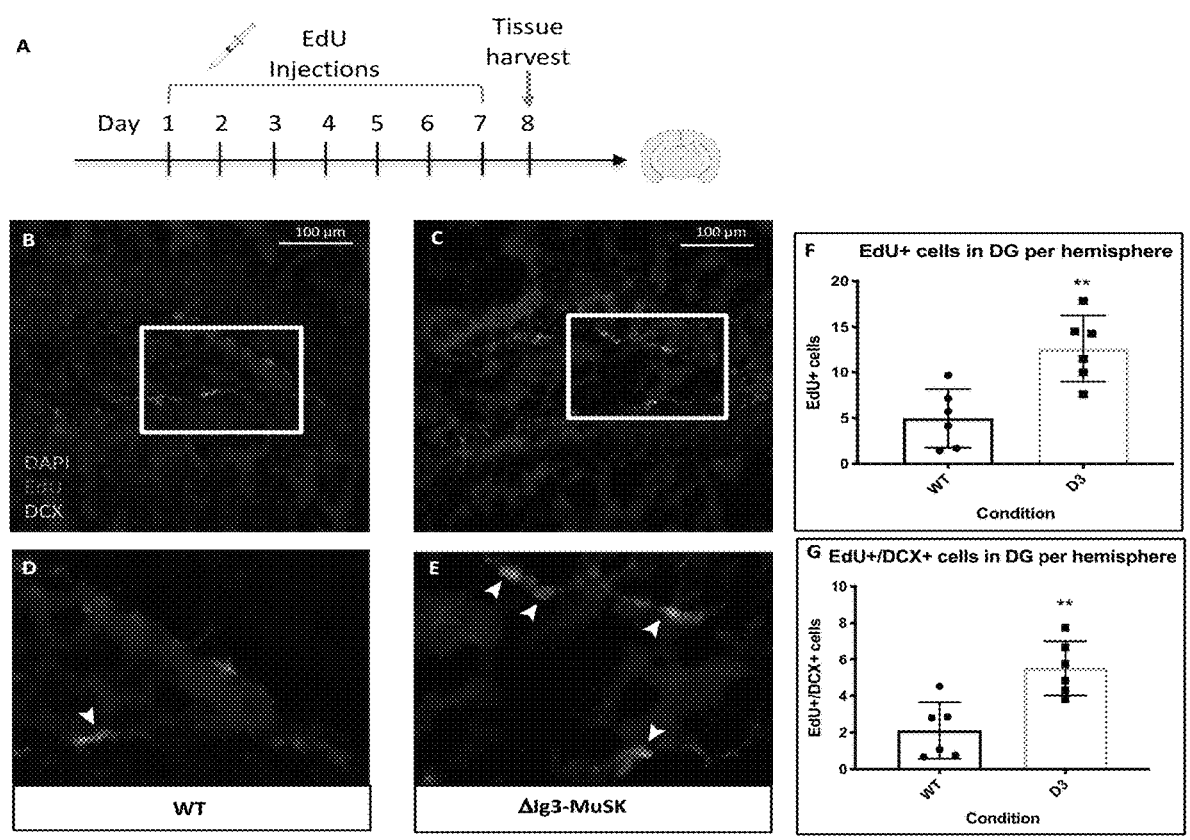
FIG. 6 shows that there is increased neurogenesis in the dentate gyrus of ΔIg3-MuSK mice. Panel A) EdU was injected for 7 d in 3-mo old mice. Panels B-E) Sections stained for EdU (Click-It Plus Kit 594, ThermoFisher: C10639) and Gt anti-doublecortin (DCX) (1:250, Santa Cruz: sc-8066). Panel F) The number of EdU+ cells per hemisphere was significantly increased in Ig3-MuSK animals (p=0.003). Panel G). The number of EdU/DCX-co-labeled cells per hemisphere was increased ~2.7 fold in ΔIg3-MuSK animals (p=0.003).

Increased Adult Hippocampal Neurogenesis and Improved Cognition in ΔIg3-MuSK Mice The thymidine analog EdU is used to assess neurogenesis ΔIg3-MuSK mice. Sections were then double-labelled for EdU and the immature neuron marker doublecortin (DCX) to identify newly born neurons as we described previously (Renault et al., 2009). FIG. 6 shows showed a dramatic AHN phenotype: ΔIg3-MuSK animals exhibit over a two-fold increase in adult hippocampal neurogenesis.

Figure 7:
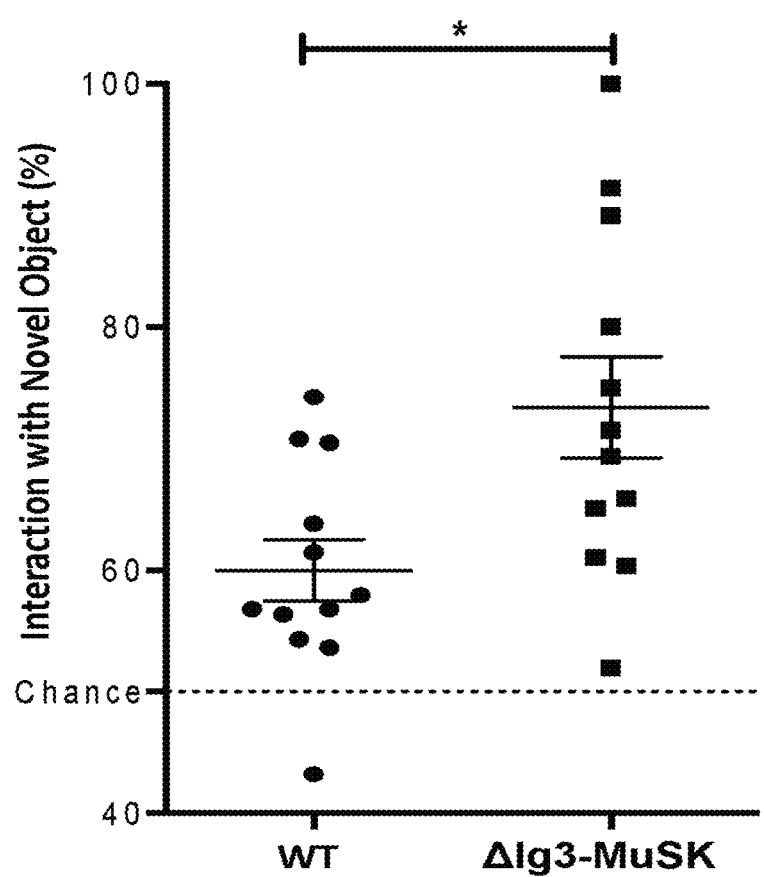
FIG. 7 shows ΔIg3-MuSK mice exhibit enhanced hippocampal-dependent memory. Male 3-month-old homozygous ΔIg3-MuSK mice demonstrate increased preference for novel object location compared to age-matched, wild-type littermates (71%, vs. 60%, p=0.02; WT n=12, ΔIg3-MuSK n=13).

The increased neurogenesis in ΔIg3-MuSK mice suggests that cognition is also improved. A well-established measure of hippocampal-dependent spatial learning is used to assess this behavior. This task takes advantage of a mouse's innate curiosity and propensity to explore new stimuli, and conversely, its disinterest in familiar and otherwise uninteresting stimuli (Dix and Aggleton, 1999). It is observed that 3-month old male ΔIg3-MuSK mice show increased preference for the displaced object compared to age-matched, wild-type littermates, suggesting improved discrimination of changes in their spatial environment. As shown in FIG. 7, ΔIg3-MuSK mice (n=13) spent 71±4.1% of their total object interaction time with the displaced object, whereas wild-type mice (n=12) spent 60±2.5% of their total object interaction time with the displaced object (p=0.02). As 50% would indicate that there was no preference at all, these values represent a 42% increase in displaced object preference for ΔIg3-MuSK compared to a 20% increase in displaced object preference for wild-type.

Example 2 MuSK NG Agonizing Oligonucleotides

Design and synthesize of exon-skipping ASOs. Without wishing to be bound by any theory, MuSK NG agonizing oligonucleotides as described herein are designed in accordance with, but not limited to, the following general guidelines (see, Aartsma-Rus et al., Humana Press, 2012, 117-129):
  RNA or DNA modified for resistance to endo- or exonucleases (e.g., 2'MoE, 2'OMe, PMO, phosphorthioate);
  Designed against target sequence;
  Typically between 15-25 nucleotides, more optimally between 17-20;
  Typically most effective with melting temperature of over 48° C.;
  Typically most effective with GC content between 40% and 60% to prevent steric hindrance/dimerization, availability to access target;
  Typically most effective targeting open/accessible pre-mRNA structures;
  Typically most effective targeting splice regulatory sites or exon definition sites (e.g., intronic splice enhancers, intronic splice silencers (e.g., Spinraza, targeted against ISS of SMN2 exon 7, exonic splice enhancers, exonic splice silencers);
  Typically most effective with sequence composition containing no more than two guanine (G) or cytosine (C) nucleotides in direct succession (e.g., CCC or GGG).

ASO chemistry. We will develop 2'-O-2-methoxyethyl (2'MOE) ASOs that also include phosphorothioate bonds in the sugar backbone. Methods for the design and testing of such ASOs are well-established, including manufacturing, pharmacokinetics, biodistribution and toxicology in rodents and non-human primates (Bennett and Swayze, 2010; Chiriboga et al., 2016; Hua et al., 2015; Mercuri et al., 2018; Rigo et al., 2014). The MOE group added to the 2' position of the ribose increases Tm by about 2° C. per residue, thus elevating the binding affinity, and also improving nuclease resistance. The phosphorothioate modification confers further nuclease resistance and also increases affinity for plasma proteins, resulting in ASOs that efficiently distribute to tissues and are taken up into cells with need for formulations. This chemistry is off-patent, offering commercial advantages.

ASO Design. ASOs will be synthesized by a commercial facility and will be provided by Bolden Therapeutics, Inc. to the Fallon and Webb labs at Brown University for screening. The strategy for designing the ASOs will include scanning exonic and intronic sequences flanking both the 5' and 3' splice sites with overlapping ASOs (1-2 bp shift/oligo). The optimal length of the ASOs is ~17mer which provides a good balance between target specificity and drug exposure. ASOs will be pre-screened in silico for potential off-target effects as well as compositional bias (GC content) and propensity for unwanted dimer formation.

The ASOs will be designed such that they induce skipping of both exons 6 and 7 in MuSK (FIG. 3). Importantly, these two exons are coordinately spliced in vivo (Garcia-Osta et al., 2006; Hesser et al., 1999).

Screening and Selection of Optimal Exon-Skipping ASOs

We will design RT-qPCR TaqMan assays to specifically quantify the following distinct MuSK splice forms: 1) full length (FL) MuSK; 2) $\Delta$exon$^{67}$, which is the desired product encoding ΔIg3-MuSK; and 3) potential 'incomplete' skipping' isoforms $\Delta$exon$^{6}$ and $\Delta$exon$^{7}$. We will perform conventional RT-PCR in parallel to detect any unexpected products. All screens will be carried out in murine C2C12 myoblasts. This cell line expresses MuSK endogenously and is efficiently transfected using standard methods such as Lipofectamine 2000. Cells will be transfected with candidate ASOs at several concentrations across a range from ~0.1 to 10 nM. After one day of treatment RNA will be extracted and splicing will be measured by RT-qPCR to assess exon-skipping efficiency. Our goal is to isolate at least one ASO that induces ≥80% coordinate splicing of exons 6 and 7.

Testing Selected ASOs for Ability to Inhibit MuSK-BMP Signaling in Cultured Cells Our work presented above shows that knock-in mice constitutively expressing only ΔIg3-MuSK show robust increases in AHN and improved cognition (FIGS. 5-6) and cells from these animals have defective MuSK-potentiated BMP signaling (FIG. 4). However, since skipping in vivo will likely be less than 100% efficiency (Rigo et al., 2014), it is important to establish the relationship between the level of skipping achieved and the physiological impact. Therefore, in this aim we will measure the level of MuSK-BMP dependent signaling in ASO-treated cells.

We will use qRT-PCR to measure the levels of MuSK-BMP dependent transcripts (e.g., Dok7 and Wnt11; FIG. 4, or RGS4; Yilmaz et al., 2016). We have extensive experience in this system gained during the discovery and characterization of MuSK as a BMP co-receptor (Yilmaz et al., 2016). Cells treated with either exon-skipping of control ASOs will be stimulated with BMP for 2 hr. The levels of transcripts will then be measured and the response to BMP will be correlated with the degree of exon skipping.

Data from the ΔIg3-MuSK mouse provided herein support that increased expression of ΔIg3-MuSK provides beneficial impact. The present disclosure appreciates that, in some embodiments, efficiency of skipping exons 6 and 7 may be insufficiently efficient with a single ASO. In some embodiments, it may be desirable to prepare one or more ASOs directed against exon 7, for use alone and/or with an exon 6-directed ASO.

Those of ordinary skill in the art, reading the present disclosure, will appreciate that, in some embodiments, it may be desirable to replicate studies (e.g., at least three times), and/or to analyze data with appropriate statistical methodologies (e.g., by t-tests with appropriate correction for multiple comparisons (e.g., Bonferroni)).

Work described herein provides technologies for efficient development of an ASO-mediated therapy for AD.

Example 3 Exemplary Characterization of Certain Agonizing Agents

Parkinson's Disease (PD)

In some embodiments, where it may be desirable to particularly assess one or more agonizing agents as described herein with respect to Parkinson's Disease, such agonizing agent may be tested, for example, in an assay/model such as the 6-hydroxy dopamine (6-OHDA) Hemi-parkinsonian Lesion model, or other PD models described, e.g., in Tieu K. 2011 (*Perspect Med.;* 1(1):a009316). Other example PD models include 1-methyl-4-phenyl-1,2,3,6-tetrahydropyridine (MPTP), herbicide paraquat (N,N'-dimethyl-4-4'-bipiridinium), Rotenone, Reserpine, α-methyl-p-tyrosine, Amphetamines such as p-chloroamphetamine (PCA), methamphetamine, 3,4-methylenedioxymethamphetamine (MDMA), and fenfluramine, Isoquinoline, and LPS (to induce neuroinflammation).

6-OHDA is capable of inducing degeneration of neurons. 6-OHDA will be injected into specific areas of the brain of a rodent (e.g., a rat) to induce neurodegeneration. Symptoms observed are dependent on the region of the brain targeted. Symptoms will be measured using before and after 6-OHDA administration.

One or more MuSK NG agonizing agents will be administered to the rodent and sign/symptoms will be assessed/measured.

Signs/symptoms assessed include assessment of motor function (e.g., through behavioral tests used to quantify locomotor activity, rotation, rotarod, stride length of the paws, and pole test). Other assessments include detection of Lewy Body-like Aggregation (e.g., using thioflavin S, or assessing patterns and levels of intracellular α-synuclein), quantification of dopamine content in the striatum (e.g., using HPLC to isolate and quantify levels in striatal tissue samples), quantification of dopaminergic terminals in the striatum (e.g., using immunohistochemical techniques and imaging techniques to quantify tyrosine hydroxylase immunoreactivity/fiber density), and quantification of dopaminergic neurons in the Substantia Nigra Par Compacta (e.g., by cell staining/counting in tissue sections).

MuSK NG agonizing agents will be selected based on one or more improvements related to sign/symptoms associate with PD.

Similarly, one or more agonizing agents described herein may be assessed/characterized with respect to other disorders such as dementia (e.g., Frontotemporal dementia), stroke, Major Depressive Disorder (MDD), bipolar disorder, Schizophrenia, Post-Traumatic Stress Disorder (PTSD), substance-related and addictive disorders (e.g., chronic cocaine use and lifelong cigarette smoking), Temporal-Lobe Epilepsy, Hippocampal Sclerosis, Niemann Pick Type C, Diabetes-mediated hippocampal neuronal loss, and Huntington's disease.

REFERENCES

Aartsma-Rus, A. (2012). "Overview on DMD exon skipping." Methods Mol. Biol. 867, 97-116.
Allen, K. M., et al., (2016). "Cell proliferation is reduced in the hippocampus in schizophrenia." *Australian & New Zealand Journal of Psychiatry* 50.5: 473-480.
Allen, T. (2002). "Ligand-targeted therapeutics in anticancer therapy." Nature Reviews Cancer, 2: 750-765.
Allison, S. L., et al., (2019). Comparison of different MRI-based morphometric estimates for defining neurodegeneration across the Alzheimer's disease continuum. Neuroimage Clin 23, 101895.
Amenta, A. R., et al., (2011). Biglycan recruits utrophin to the sarcolemma and counters dystrophic pathology in mdx mice. Proc. Natl. Acad. Sci. U.S.A 108, 762-767.
Amenta, A. R., et al., (2012). Biglycan is an extracellular MuSK binding protein important for synapse stability. J. Neurosci. 32, 2324-2334.
Atkinson, E. G., et al., (2018). No Evidence for Recent Selection at FOXP2 among Diverse Human Populations. Cell 174, 1424-1435.e15.
Audesse, A. J., and Webb, A. E. (2018). Enhancing Lysosomal Activation Restores Neural Stem Cell Function During Aging. J. Exp. Neurosci. 12, 1179069518795874.
Barrós-Loscertales, A., et al., (2011). "Reduced striatal volume in cocaine-dependent patients." *Neuroimage* 56.3 1021-1026.
BASIC METHODS IN MOLECULAR BIOLOGY, Davis et al., (2012). Elsevier Science Publishing, Inc., New York, USA (ISBN 044460149X).
Bennett, C. F., and Swayze, E. E. (2010). RNA targeting therapeutics: molecular mechanisms of antisense oligonucleotides as a therapeutic platform. Annu. Rev. Pharmacol. Toxicol. 50, 259-293.
Bennett, C. F., et al., (2019). Antisense Oligonucleotide Therapies for Neurodegenerative Diseases. Annu. Rev. Neurosci. 42, 385-406.
Berge S. M., et al., (1977). "Pharmaceutical salts." J Pharm Sci. 66(1): 1-19.
Blurton-Jones, M., et al., (2009). Neural stem cells improve cognition via BDNF in a transgenic model of Alzheimer disease. Proc. Natl. Acad. Sci. U.S.A 106, 13594-13599.
Boldrini, M., et al., (2018). Human Hippocampal Neurogenesis Persists throughout Aging. Cell Stem Cell 22, 589-599.e5.
Brandhorst, S., et al., (2015). A Periodic Diet that Mimics Fasting Promotes Multi-System Regeneration, Enhanced Cognitive Performance, and Healthspan. Cell Metab. 22, 86-99.
Burden, S. J., et al., (2013). The role of MuSK in synapse formation and neuromuscular disease. Cold Spring Harb. Perspect. Biol. 5, a009167.
Camicioli, R., et al., (2003). "Parkinson's disease is associated with Hippocampal Atrophy." Mov. Disord. 18(7): 784-790.
Chen, G., et al., (2000). "Enhancement of hippocampal neurogenesis by lit1lium." *Journal of Neurochemistry* 75.4: 1729-1734.
Chan, S., et al., (2016). "Hippocampal volume in vulnerability and resilience to depression." *Journal of affective disorders* 189: 199-202
Chen, S., et al., (2011). Allopregnanolone promotes regeneration and reduces β-amyloid burden in a preclinical model of Alzheimer's disease. PLoS One 6, e24293.
Chiriboga, C. A., et al., (2016). Results from a phase 1 study of nusinersen (ISIS-SMN(Rx)) in children with spinal muscular atrophy. Neurology 86, 890-897.
Choi, D.-H., et al., (2016). "Effect of exercise-induced neurogenesis on cognitive function deficit in a rat model of vascular dementia." *Molecular medicine reports* 13A: 2981-2990.
Choi, S. H., et al., (2018). Combined adult neurogenesis and BDNF mimic exercise effects on cognition in an Alzheimer's mouse model. Science 361.

Cook, M. J., et al., (1992). "Hippocampal volumetric and morphometric studies in frontal and temporal lobe epilepsy." Brain 115.4: 1001-1015.

Crews, L., et al., (2010). Increased BMP6 levels in the brains of Alzheimer's disease patients and APP transgenic mice are accompanied by impaired neurogenesis. J. Neurosci. 30, 12252-12262.

CURRENT PROTOCOLS IN IMMUNOLOGY (CPI) (2003). John E. Coligan, ADAM Kruisbeek, David H Margulies, Ethan M Shevach, Warren Strobe, (eds.) John Wiley and Sons, Inc. (ISBN 0471142735, 9780471142737).

CURRENT PROTOCOLS IN MOLECULAR BIOLOGY (CPMB), (2014). Frederick M. Ausubel (ed.), John Wiley and Sons (ISBN 047150338X, 9780471503385).

CURRENT PROTOCOLS IN PROTEIN SCIENCE (CPPS), (2005). John E. Coligan (ed.), John Wiley and Sons, Inc.

Das, Debjani, et al, (2012). "Lifetime cigarette smoking is associated with striatal volume measures." Addiction biology 17.4 817-825.

De Chiara, T. M., et al., (1996). The receptor tyrosine kinase MuSK is required for neuromuscular junction formation in vivo. Cell 85, 501-512.

Dix, S. L., and Aggleton, J. P. (1999). Extending the spontaneous preference test of recognition: evidence of object-location and object-context recognition. Behav. Brain Res. 99, 191-200.

Ekonomou, A., et al., (2011). "Increased neural progenitors in vascular dementia." Neurobiology of aging 32.12: 2152-2161 Enwere, E., et al., (2004). Aging results in reduced epidermal growth factor receptor signaling, diminished olfactory neurogenesis, and deficits in fine olfactory discrimination. J. Neurosci. 24, 8354-8365.

Eriksson, P. S., et al., (1998). Neurogenesis in the adult human hippocampus. Nat. Med. 4, 1313-1317.

Ernst, A., et al., (2014). Neurogenesis in the striatum of the adult human brain. Cell 156, 1072-1083.

Ersche, K. D., et al., "Meta-analysis of structural brain abnormalities associated with stimulant drug dependence and neuroimaging of addiction vulnerability and resilience." Current opinion in neurobiology 23.4 (2013): 615-624.

Farrar, M. A., et al., (2017). Emerging therapies and challenges in spinal muscular atrophy. Ann. Neurol. 81, 355-368.

Foland, L. C., et al., (2008). "Increased volume of the amygdala and hippocampus in bipolar patients treated with lithium." Neuroreport 19.2: 221.

Gage, F. H. (2019). Adult neurogenesis in mammals. Science 364, 827-828.

Garcia-Osta, A., et al., (2006). MuSK expressed in the brain mediates cholinergic responses, synaptic plasticity, and memory formation. J. Neurosci. 26, 7919-7932.

Gold, S. M., et al., (2007). "Hippocampal damage and memory impairments as possible early brain complications of type 2 diabetes." Diabetofogia 50.4: 711-719.

Hesser, B. A., et al., (1999). Identification and characterization of a novel splice variant of MuSK. FEBS Lett. 442, 133-137.

Ho, N., et al., (2013). "Effects of diabetes on hippocampal neurogenesis: links to cognition and depression." Neuroscience & Biobehavioral Reviews 37.8: 1346-1362.

Hong, Y. R., et al., (2015). "CCL2 induces neural stem cell proliferation and neuronal differentiation in Niemann-Pick type C mice." Journal of Veterinary Medical Science 14-0352.

IMMUNOLOGY, (2006). Werner Luttmann, published by Elsevier.

Hua, Y., et al., (2015). Motor neuron cell-nonautonomous rescue of spinal muscular atrophy phenotypes in mild and severe transgenic mouse models. Genes Dev. 29, 288-297.

Imayoshi, I., et al., (2008). Roles of continuous neurogenesis in the structural and functional integrity of the adult forebrain. Nat. Neurosci. 11, 1153-1161.

James, A. W., et al., (2016). A Review of the Clinical Side Effects of Bone Morphogenetic Protein-2. Tissue Eng. Part B Rev. 22, 284-297.

JANEWAY'S IMMUNOBIOLOGY, (2014). Kenneth Murphy, Allan Mowat, Casey Weaver (eds.), Taylor & Francis Limited, (ISBN 0815345305, 9780815345305).

Kalamakis, G., et al., (2019). Quiescence Modulates Stem Cell Maintenance and Regenerative Capacity in the Aging Brain. Cell 176, 1407-1419.e14.

Kantarci, Kejal, et al., (2016). "Hippocampal volumes predict risk of dementia with Lewy bodies in mild cognitive impairment." Neurology 87.22 2317-2323.

Kathner-Schaffert, C., et al., (2019). Early Stroke Induces Long-Term Impairment of Adult Neurogenesis Accompanied by Hippocampal-Mediated Cognitive Decline. Cells 8.

Kempermann, G., et al., (2018). Human Adult Neurogenesis: Evidence and Remaining Questions. Cell Stem Cell 23, 25-30.

Kim, N., et al., (2008). Lrp4 is a receptor for Agrin and forms a complex with MuSK. Cell 135, 334-342.

Koh, S.-H., and Park, H.-H. (2017). Neurogenesis in Stroke Recovery. Transl. Stroke Res. 8, 3-13.

LABORATORY METHODS IN ENZYMOLOGY: DNA, (2013). Jon Lorsch (ed.) Elsevier (ISBN 0124199542).

Leeman, D. S., et al., (2018). Lysosome activation clears aggregates and enhances quiescent neural stem cell activation during aging. Science 359, 1277-1283.

Li, X., et al., (2016). "Hippocampal subfield volumetry in patients with subcortical vascular mild cognitive impairment." Scientific reports 6: 20873.

LEWIN'S GENES XI, (2014). published by Jones & Bartlett Publishers (ISBN-1449659055).

Lindvall, O. and Kokaia, Z., (2015). Neurogenesis following stroke affecting the adult brain. Cold Spring Harbor perspectives in biology, 7(11), p.a019034.

Lu, J., et al., (2017). Targeting adult neurogenesis for poststroke therapy. Stem cells international, 2017.

Lucassen, P. J., et al., (2019). Adult neurogenesis, human after all (again): classic, optimized, and future approaches. Behav. Brain Res. 112458.

Mak, E., et al., (2017). "Multi-modal MRI investigation of volumetric and microstructural changes in the hippocampus and its subfields in mild cognitive impairment, Alzheimer's disease, and dementia with Lewy bodies." International psychogeriatrics 29.4 545-555.

Mann, C. J., et al., (2001). Antisense-induced exon skipping and synthesis of dystrophin in the mdx mouse. Proc. Natl. Acad. Sci. U.S.A 98, 42-47.

McClorey, G., et al., (2006). Antisense oligonucleotide-induced exon skipping restores dystrophin expression in vitro in a canine model of DMD. Gene Ther. 13, 1373-1381.

Mercado, M. L., et al., Biglycan targets dystrobrevin, syntrophin and nNOS to the muscle cell membrane. FASEB J. In Press.

Mercuri, E., et al., (2018). Nusinersen versus Sham Control in Later-Onset Spinal Muscular Atrophy. N. Engl. J. Med. 378, 625-635.

Meyers, E. W. and Miller, W. (1989). "Optimal alignments in linear space." CABIOS, 4: 11-17.

Mira, H., et al., (2010). Signaling through BMPR-IA regulates quiescence and long-term activity of neural stem cells in the adult hippocampus. Cell Stem Cell 7, 78-89.

MOLECULAR BIOLOGY AND BIOTECHNOLOGY: A COMPREHENSIVE DESK REFERENCE, (1995). Robert A. Meyers (ed.), published by VCH Publishers, Inc. (ISBN 1-56081-569-8).

MOLECULAR CLONING: A LABORATORY MANUAL, 4th ed., Michael Richard Green and Joseph Sambrook, (2012). Cold Spring Harbor Laboratory Press, Cold Spring Harbor, N.Y., USA (ISBN 1936113414).

Moreno-Jiménez, E. P., et al., (2019). Adult hippocampal neurogenesis is abundant in neurologically healthy subjects and drops sharply in patients with Alzheimer's disease. Nat. Med.

Mullane, K., and Williams, M. (2018). Alzheimer's disease (AD) therapeutics—1: Repeated clinical failures continue to question the amyloid hypothesis of AD and the current understanding of AD causality. Biochem. Pharmacol. 158, 359-375.

Murphy, F. V. and Ramakrishnan, V., (2004). "Structure of a purine-purine wobble base pair in the decoding center of the ribosome." Nature Structural and Molecular Biology 11: 1251-1252.

Nathan, P. J., et al., (2017). "Association between CSF biomarkers, hippocampal volume and cognitive function in patients with amnestic mild cognitive impairment (MCI)." Neurobiology of aging 53 1-10.

Pitcher, T. L., et al., (2012). "Reduced striatal volumes in Parkinson's disease: a magnetic resonance imaging study." Translational neurodegeneration 1.1 17.

Powers, M. B., et al., (2015). "Exercise augmentation of exposure therapy for PTSD: rationale and pilot efficacy data." Cognitive befmviourtherapy 44.4: 314-327.

Renault, V. M., et al., (2009). FoxO3 regulates neural stem cell homeostasis. Cell Stem Cell 5, 527-539.

Rigo, F., et al., (2014). Pharmacology of a central nervous system delivered 2'-O-methoxyethyl-modified survival of motor neuron splicing oligonucleotide in mice and non-human primates. J. Pharmacol. Exp. Ther. 350, 46-55.

Rubin, M., et al., (2016). "Greater Hippocampal volume is associated with PTSD treatment response." Psychiatry Research: Neuroimaging 252: 36-39.

Sassone, J., et al., (2018). Regenerative Approaches in huntington's disease: from mechanistic insights to therapeutic protocols. Frontiers in neuroscience, 12, p. 800.

Schoenfeld, T. J., et al., (2019). New neurons restore structural and behavioral abnormalities in a rat model of PTSD. Hippocampus.

Selkoe, D. J. (2019). Alzheimer disease and aducanumab: adjusting our approach. Nat. Rev. Neurol. 15, 365-366.

Sorrells, S. F., et al., (2018). Human hippocampal neurogenesis drops sharply in children to undetectable levels in adults. Nature 555, 377-381.

Spalding, K. L., et al., (2013). Dynamics of hippocampal neurogenesis in adult humans. Cell 153, 1219-1227.

Steiner, E., et al., (2019). A fresh look at adult neurogenesis. Nat. Med. 25, 542-543.

Sterling, N. W., et al., (2013). "Striatal shape in Parkinson's disease." Neurobiology of aging 34.11 2510-2516.

Tai, X. Y., et al., (2018). "Neurodegenerative processes in temporal lobe epilepsy with hippocampal sclerosis: Clinical, pathological and neuroimaging evidence." Neuropathology and applied neurobiology 44.1: 70-90.

Terreros-Roncal, J., et al., (2019). Activity-dependent reconnection of adult-born dentate granule cells in a mouse model of frontotemporal dementia. J. Neurosci. 39 (29) 5794-5815.

THE ENCYCLOPEDIA OF MOLECULAR CELL BIOLOGY AND MOLECULAR MEDICINE, Robert S. Porter et al. (eds.), published by Blackwell Science Ltd., 1999-2012 (ISBN 9783527600908).

THE MERCK MANUAL OF DIAGNOSIS AND THERAPY, (2011). 19th Edition, published by Merck Sharp & Dohme Corp., (ISBN 978-0-911910-19-3).

Tobin, M. K., et al., (2019). Human Hippocampal Neurogenesis Persists in Aged Adults and Alzheimer's Disease Patients. Cell Stem Cell 24, 974-982.e3.

Van R., et al., (2015). "Smaller hippocampal volume as a vulnerability factor for the persistence of post-traumatic stress disorder." Psychological medicine 45.13: 2737-2746.

van Erp, Theo G M, et al., (2016). "Subcortical brain volume abnormalities in 2028 individuals with schizophrenia and 2540 healthy controls via t11e ENIGMA consortium." Molecular psychiatry 21.4: 547.

van Praag, H., et al., (2005). Exercise enhances learning and hippocampal neurogenesis in aged mice. J. Neurosci. 25, 8680-8685.

Vaughan, et al., (1998). "Human antibodies by design." Nature Biotechnology, 16: 535-539.

Villeda, S. A., et al., (2011). The ageing systemic milieu negatively regulates neurogenesis and cognitive function. Nature 477, 90-94.

Villeda, S. A., et al., (2014). Young blood reverses age-related impairments in cognitive function and synaptic plasticity in mice. Nat. Med. 20, 659-663.

Webb, A. E., et al., (2013). FOXO3 shares common targets with ASCL1 genome-wide and inhibits ASCL1-dependent neurogenesis. Cell Rep. 4, 477-491.

Whitworth, J. W., et al., (2017). "Direct and indirect effects of exercise on posttraumatic stress disorder symptoms: A longitudinal study." General hospital psychiatry 49: 56-62.

Wilton, S. D., et al., (2007). Antisense oligonucleotide-induced exon skipping across the human dystrophin gene transcript. Mol. Ther. 15, 1288-1296.

Wyss-Coray, T. (2016). Ageing, neurodegeneration and brain rejuvenation. Nature 539, 180-186.

Yilmaz, A., et al., (2016). MuSK is a BMP co-receptor that shapes BMP responses and calcium signaling in muscle cells. Sci. Signal. 9, ra87.

Yun, S., et al., (2016). Re-evaluating the link between neuropsychiatric disorders and dysregulated adult neurogenesis. Nature medicine, 22(11), p. 1239.

Zhang, B., et al., (2008a). LRP4 serves as a coreceptor of agrin. Neuron 60, 285-297.

Zhang, B. et al., (2008b). A role for adult TLX-positive neural stem cells in learning and behaviour. Nature 451, 1004-1007.

All patents and other publications; including literature references, issued patents, published patent applications, and co-pending patent applications; cited throughout this application are expressly incorporated herein by reference for the purpose of describing and disclosing, for example, the methodologies described in such publications that might be used in connection with the technology described herein. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

The foregoing written specification is considered to be sufficient to enable one skilled in the art to practice the present aspects and embodiments. The present aspects and embodiments are not to be limited in scope by examples provided, since the examples are intended as a single illustration of one aspect and other functionally equivalent embodiments are within the scope of the disclosure. Various modifications in addition to those shown and described herein will become apparent to those skilled in the art from the foregoing description and fall within the scope of the appended claims. The advantages and objects described herein are not necessarily encompassed by each embodiment. Those skilled in the art will recognize or be able to ascertain using no more than routine experimentation, many equivalents to the specific embodiments described herein. Such equivalents are intended to be encompassed by the following claims.

---

We claim:

1. A method of treating a subject suffering from one or more features of neurodegeneration or impaired cognition that would benefit from increased neurogenesis by delivering an oligonucleotide to the brain of the subject:
wherein the oligonucleotide targets a MuSK transcript that is expressed in the brain of the subject and alters splicing so that one or more exons encoding the MuSK Ig3 domain are skipped;
wherein the level or activity of a MuSK polypeptide lacking a functional Ig3 domain (MuSKΔIg3) relative to other MuSK polypeptides that include a functional Ig3 domain is increased; and
wherein the level or activity of protein-protein complexes that include a MuSK polypeptide with a functional Ig3 domain complexed with bone morphogenic protein (BMP) relative to the MuSK polypeptide lacking a functional Ig3 domain is reduced.

2. The method of claim 1, wherein the one or more skipped exons is exon 6 encoding the MuSK Ig3 domain.

3. The method of claim 1, wherein the one or more skipped exons is exon 7 encoding the MuSK Ig3 domain.

4. The method of claim 1, wherein the one or more skipped exons are exons 6 and 7 encoding the MuSK Ig3 domain.

5. The method of claim 1, wherein the oligonucleotide comprises chemical modifications.

6. The method of claim 5, wherein the chemical modifications comprise one or more types of base modifications, sugar modification, and internucleotidic linkage modifications.

7. The method of claim 6, wherein the chemical modifications comprise sugar modification.

8. The method of claim 7, wherein the sugar modification is 2-MOE modification.

9. The method of claim 6, wherein the base modifications comprise a base substitution that contains a linking moiety connected to one or more fluorescent moieties, biotin or avidin moieties, or other protein or peptide moieties.

10. A method of increasing neurogenesis in a subject comprising delivering an oligonucleotide to the brain of the subject:
wherein the oligonucleotide targets a MuSK transcript that is expressed in the brain of the subject and alters splicing so that one or more exons encoding the MuSK Ig3 domain are skipped;
wherein the level or activity of a MuSK polypeptide lacking a functional Ig3 domain (MuSKΔIg3) relative to other MuSK polypeptides that include a functional Ig3 domain is increased; and
wherein the level or activity of protein-protein complexes that include a MuSK polypeptide with a functional Ig3 domain complexed with BMP relative to the MuSK polypeptide lacking a functional Ig3 domain is reduced.

* * * * *

UNITED STATES PATENT AND TRADEMARK OFFICE
CERTIFICATE OF CORRECTION

PATENT NO. : 12,458,657 B2
APPLICATION NO. : 17/604279
DATED : November 4, 2025
INVENTOR(S) : Justin R. Fallon et al.

Page 1 of 1

It is certified that error appears in the above-identified patent and that said Letters Patent is hereby corrected as shown below:

In the Claims

Claim 10, Line 56 should read:
...lacking a functional Ig3 domain (MuSKΔIg3) relative...

Signed and Sealed this
Sixteenth Day of December, 2025

John A. Squires
*Director of the United States Patent and Trademark Office*